(12) United States Patent
Semba et al.

(10) Patent No.: US 6,373,595 B1
(45) Date of Patent: Apr. 16, 2002

(54) COLOR DATA CONVERTING METHOD

(75) Inventors: Satoshi Semba; Masayoshi Shimizu; Shoji Suzuki; Kimitaka Murashita, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/326,624

(22) Filed: Jun. 7, 1999

(30) Foreign Application Priority Data

Nov. 30, 1998 (JP) .......................................... 10-339107

(51) Int. Cl.[7] .......................... G06F 15/00; G06F 3/08; H04N 1/46
(52) U.S. Cl. ...................... 358/1.9; 358/520; 358/523; 358/524; 382/163; 345/589
(58) Field of Search ...................... 358/1.9, 518, 519, 358/520, 523, 524; 382/163, 162, 167; 345/589

(56) References Cited

U.S. PATENT DOCUMENTS

| | | | | |
|---|---|---|---|---|
| 4,675,704 A | * | 6/1987 | Yamamoto | .................. 358/464 |
| 4,758,885 A | * | 7/1988 | Sasaki et al. | .................. 58/520 |
| 6,310,696 B1 | * | 10/2001 | Kumada | ...................... 358/1.9 |
| 6,297,826 B1 | * | 12/2001 | Semba et al. | ................ 345/589 |

FOREIGN PATENT DOCUMENTS

| | | |
|---|---|---|
| EP | 0488656 A2 | 6/1992 |
| EP | 0579224 A1 | 1/1994 |
| EP | 0684728 A1 | 11/1995 |
| WO | 95/31794 | 11/1995 |

* cited by examiner

*Primary Examiner*—Kimberly A. Williams
(74) *Attorney, Agent, or Firm*—Staas & Halsey LLP

(57) ABSTRACT

In a virtual gamut-obtaining step, lightness, saturation, and/or hue angle of the second gamut is converted and an expanded virtual gamut including at least all of the lightness values of the first gamut is obtained. In a color data changing step, for color data which is not included in the virtual gamut in color data of the first gamut, lightness, saturation, and hue angle are changed, thereby obtaining third color data included in the virtual gamut. In a color data forming step, a conversion opposite to the conversion performed to the second gamut in the virtual gamut obtaining step is executed to the third color data, thereby forming second color data.

10 Claims, 48 Drawing Sheets

F I G. 4 3
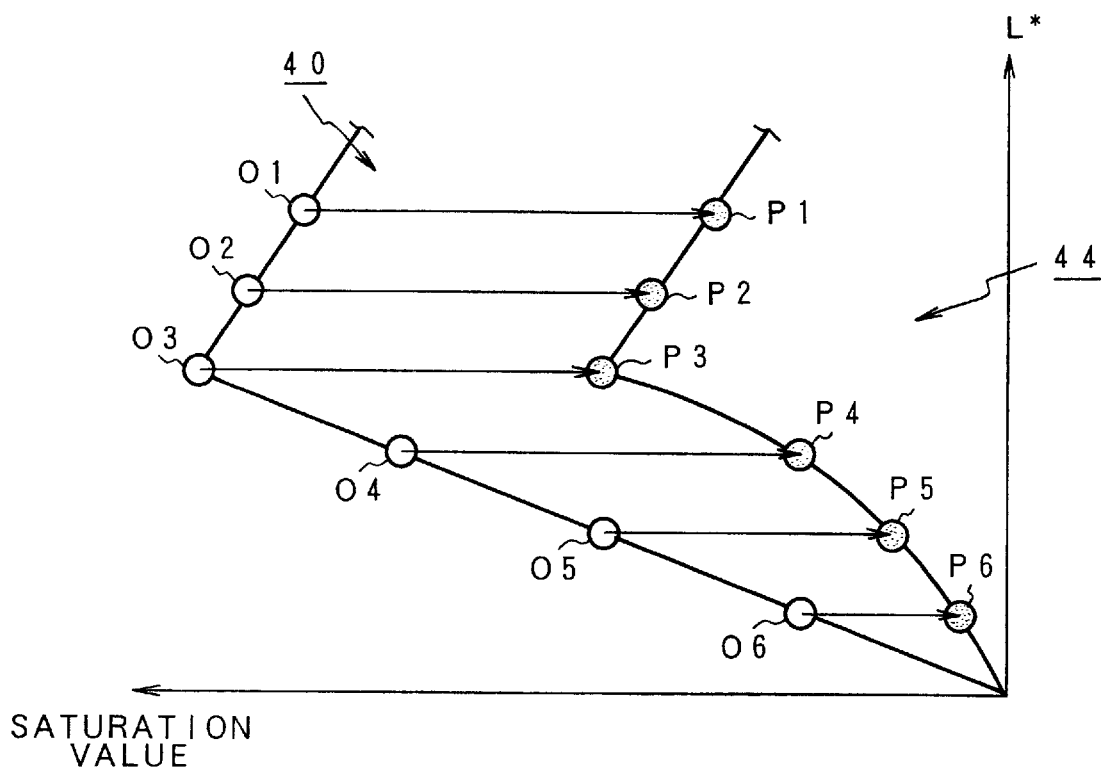

COLOR DATA CONVERTING METHOD

BACKGROUND OF THE INVENTION

1. Field of the Invention

The present invention relates to a color data converting method of converting color data so that the whole color images when they are seen by apparatuses having different color reproducing ranges (color gamuts: hereinbelow, a color reproducing range is simply referred to as a "gamut") are not different and, more particularly, to a color data converting method of converting color data for image display of a wide gamut into color data for printing of a narrow gamut.

2. Description of the Related Arts

Color image apparatuses such as personal computer, color printer, digital camera, and the like at present start to be widespread owing to the realization of high performance and low costs. Among them, in the color printer, it is important to print a color image displayed on a CRT display without changing an atmosphere of the whole image. In order to make the colors coincide among the different apparatuses, as a chrominance signal showing an absolute color that does not depend on the apparatus, there is a method of processing the chrominance signal by using an L*a*b* space, a CIEXYZ space, or the like of a luminance color difference separation system as a reference. For example, when an image using the color data of the L*a*b* space is outputted to a CRT display, if the color of the L*a*b* space is converted to the color data of the RGB space peculiar to the CRT display in accordance with characteristics of the CRT display and a color image is displayed, fundamentally, any CRT display can output the same color. When an image using the color data of the L*a*b* space is printed by a printer, if the color of the L*a*b* space is converted to the color of the CMY space peculiar to the printer in accordance with printer characteristics and a color image is printed, any printer can output the same color. Further, when the color data of the RGB space to be displayed on the CRT display is converted to the color data of the CMY space of the printer and a color image is printed, the RGB color data is converted into the L*a*b* color data and the L*a*b* color data is subsequently converted into the CMY color data, so that the same color image as that of a display image on the CRT display can be fundamentally printed by the printer. However, a gamut of the CRT display (hereinbelow, referred to as a display gamut) in the L*a*b* space is largely different from a gamut of the color printer (hereinbelow, referred to as a printer gamut) with respect to both of the width and shape. Many colors which can be displayed by the CRT display but cannot be printed by the color printer exist. Therefore, a color data converting method of converting the color of the CRT display which cannot be printed by the color printer into a color which can be printed is needed.

As such a color data converting method, for example, a method disclosed in JP-A-60-105376 (U.S. Pat. Ser. No. 4,675,704) has been known. FIG. 1 shows a display gamut 100 serving as an L*a*b* gamut corresponding to the RGB space of the general CRT display and a printer gamut 102 serving as an L*a*b* gamut corresponding to the CMY space of the general color printer at a vertical section of a certain hue angle value in the L*a*b* space. An (L*a*b*) value in the display gamut 100, namely, color data is shown by Oi and an (L*a*b*) value in the printer gamut 102, namely, color data is shown by Qi. In this case, i denotes an index of an integer indicative of an arbitrary space position. The printer gamut 102 in FIG. 1 is smaller than the display gamut 100 and, moreover, the positions of a white color Q1 and a black color Q2 in the printer gamut 102 are different as compared with those of a white color O1 and a black color O2 in the display gamut 100.

In the method of JP-A-60-105376, as shown in FIG. 2, as shown by arrows, saturation values of the color data O1 to O9 which are contained in the display gamut 100 and are not contained in the printer gamut 102 are reduced to saturation values in the printer gamut 102 without changing hue angle values and lightness values L*, thereby obtaining the color data Q1 to Q9 contained in the printer gamut 102. In the conventional method, however, even when saturation values a*b* are maximally compressed, for example, from the color data O1 to Q1 or from O9 to Q9, the color data is not included in the printer gamut 102, so that there is a problem that when a color image is printed by the color printer, a color image of the CRT display cannot be reproduced at a high fidelity. As an algorithm to solve the problem, there is a method disclosed in JP-A-61-288662 (U.S. Pat. Ser. No. 4,758,885). In the conventional method, as shown in FIG. 3, lightness values of the color data O1 to O5 included in the display gamut 100 are first compressed toward the center of the gamut as shown by arrows, thereby obtaining color data O11 to O15. The compression of the lightness results in that the shape of the display gamut 100 is deformed to a display gamut 104 surrounded by a broken line. Subsequently, as shown in FIG. 4, saturation values of the color data O11 to O15 are decreased and moved to the printer gamut 102 as shown by arrows, thereby obtaining the color data Q1 to Q5. In the-conventional method of FIGS. 3 and 4, the problem in the conventional method of FIG. 2 that a part of the color data on the CRT display cannot be reproduced by the color printer doesn't occur.

The conventional color data converting methods, however, have the following problems. As for the problem in the conventional method of FIG. 2 that a part of the color data on the CRT display cannot be reproduced by the color printer, as shown in FIG. 5, after the color data Q1 and Q2 were obtained by compressing the saturation values of the color data O1 and O2, by changing the lightness values of the color data Q1 and Q2 toward the center of the printer gamut 102 as shown by arrows, color data Q11 and Q12 included in the printer gamut 102 can be obtained. According to the method, however, all of color data locating in an area 106 which is included in the display gamut 100 and in which the lightness is higher than a highest lightness point in the printer gamut 102 and in an area 108 which is included in the display gamut 100 and in which the lightness is lower than the highest lightness point in the printer gamut 102 in FIG. 6 are concentrated to one point of the color data Q11 or Q12 in the printer gamut 102 in FIG. 5, so that there is a problem that a gradation deterioration occurs.

Problems of the conventional method in FIGS. 3 and 4 will now be described. The printer gamut 102 fundamentally has a "<"-character shape as shown in FIG. 1. However, in a blue region of blue, violet, and purple, the printer gamut 102 has an "L"-character shape as shown by a boundary 110 in FIG. 7. The bottom side portion 110 of an "L"-character shape is inwardly curved. In a yellow region of the printer gamut, as shown in the printer gamut 102 in FIG. 8, it has a reverse "L"-character shape and an upper side portion 112 of the reverse "L"-character shape has a shape that is inwardly curved. When the compression is performed to the "L"-shaped and reverse "L"-shaped printer gamuts 102 in FIGS. 7 and 8 in the lightness direction so as to concentrate the color data to the center of the gamut in accordance with the conventional method in FIGS. 3 and 4, as shown in FIGS. 9 and 10, areas 114 and 116 out of the display gamut 100 after completion of the compression occur in a part of the printer gamut 102. Since the colors included in the printer gamuts 114 and 116 out of the display gamut 100 are not used for printing, a printing of a better quality in which the performance of the printer is fully utilized cannot be obtained. This problem can be solved by changing a compression amount of the lightness value by the saturation value. Specifically speaking, when the compression of the lightness is performed so as to concentrate the color data in the display gamut 100 to the center of the gamut, as shown by lengths of arrows 118 in FIG. 11, as the saturation value increases, a compression ratio of the lightness is decreased. As shown in FIG. 12, the display gamut 104 after the compression completely includes the printer gamut 102. When the method of changing the compression ratio of the lightness value by the saturation value is applied to the method in FIGS. 3 and 4, however, the following problem occurs.

FIG. 13 is an enlarged diagram of low lightness portions of the display gamut 104 and printer gamut 102 when the lightness values are compressed by changing the compression ratio of the lightness value L* by the saturation value as shown in FIG. 11. When the saturation values of the color data O11 to O17 included in the display gamut 104 after the compression are compressed so as to be included in the printer gamut 102, the color data O11 to O13 is compressed to the color data Q1 to Q3 and the color data O14 to O16 is compressed to one color data Q4. Therefore, when the color data O11 to O16 distributed at regular intervals is again compressed in the saturation direction, large color differences occur among the color data O13 and the color data O14 and subsequent color data. When the color image is printed, the color differences cause discontinuity of the gradation, so that it results in a very large problem. Since the color data O14 to O16 has been compressed to the same color data Q4, there is a problem that the gradation deterioration occurs in this portion.

In the conventional method of FIGS. 3 and 4, there is also a problem in a compression function of the lightness. In the conventional method, in order to preserve the gradation in the lightness direction, a compression function of the following equation is used when the lightness is compressed.

$$L_{out} = L_2 + \frac{L_4 - L_1}{L_3 - L_2} \cdot (L_{in} - L_1) \quad (1)$$

$L_1$: lowest lightness value of the display gamut
$L_2$: lowest lightness value of the printer gamut
$L_3$: highest lightness value of the display gamut
$L_4$: highest lightness value of the printer gamut
$L_{out}$: lightness value of color data included in the display gamut before the compression
$L_{in}$: lightness value of the color data after the compression In the compression function, as conditions of the display gamut 100 of the general CRT display and the printer gamut 102 of the general color printer, the relation between the lightness value (lightness value of the display gamut) $L_1$ of the color data before the conversion and the lightness value (lightness value of the printer gamut) $L_2$ of the color data after the conversion in the case where the compression of the lightness is performed by using $L_1$=0.0
$L_2$=30.0
$L_3$=100.0
$L_4$=90.0 is obtained, so that converting characteristics 120 of FIG. 14 are derived. From the converting characteristics 120 of FIG. 14, the gradation in the lightness direction can be preserved by the compression function of the equation (1). As compared with linear characteristics 122 in which there is no change in lightness value, however, as for the color of a low lightness in the color data before the conversion, the lightness value in the color data after the conversion remarkably rises and, as for the color of a high lightness, the lightness value decreases as a whole. Consequently, there is a problem that when a bright color image displayed by the CRT display is printed by the printer, it is darkened as a whole and, when a dark color image is printed by the printer, it is brightened as a whole.

When the above problems are summarized, according to the conventional method of FIG. 2, all of the color data included in the display gamut cannot be converted into the color data included in the printer gamut and the color image of the CRT display cannot be reproduced at a high fidelity by the printer. When it is intended to solve the problem of the reproducibility, there is a problem that the gradation deterioration occurs. In the conventional method of FIGS. 3 and 4, there is a problem that the discontinuity of the gradation and the gradation deterioration occur in the blue and yellow systems.

SUMMARY OF THE INVENTION

According to the invention, there is provided a color data converting method whereby when color data is converted between gamuts which depend on apparatuses and have different sizes, a dropout of color, a fluctuation in lightness of a whole image, discontinuity of gradation, and deterioration in gradation are not caused and a display image and a print image when they are seen are not different.

According to the invention, there is provided a color data converting method of forming second color data included in a second gamut of a second color image apparatus from first color data included in a first gamut of a first color image apparatus. Specifically speaking, there is provided a color data converting method of forming second color data included in a printer gamut (second gamut) in an L*a*b* space corresponding to a CMY space of a printing apparatus such as a color printer or the like from first color data included in a display gamut (first gamut) in the L*a*b* space corresponding to an RGB space of a color displaying apparatus such as a CRT display or the like. According to the invention, the data converting method has a virtual gamut obtaining step, a color data changing step, and a color data forming step.

In the virtual gamut obtaining step, the value of one or more of a lightness value, a saturation value, and a hue angle value of the second gamut are converted and an expanded virtual gamut including all of lightness values of at least the first gamut is derived. In the color data changing step, the value of one or more of the lightness value, saturation value, and hue angle value of the color data which is not included in the virtual gamut among the color data of the first gamut are changed, thereby obtaining third color data included in the virtual gamut. In the color data forming step, a conversion opposite to the conversion performed to the second gamut in the virtual gamut obtaining step is performed to the third color data derived in the color data changing step, thereby forming second color data. According to the color data converting method of the invention, even when the second gamut is narrower than the first gamut, all of the color data of the first gamut serving as a converting source is converted to the color data of the second gamut on the conversion destination side through the color data of the virtual gamut, so that the color data which is not color converted from the first gamut to the second gamut can be eliminated.

Specifically speaking, even when the printer gamut is narrower than the display gamut of the L*a*b* space, since all of the color data of the display gamut as a converting source is converted to the color data of the printer gamut on the conversion destination side through the color data of the virtual gamut, the color data which is not color converted from the display gamut to the printer gamut can be eliminated. In the virtual gamut obtaining step, the second gamut is converted so that the lowest lightness value of the first gamut is equal to that of the second gamut and the highest lightness value of the first gamut is equal to that of the second gamut, thereby deriving the virtual gamut. Due to the color conversion using the virtual gamut, the color data which cannot be color converted is eliminated and the white color in the first color image apparatus can be converted to the white color in the second color image apparatus. Particularly, in the case where the first color image apparatus is a CRT display and the second color image apparatus is a printer, when the white color of the CRT display is printed by the printer, a phenomenon such that ink, toner, or the like is deposited onto a paper and the paper is not seen in white can be prevented. In addition, since black in the first color image apparatus is converted to black in the second color image apparatus, the coincidence of black is also obtained in addition to the coincidence of white, gradation in achromatic color in the first color image apparatus can be reproduced by the second color image apparatus without any partial distortion. It is effective in reproduction of a color image having many achromatic colors, for example, hair in a color image or the like obtained by photographing a human being by a digital camera.

In the virtual gamut obtaining step, the second gamut is expanded only in the direction of the lightness value, thereby deriving a virtual gamut. When the virtual gamut is derived by expanding and compressing the second gamut as mentioned above, the expansion is not performed in the saturation direction but it is performed only in the lightness direction. It is, thus, possible to prevent the reduction of the saturation of the color data in the second gamut formed through the virtual gamut in the color data forming step in the case where-the first gamut is remarkably larger than the second gamut as in a case where, particularly, the first color image apparatus is a CRT display and the second color image apparatus is a color printer.

In the virtual gamut obtaining step, in the second gamut in which the saturation gamut is equal to or less than an almost intermediate predetermined lightness value between the highest lightness value and the lowest lightness value in the second gamut, the expansion is performed by increasing an expansion amount in an exponential function manner in accordance with a decrease in lightness, thereby obtaining the virtual gamut. With this method, an increase in lightness that is caused when the color data in a low lightness portion of the first gamut before the conversion is converted to the color data of the second gamut through the virtual gamut is suppressed, a situation such that the whole color image after the conversion becomes bright can be prevented and the gradation in the lightness direction can be preserved without deteriorating the gradation.

In the virtual gamut obtaining step, in the second gamut of lightness which is equal to or larger than a predetermined lightness value that is substantially an intermediate value between the highest lightness value and the lowest lightness value of the second gamut, the expansion is performed by increasing the expansion amount in an exponential function manner in accordance with the increase in lightness, thereby deriving a virtual gamut. With this method, the decrease in lightness when the color data of high lightness included in the first gamut before the conversion is converted to that in the second gamut through the virtual gamut is suppressed, it is possible to prevent that the whole color image becomes dark and the gradation in the lightness direction can be preserved without deteriorating the gradation.

The virtual gamut obtaining step has a gamut expansion restricting step of reducing the absolute value of the expansion of the lightness value as the saturation value of the color data at a location where the expansion is performed in the second gamut is larger. In this manner, in the virtual gamut obtaining step, when the virtual gamut is derived, by restricting so as to reduce the absolute value for expanding the second gamut as the saturation value is larger in the second gamut, the virtual gamut with a "<"-character shape corresponding to the first gamut can be derived from the second gamut of an "L"-character shape in which the bottom surface is inwardly curved and the color data of the second gamut can be derived from the color data arranged at regular intervals in the first gamut through the virtual gamut without causing discontinuity of the gradation and deterioration of the gradation.

In the gamut expansion restricting step, the absolute value of the expansion of the lightness value is reduced in accordance with a function proportional to the saturation value. When the virtual gamut is derived in the virtual gamut obtaining step in this manner, by restricting in a manner such that as the saturation value is larger, the absolute value to expand the second gamut is reduced by a function proportional to the saturation value within the second gamut, the virtual gamut having the "<"-character shape corresponding to the first gamut can be derived from the second gamut having an "L"-character shape in which the bottom surface is curved inwardly. After the color data arranged at regular intervals in the first gamut was changed to the color data of the virtual gamut, by converting the resultant data into the color data in the second gamut by using a function opposite to the function used to derive the virtual gamut, the problem that the discontinuity of gradation and the deterioration of gradation occur is also eliminated.

In the gamut expansion restricting step, an absolute value of the expansion of the lightness value is decreased in an exponential function manner in accordance with the increase in saturation value. In this manner, when the virtual gamut is derived in the virtual gamut obtaining step, by restricting so as to decrease the absolute value of the expansion of the lightness value in an exponential function manner in accordance with the increase in saturation value within the second gamut, the virtual gamut having a "<"-character shape corresponding to the first gamut can be derived from the second gamut having an "L"-character shape in which the bottom surface is curved inwardly. After the color data arranged at regular intervals in a "<"-character shape in the first gamut was changed to the gamut in the virtual gamut, by converting the resultant data into the color data in the second gamut by using a function opposite to the exponential function used to derive the virtual gamut, the problem that the discontinuity of gradation and the deterioration of gradation occur is eliminated and the saturation value can be further preserved.

According to the color data converting method of the invention, as a specific example, the first gamut is a display gamut of the RGB color space which is used in the color displaying apparatus in the L*a*b* color space. The second gamut is a printer gamut corresponding to the CMY color space which is used in the color printing apparatus in the L*a*b* color space. The virtual gamut is a gamut expanded so as to contain at least all of the lightness values of the display gamut by converting one or more of the lightness value, saturation value, and hue angle value of the printer gamut. When the color data of the RGB space to be displayed on the CRT display is converted to color data of the CMY space of the printer, the color data converting method of the invention is as follows.

First, in the virtual gamut obtaining step, an RGB/display gamut conversion table, a printer gamut/CMY conversion table, and a virtual gamut/CMY conversion table are formed. The RGB/display gamut conversion table is a conversion table for converting the color data of the RGB space into color data of the display gamut in the L*a*b* color space. The printer gamut/CMY conversion table is a conversion table for converting color data of the printer gamut in the L*a*b* color space into color data of the CMY space. Further, the virtual gamut/CMY conversion table is a conversion table for deriving the expanded virtual gamut so as to contain at least all of the lightness values of the display gamut by converting one or more of the lightness value, saturation value, hue angle value of the printer gamut, converting the color data of the virtual gamut into color data of the CMY space, and converting color data out of the virtual gamut into specific identification values out of the gamut. In the next color data changing step, after the color data of the RGB space was converted to color data of the display gamut in the L*a*b* color space by the RGB/display gamut conversion table, one or more of the lightness value, saturation value, and hue angle value of the color data which is not included in the virtual gamut in the color data of the display gamut are changed until they are not converted into the identification values out of the gamut by the virtual gamut/CMY conversion table, thereby deriving third color data included in the virtual gamut. Finally, in the color data forming step, a conversion opposite to the conversion performed to the printer gamut in the virtual gamut obtaining step is executed to the third color data derived in the color data changing step, thereby forming second color data. The second color data is converted to color data of the CMY space by the printer gamut/CMY conversion table and the converted data is outputted to the color printing apparatus. Therefore, all of the color data contained in the display gamut can be converted to color data contained in the printer gamut. When the white color of the CRT display is printed by the printer, a situation such that ink, toner, or the like is deposited onto the paper and the paper is not seen as white can be prevented. The achromatic color gradation on the CRT display can be reproduced by the printer without a deterioration of a part thereof. When a color image of the CRT display is reproduced by the printer, it is possible to guarantee the prevention of reduction of the saturation, the prevention of the change in lightness of the whole image, the prevention of deterioration of the gradation in the lightness direction, and the preservation of the saturation.

The above and other objects, features, and advantages of the present invention will become more apparent from the following detailed description with reference to the drawings.

BRIEF DESCRIPTION OF THE DRAWINGS

FIG. 43 is an explanatory diagram of a color data changing step subsequent to FIG. 42;

DETAILED DESCRIPTION OF THE PREFERRED EMBODIMENT

Figure 15:
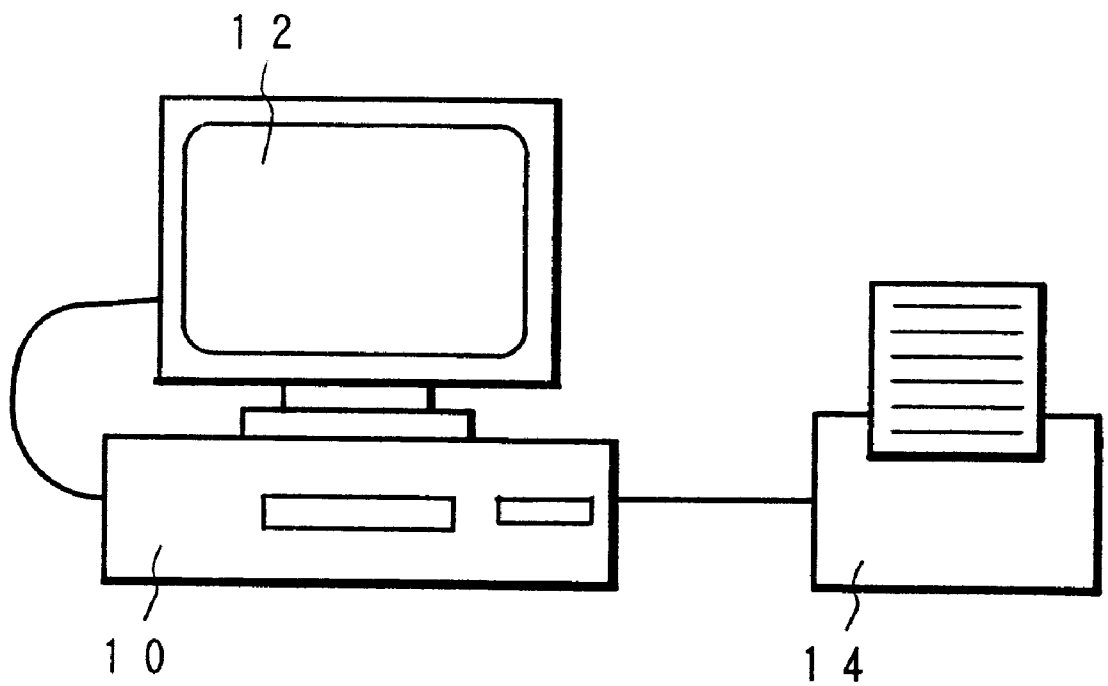
FIG. 15 is an explanatory diagram of a computer apparatus to which a converting method of the invention is applied.

FIG. 15 shows an example of an apparatus construction to which a color data converting method of the invention is applied and shows an example of a general personal computer and its peripheral equipment. An application program to realize a color data converting method of the invention has been installed in a personal computer 10. An image displaying apparatus 12 such as a CRT display or the like and an image printing apparatus 14 such as a color printer or the like are connected to the personal computer 10. The image displaying apparatus 12 displays an image by color data of the RGB colorimetric system. The image printing apparatus 14 prints a color image by color data of the CMY colorimetric system. Therefore, color image data in which each pixel is constructed by RGB color data to display a color image onto the image displaying apparatus 12 and color image data in which each pixel is constructed by CMY color data to print a color image by the image printing apparatus 14 have been stored in the personal computer 10 by a storing device such as a hard disk drive or the like. The personal computer 10 sends color data serving as RGB values of each pixel of the RGB color image data as a driving signal to the image displaying apparatus 12, thereby allowing a color image to be displayed. The personal computer 10 also sends color data serving as CMY values of each pixel of the CMY color image data to the image printing apparatus 14 as a printer control signal, thereby allowing a color image to be printed.

Figure 16:
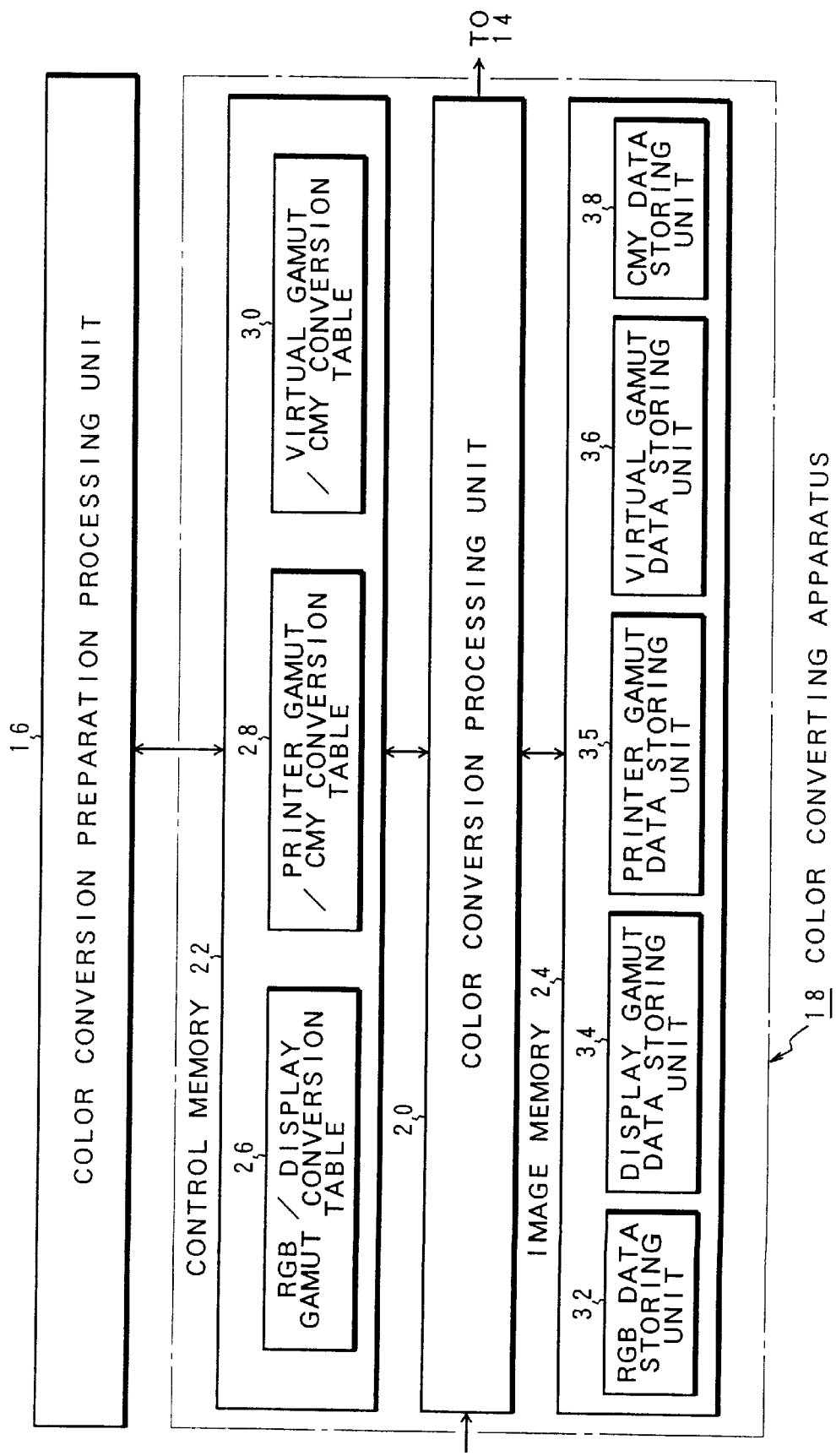
FIG. 16 is a functional block diagram of an apparatus construction to realize the converting method of the invention.

FIG. 16 is a functional block diagram of an apparatus construction to which a color data converting method of the invention is applied. An apparatus to realize the color data converting method of the invention can be mainly divided into a color conversion preparation processing unit 16 and a color converting apparatus 18. The color converting apparatus 18 can be realized by, for example, the personal computer 10 in FIG. 15 and has a color conversion processing unit 20, a control memory 22, and an image memory 24. The color conversion processing unit 20 converts RGB image data to display a color image onto the image displaying apparatus 12 in FIG. 15 into CMY image data of the image printing apparatus 14 via the L*a*b* space. The color data converting method of the invention is used as a color data converting process for converting from the RGB image data to the CMY image data. For the color data conversion by the color conversion processing unit 20, an RGB/Lab conversion table 26, an Lab/CMY conversion table 28, and further, a virtual gamut discriminating Lab/CMY conversion table 30 that is peculiar to the converting method of the invention are stored in the control memory 22. Each of the RGB/Lab conversion table 26, Lab/CMY conversion table 28, and Lab/CMY conversion table 30 for discriminating the virtual gamut is formed via a process of a preparing step by the color conversion preparation processing unit 16 and stored into the control memory 22 of the color converting apparatus 18. The RGB/Lab conversion table 26 converts the color data of the RGB space to display a color image onto the image displaying apparatus 12 in FIG. 15 into the color data of the L*a*b* color space which does not depend on the equipment. The Lab/CMY conversion table 28 converts the color data of the L*a*b* color space into the color data of the CMY space to print a color image by the image printing apparatus 14 in FIG. 15. Further, the Lab/CMY conversion table 30 for discriminating the virtual gamut is used for conversion of the color data in the L*a*b* color space in the invention and will be explained in detail herein later. The image memory 24 has an RGB data storing unit 32, a display gamut data storing unit 34, a printer gamut data storing unit 35, a virtual gamut data storing unit 36, and a CMY data storing unit 38. Color image data in which the color data of the RGB space to display a color image onto the image displaying apparatus 12 in FIG. 15 is used as a pixel has been stored in the RGB data storing unit 32. Color image data in which the color data of the CMY space to print a color image by the image printing apparatus 14 in FIG. 15 is used as a pixel has been stored in the CMY data storing unit 38. The display gamut data storing unit 34, printer gamut data storing unit 35, and virtual gamut data storing unit 36 store color data having (L*a*b*) values before conversion, during conversion, and after conversion in the color conversion of the L*a*b* space to which the color data converting method of the invention is applied.

Figure 17:
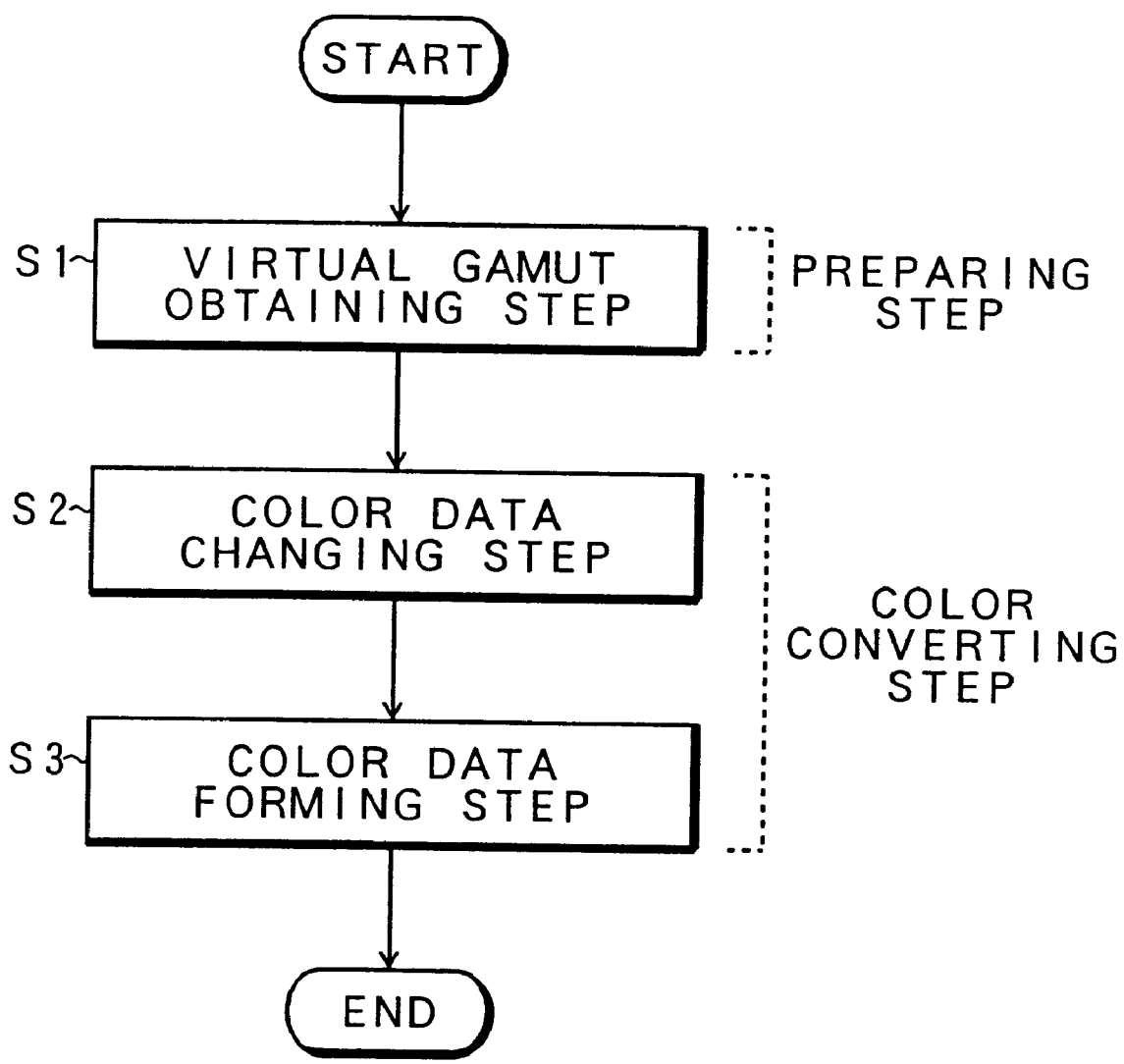
FIG. 17 is a flowchart for the whole converting method of the invention.

FIG. 17 is a flowchart for a fundamental processing procedure of the color data converting method of the invention. The color data converting method of the invention has a virtual gamut obtaining step of step S1, a color data changing step of step S2, and a color data forming step of step S3. Among them, the virtual gamut obtaining step of step S1 is a preparing step and the next color data changing step and the color data forming step of steps S2 and S3 are a color converting step. When considering the correspondence to the functional block of the apparatus construction in FIG. 16, the preparing step as a virtual gamut obtaining step of step S1 is performed in the color conversion preparation processing unit 16. The color converting step including the next color data changing step and the color data forming step of steps S2 and S3 is performed in the color converting apparatus 18.

Figure 18:
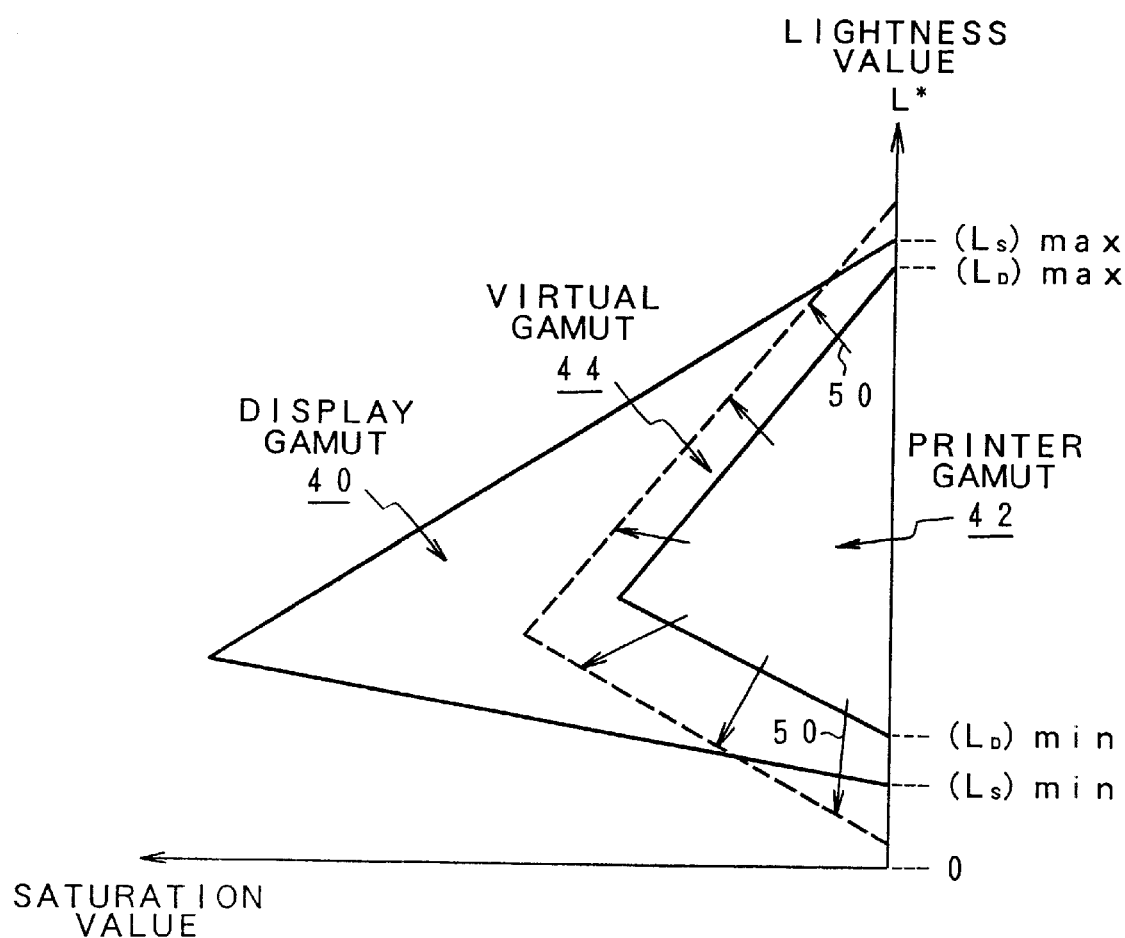
FIG. 18 is an explanatory diagram of a virtual gamut obtaining step of obtaining a virtual gamut from a printer gamut in the first embodiment of the invention.

FIG. 18 shows the first embodiment as a foundation of the color data converting method of the invention and is a cross sectional view at a certain hue angle of the L*a*b* color space. A display gamut 40 and a printer gamut 42 are shown in FIG. 18. The display gamut 40 is an area of the L*a*b* color space corresponding to the RGB color space of the color data that is used in the image displaying apparatus 12 in FIG. 15. Specifically speaking, the display gamut 40 is an area where the Lab color data converted from the RGB color data by the RGB/display gamut conversion table 26 in FIG. 16 exists. The printer gamut 42 is likewise an area of the L*a*b* color space corresponding to the color data of the CMY color space that is used to print a color image by the image printing apparatus 14 in FIG. 15. Specifically speaking, the printer gamut 42 is an area where the Lab color data corresponding to the CMY color data of the printer gamut/CMY conversion table 28 in FIG. 16 exists. In the display gamut 40, the highest lightness value $(L_S)$max is generally equal to about 100 and the lowest lightness value $(L_S)$min is usually equal to about 1 to 10. In this example, a value near 10 is used. The highest lightness value $(L_D)$max of the printer gamut 42 is equal to about 90 and the lowest lightness value $(L_D)$min is usually equal to about 30. As for a saturation value shown on an axis of abscissa, although the highest value of the display gamut 40 is equal to, for instance, 125, the highest value of the printer gamut 42 is equal to a value of about 50, which is equal to or less than the half of such a highest value.

Figure 19:
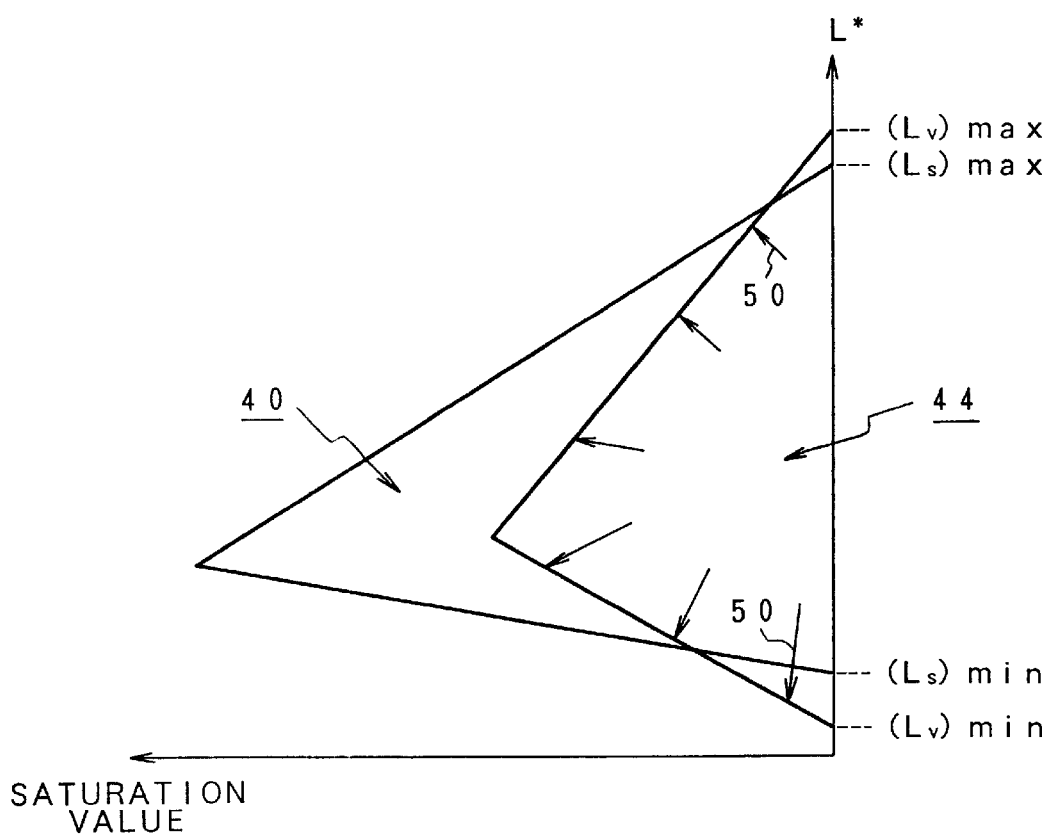
FIG. 19 is an explanatory diagram of the virtual gamut converted from the printer gamut in FIG. 18.

In the color data converting method of the invention, in the virtual gamut obtaining step shown in step S1 in FIG. 17, as shown by arrows 50 in FIG. 18, a virtual gamut 44 shown in FIG. 19 is derived by expanding and compressing the printer gamut 42 by a predetermined function. When the virtual gamut 44 is derived from the printer gamut 42, the virtual gamut 44 is obtained by the conversion using a predetermined function so that the highest lightness value $(L_S)$max and the lowest lightness value $(L_S)$min of the display gamut 40 are included between the highest lightness value $(L_V)$max and the lowest lightness value $(L_V)$min of the virtual gamut 44.

Figure 20:
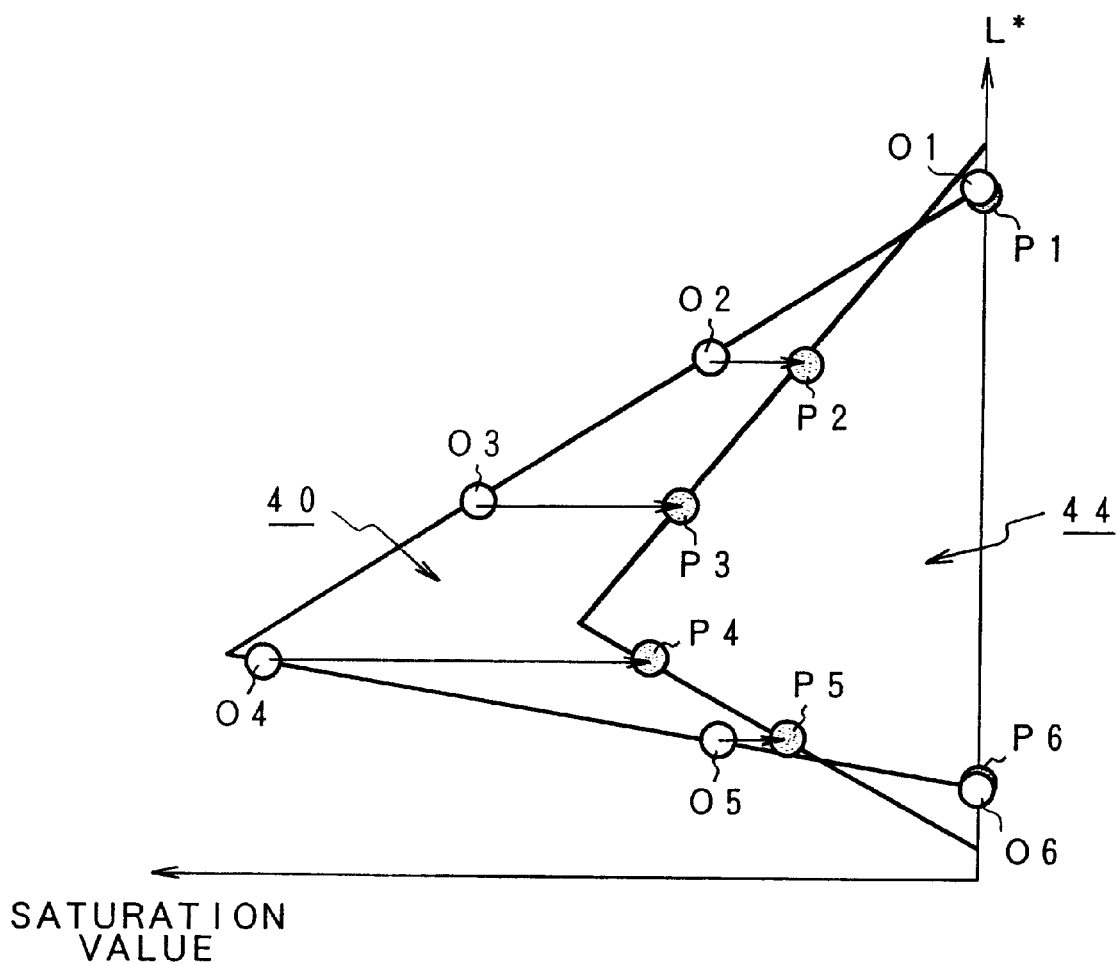
FIG. 20 is an explanatory diagram of a color data changing step of inversely converting color data from the virtual gamut to the printer gamut which is performed subsequently to FIG. 19.

In the color data changing step of step S2 in FIG. 17, as shown in FIG. 20, color data P2 to P5 included in the virtual gamut 44 is derived by changing any one or more of the lightness value L*, saturation value, and hue angle value for the color data O2 to O5 positioning out of the virtual gamut 44 among the color data O1 to O6 included in the display gamut 40. In this case, by decreasing only the saturation value, the color data O2 to O5 of the display gamut 40 is changed to the color data P2 to P5 included in the virtual gamut 44. As for the color data of the display gamut 40 which has already been included in the virtual gamut 44 before change, it can be also used as it is as color data of the virtual gamut 44 without changing the values of the lightning value, saturation value, and hue angle value or it can be also changed to the color data of the virtual gamut 44 by changing one or more of the lightness value, saturation value, and hue angle value under a restriction such that it is not located out of the virtual gamut 44. In case of FIG. 20, with respect to the color data of the display gamut 40 which has already been included in the virtual gamut 44, it is set as it is to the color data of the virtual gamut 44 without changing the values.

Figure 21:
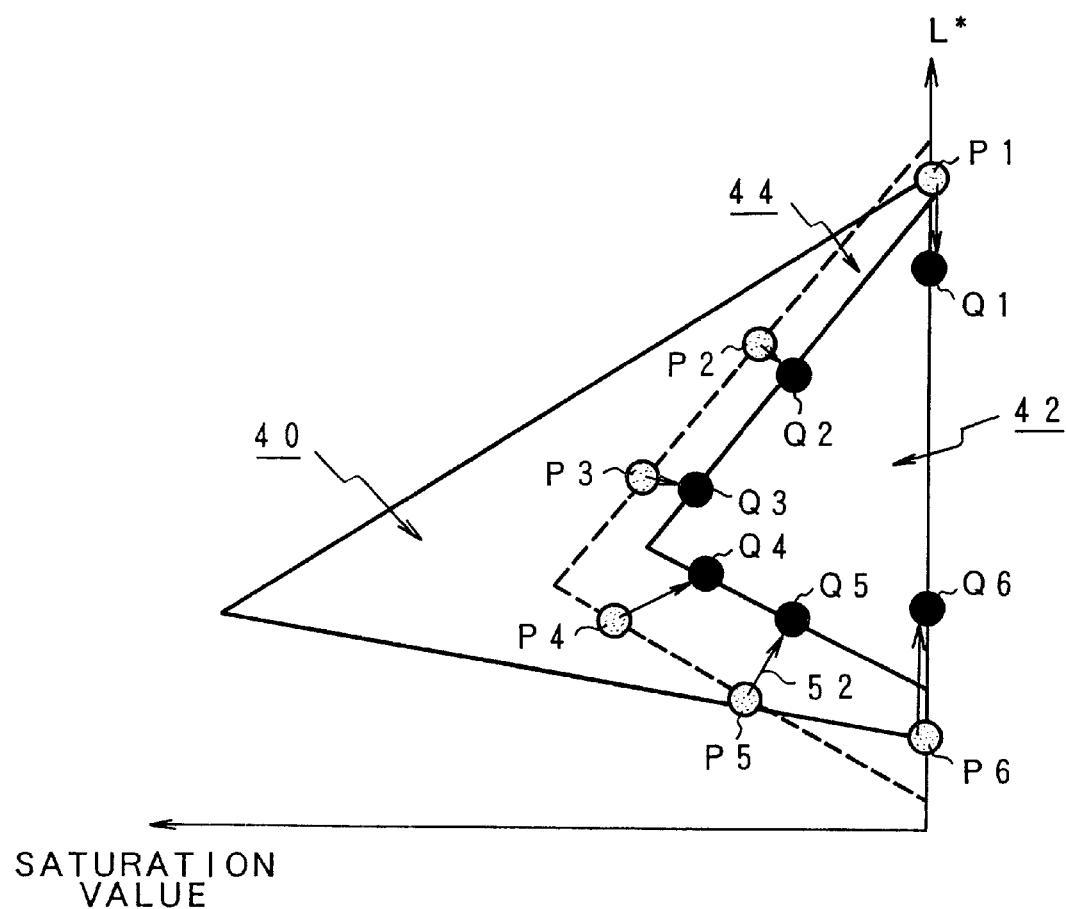
FIG. 21 is an explanatory diagram of a color data converting step which is performed subsequently to FIG. 20.

The processing routine advances to the color data forming step of step S3 in FIG. 17. In the color data forming step, as shown in FIG. 21, to the color data P1 to P6 changed to the virtual gamut 44, an inverse conversion shown by arrows 52 is performed by using an inverse function of a predetermined function used to derive the virtual gamut 44 from the printer gamut 42 in FIGS. 18 and 19, thereby obtaining the color data Q1 to Q6 included in the printer gamut 42. According to the first embodiment of the color data converting method of the invention shown in FIGS. 18 to 21, all of the color data in the display gamut 40 is converted into the color data in the printer gamut 42 narrower than the display gamut 40 through the color data of the virtual gamut 44. When the color data is converted from the display gamut 40 to the printer gamut 44, the color data which cannot be color converted is eliminated.

Figure 22:
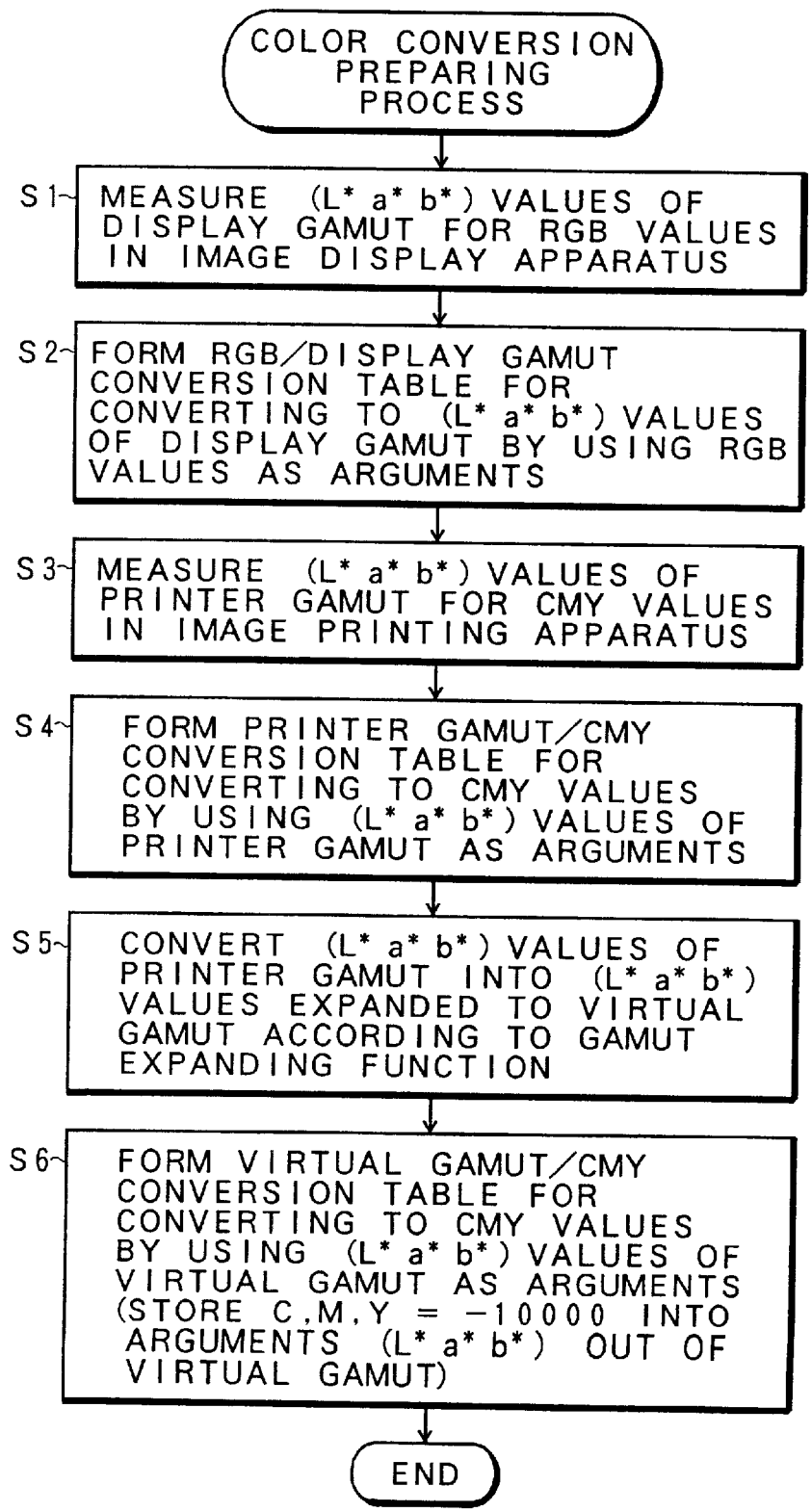
FIG. 22 is a flowchart for a color conversion preparing process in FIG. 17.
Figure 23A:
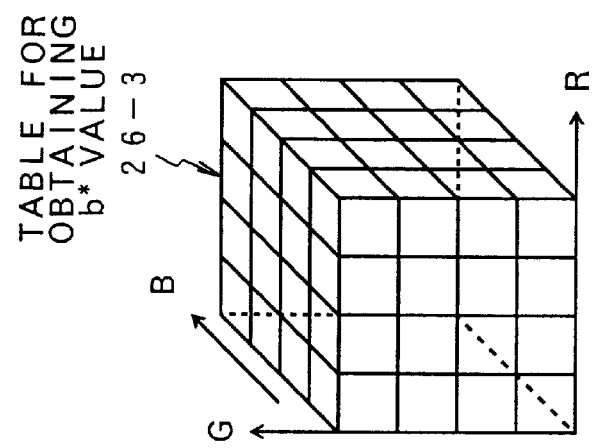
FIGS. 23A to 23C are explanatory diagrams of RGB/display gamut conversion tables which are formed by the color conversion preparing process in FIG. 17.
Figure 23B:
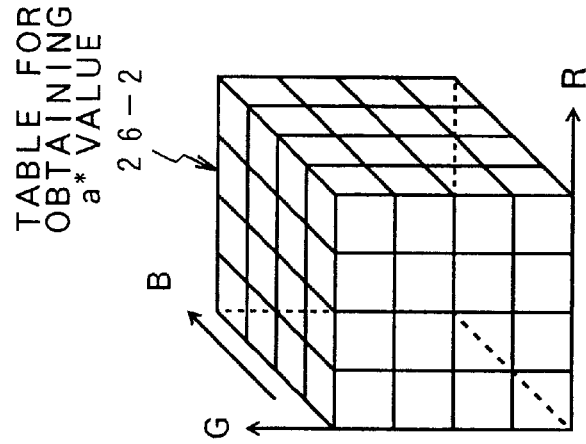
Figure 23C:
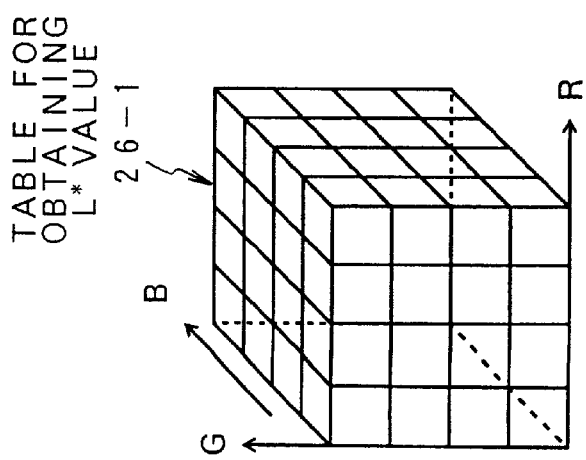
Figure 24A:
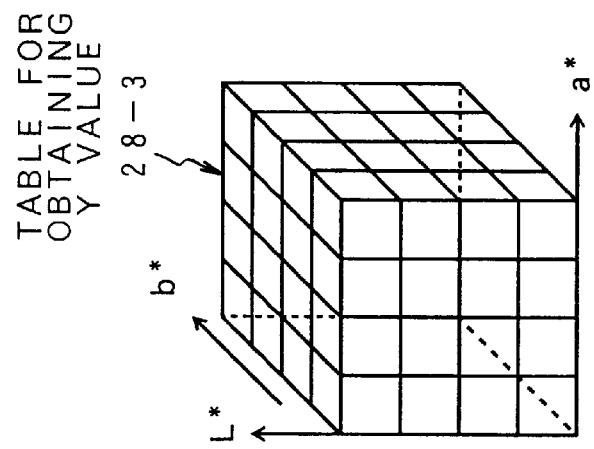
FIGS. 24A to 24C are explanatory diagrams of printer gamut/CMY conversion tables which are formed by the color conversion preparing process in FIG. 17.
Figure 24B:
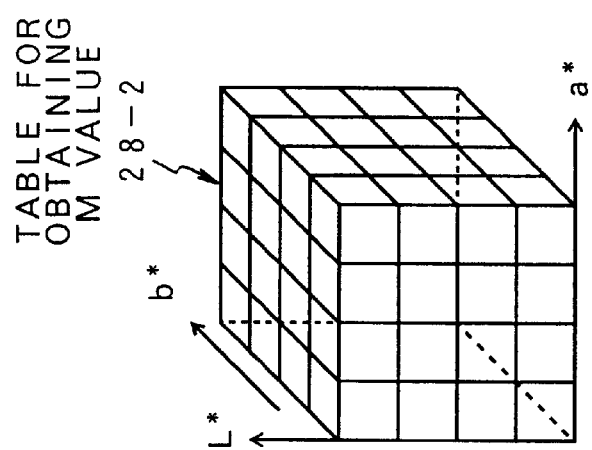
Figure 24C:
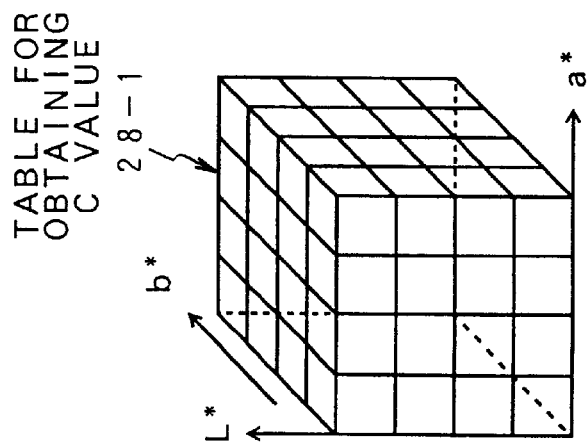

FIG. 22 is a flowchart of a specific example of the color conversion preparing process as a virtual gamut obtaining step of step S1 in FIG. 17. First in processes of steps S1 and S2, the RGB/Lab conversion table 26 stored in the control memory 22 in FIG. 16 is formed. In step S1, the (L*a*b*) values of the display gamut 40 for the RGB values to display the color image in the image displaying apparatus 12 in FIG. 15 are measured. Specifically speaking, a driving signal corresponding to a plurality of RGB values is sent to the image displaying apparatus 12, the color displayed on the image displaying apparatus 12 is measured by a measuring instrument, and (L*a*b*) values, CIEXYZ values, or the like are measured. When the CIEXYZ values are measured, they are converted into the (L*a*b*) values by a calculating equation. In this case, although it is ideal to measure all of measurement values which the values of the RGB color data can have as for the color data to be measured, the total number of RGB values having values of 0 to 255 is equal to $256^3$=16.777 million colors and it is practically impossible to measure all of them. Therefore, actually, by displaying each of the RGB values every 33rd value, about $9^3$=729 colors are displayed and the values are measured. In this case, upon color conversion, it is necessary to perform an interpolating calculation to obtain the (L*a*b*) values corresponding to the RGB values which are not measured. In step S2, the RGB values used for the measurement are used as arguments and the RGB/display gamut conversion table 26 to convert into the (L*a*b*) values of the display gamut 40 obtained as a measurement result is formed. The RGB/ display gamut conversion table 26 is actually constructed by: an L* value obtaining table 26-1, an a* value obtaining table 26-2, and a b* value obtaining table 26-3 in which an L* value, an a* value, and a b* value have been stored at coordinates positions (lattice points) in a 3-dimensional space using the respective RGB values as arguments as shown in FIGS. 23A to 23C, respectively. In steps S3 and S4, the printer gamut/CMY conversion table 28 to be stored in the control memory 22 in FIG. 16 is formed. First in step S3, the (L*a*b*) values of the printer gamut corresponding to the CMY values which are used to print a color image by the image printing apparatus 14 in FIG. 15 are measured. Specifically speaking, a printer control signal corresponding to a plurality of CMY values is sent to the image printing apparatus 14, the color printed by the image printing apparatus 14 is measured by the measuring instrument, and the (L*a*b*) values are obtained. In this case as well, although it is ideal to measure all of the CMY values of the possible number of measurement colors, the number of values to be measured is equal to $256^3$=16.777 million colors and it is practically impossible to measure all of them. Therefore, with respect to each of the CMY values, about $9^3$=729 colors are actually measured every 33rd color. In step S4, the printer gamut/CMY conversion table 28 to convert from the (L*a*b*) values of the printer gamut to the CMY values is formed. As shown in FIGS. 24A to 24C, the printer gamut/CMY conversion table 28 is constructed by three tables of a C value obtaining table 28-1, an M value obtaining table 28-2, and a Y value obtaining table 28-3 having a 3-dimensional arrangement in which the CMY values have been stored at the 3-dimensional coordinate positions (lattice points) by using the L*a*b* values as arguments.

Although the RGB/display gamut conversion table 26 is a table for converting the RGB color data which depends on the image displaying apparatus into the L*a*b* color data which does not depend on the equipment, the printer gamut/CMY conversion table 28 is a table for converting the color data of the (L*a*b*) values which does not depend on the equipment into the CMY color data which depends on the image printing apparatus. In case of obtaining the CMY color data by the printer gamut/CMY conversion table 28 and an interpolating calculation in the color converting step of steps S2 and S3 in FIG. 17, the coordinate values of L*a*b* need to be arranged at regular lattice intervals. However, the values of L*a*b* of the printer gamut corresponding to the CMY values measured in step S3 are not arranged at regular lattice intervals like the values of C, M, and Y. Therefore, a calculation to obtain the CMY values for the (L*a*b*) values arranged in a lattice form is necessary. This calculation is disclosed in, for example, JP-A-7-0954315 (U.S. Pat. No. 5,625,378). In the printer gamut/CMY conversion table 28, only the CMY values for the (L*a*b*) values existing in the printer gamut 42 in FIG. 18 are valid and the CMY values corresponding to the (L*a*b*) values out of the printer gamut 42 are not obtained. In this case, in the printer gamut/CMY conversion table 28, the CMY values of (−10000, −10000, −10000) are stored at the storing position of the (L*a*b*) values existing out of the printer gamut 42 as out-of-area identification values showing that they exist in the outside of the printer gamut 42. Thus, in the printer gamut/CMY conversion table 28, all of the corresponding CMY values with regard to the color data of (L*a*b*) existing in the printer gamut 42 have the values of 0 to 255 and the values can be normally converted from the (L*a*b*) values to the CMY values. On the other hand, when the (L*a*b*) values exist in the outside of the printer gamut 42, any one of the CMY values has a value out of the range of 0 to 255. Therefore, they can be used to discriminate whether certain (L*a*b*) values exist in or out of the printer gamut 42.

In steps S5 and S6 in FIG. 22, the virtual gamut/CMY conversion table 30 which is stored in the control memory 22 in FIG. 16 is formed. That is, in step S5, the measurement values of the (L*a*b*) values of the printer gamut formed in step S4 are converted into the (L*a*b*) value expanded to the virtual gamut 44 in accordance with a gamut expanding function which is used to obtain the virtual gamut 44 from the printer gamut 42 in FIGS. 18 and 19. Specifically speaking, the measured (L*a*b*) values for certain CMY values are converted into the (L*a*b*) values of the virtual gamut 44 by a color conversion expanding function. In step S6, the (L*a*b*) values of the virtual gamut 44 converted in step S5 are used as arguments and the virtual gamut/CMY conversion table 30 to convert into CMY values similar to those in case of FIGS. 24A to 24C is formed. In the virtual gamut/CMY conversion table 30 as well, although the CMY values are arranged in a lattice shape in a manner similar to the printer gamut/CMY conversion table 28 formed in step S4, the (L*a*b*) values converted to the virtual gamut are not arranged in a lattice shape. Therefore, in case of obtaining the CMY values by the virtual gamut/CMY conversion table 30 and an interpolating calculation, a calculation to obtain the CMY values for the (L*a*b*) values arranged in a lattice shape is performed by the calculation disclosed in JP-A-7-095431 (U.S. Pat. No. 5,625,378). In the virtual gamut/CMY conversion table 30, as CMY values corresponding to the (L*a*b*) values out of the virtual gamut 44 in FIG. 19, for example, the CMY values of (−10000, −10000, −10000) are stored as out-of-area identification values other than 0 to 255 as valid CMY values in a manner similar to the printer gamut/CMY conversion table 28 formed in step S4. Thus, when the color data having certain (L*a*b*) values exists out of the virtual gamut 44, any one of the CMY values has a value out of the range of 0 to 255. These values can be used to discriminate whether certain (L*a*b*) values exist in or out of the virtual gamut 44.

Figure 25:
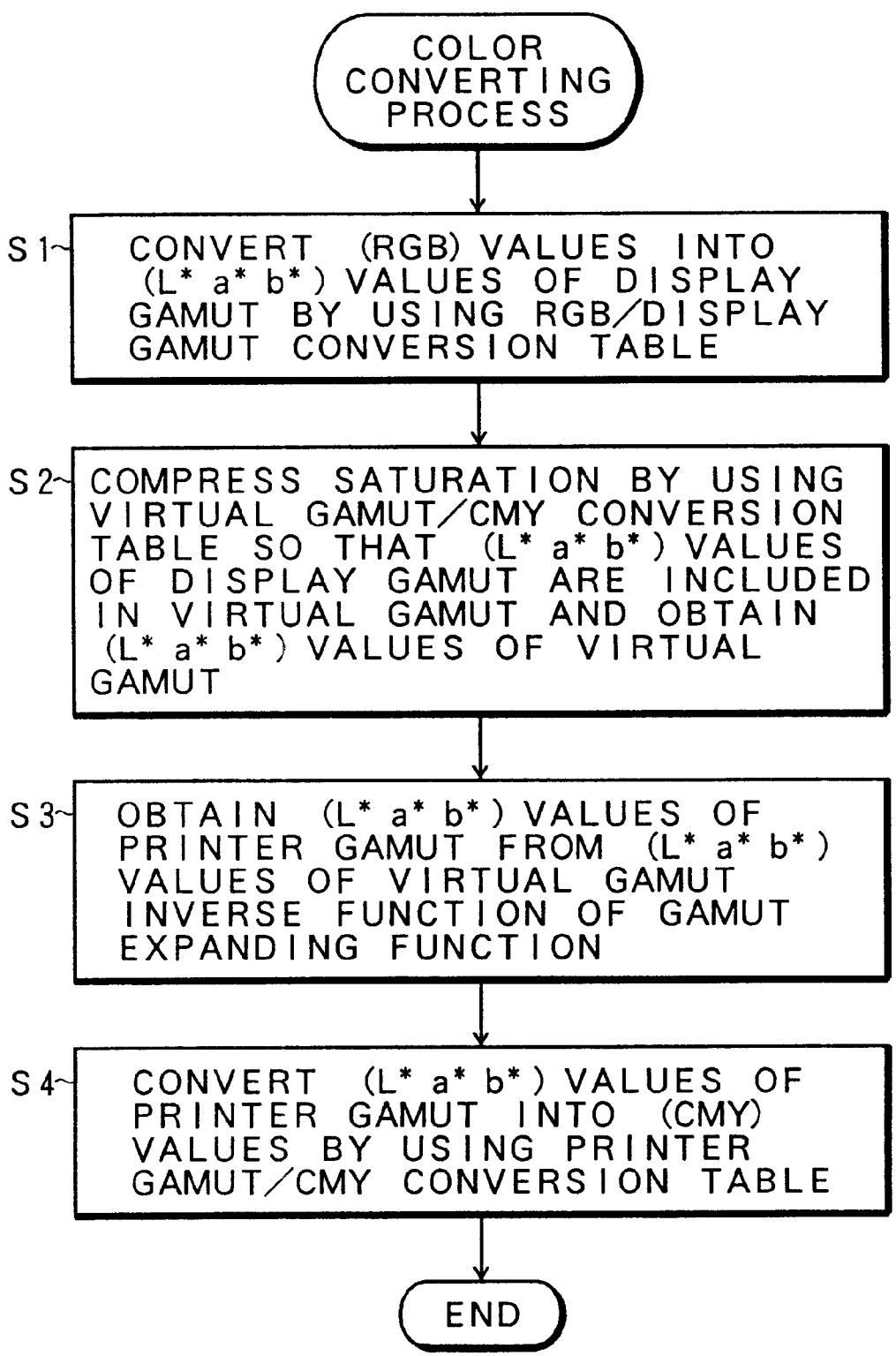
FIG. 25 is a flowchart for a color converting process including a color data changing step and a color data converting step in FIG. 17.

FIG. 25 is a flowchart showing a specific example of the color converting step of steps S2 and S3 in FIG. 17. If the RGB/display gamut conversion table 26, the printer gamut/CMY conversion table 28, and the virtual gamut/CMY conversion table 30 could be stored in the control memory 22 of the color converting apparatus 18 in FIG. 16 in the color conversion preparing step in FIG. 22, the color data changing process in steps S1 and S2 in FIG. 25 and the color data forming process in steps S3 and S4 are performed. First, in the color data changing process, the RGB color data expressed by the RGB colorimetric system is converted into the color data as (L*a*b*) values of the display gamut which is expressed by the L*a*b* colorimetric system by using the RGB/display gamut conversion table 26 in step S1. Specifically speaking, the color conversion processing unit 20 of the color converting apparatus 18 in FIG. 16 extracts the RGB color data on a pixel unit basis from the RGB image data prepared in the RGB data storing unit 32 in the image memory 24, reads out the (L*a*b*) values of the corresponding printer gamut from the RGB/display gamut conversion table 26 in the control memory 22, and stores them into the display gamut data storing unit 34. In step S2, for example, the saturation value is reduced so that the hue angle is made constant while using the virtual gamut/CMY conversion table for the discrimination of the virtual gamut in a manner such that the (L*a*b*) values of the display gamut 40 are included in the virtual gamut 44, and the (L*a*b*) values included in the virtual gamut 42 are obtained. Specifically speaking, the (L*a*b*) values of the display gamut as a conversion target are used as arguments and the corresponding CMY values are obtained from the virtual gamut/CMY conversion table 30. If all of the CMY values lie within a range of 0 to 255, they are used as (L*a*b*) values of the virtual gamut as they are. On the other hand, if any one of the CMY values obtained from the table is a value out of the range of 0 to 255, the virtual gamut/CMY conversion table 30 is referred while decreasing the saturation values of the (L*a*b*) values of the display gamut by a predetermined value at a time, and the reduction of the saturation values is repeated until all of the CMY values lie within the range of 0 to 255. When all of the CMY values lie within the range of 0 to 255, the (L*a*b*) values are derived as values of the virtual gamut. Each of the color data of the (L*a*b*) values converted into the virtual gamut as mentioned above is stored into the virtual gamut data storing unit 36 provided in the image memory 24 in FIG. 16.

In steps S3 and S4 in FIG. 25, a color data forming process to print a color image by the image printing apparatus is performed. First in step S3 in FIG. 25, with respect to the color data changed from the display gamut 40 to the virtual gamut 44, the (L*a*b*) values of the printer gamut 42 are obtained by an inverse function of the gamut converting function in case of obtaining the virtual gamut 44 from the printer gamut 42. When the color data can be converted from the virtual gamut 44 to the (L*a*b*) values of the printer gamut 42 in step S3 as mentioned above, the (L*a*b*) values of the printer gamut are finally converted into the CMY values by using the printer gamut/CMY conversion table 28 in step S4. With respect to the color data generation in steps S3 and S4, in FIG. 16, the color converting apparatus 18 stores the color data of the (L*a*b*) values of the printer gamut converted in step S3 into the printer gamut data storing unit 35. In step S4, subsequently, the converted color data of the CMY values is stored into the CMY data storing unit 38. Finally, the converted color data in the CMY data storing unit 38 is outputted as a printer control signal to the image printing apparatus 14 and a color image is printed. Thus, a color print image which can be seen in substantially the same manner as the color display image based on the RGB color data stored in the RGB data storing unit 32 can be obtained. In step S2 in FIG. 25, although the saturation value compression is performed with respect to the change from the display gamut 40 to the virtual gamut 44, it will be obviously understood that the lightness value or hue angle value except for the saturation value can be also changed.

Figure 26:
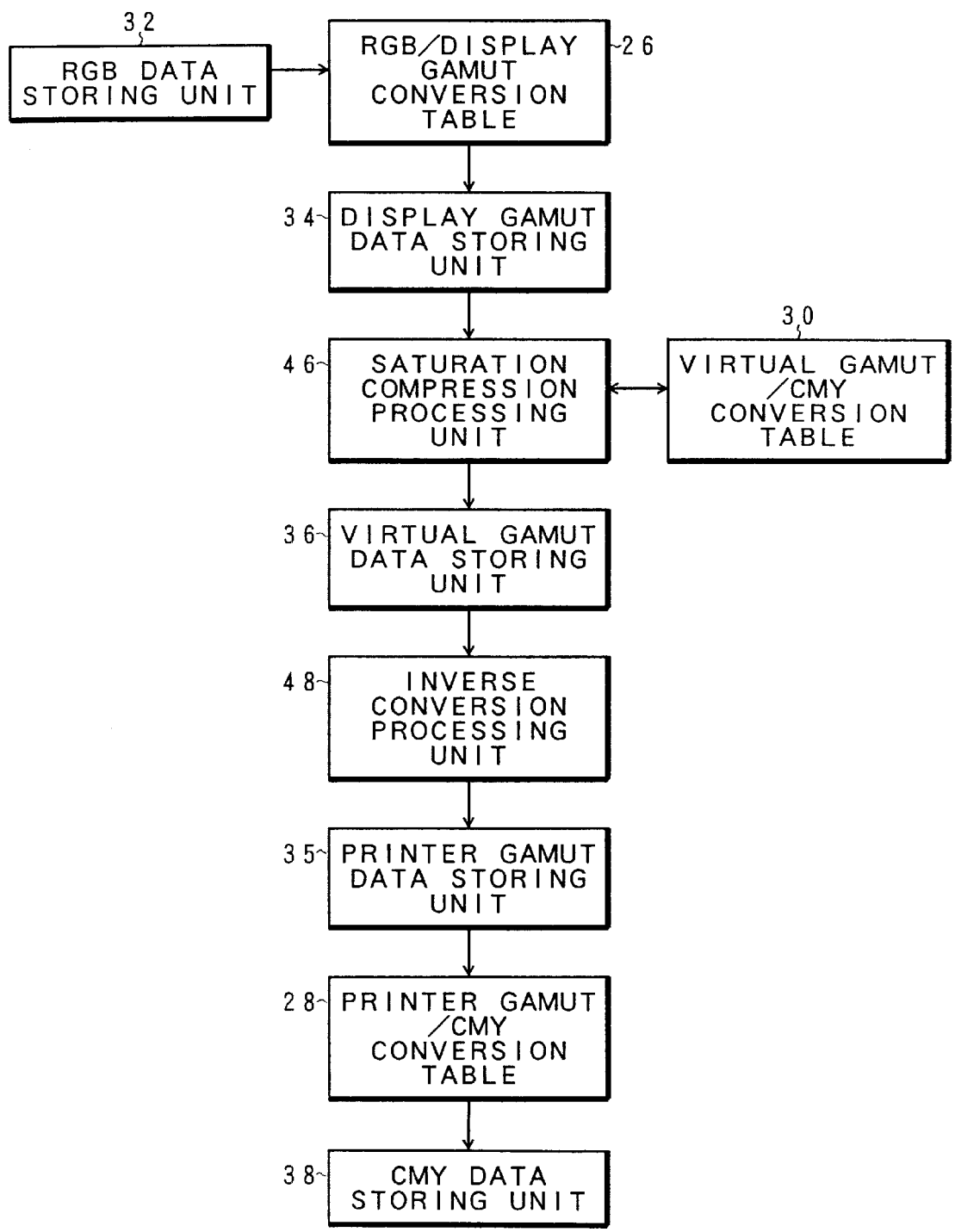
FIG. 26 is an explanatory diagram of a converting function of color data from a display gamut to a virtual gamut in the first embodiment of the invention in the apparatus construction in FIG. 16.

FIG. 26 is a block diagram of a processing function in the color converting apparatus 18 in FIG. 16 corresponding to the color converting process in FIG. 25. In FIG. 26, the color data of the RGB values stored in the RGB data storing unit 32 is converted into the (L*a*b*) values of the L*a*b* color space by the RGB/display gamut conversion table 26 and stored into the display gamut data storing unit 34. Subsequently, the saturation values are compressed by a saturation compression processing unit 46 while discriminating whether the (L*a*b*) values exist in or out of the virtual gamut by using the virtual gamut/CMY conversion table 30, the color data is changed from the printer gamut to the virtual gamut, and the changed (L*a*b*) values are stored into the virtual gamut data storing unit 36. Subsequently, the color data of the virtual gamut 44 is converted into the color data of the printer gamut 42 by an inverse conversion processing unit 48 by using the inverse function of the gamut expanding function used to obtain the virtual gamut 44 from the printer gamut 42. The converted color data is stored into the printer gamut data storing unit 35. Finally, the (L*a*b*) values of the printer gamut 42 are converted into the CMY values by the printer gamut/CMY conversion table 28 and stored into the CMY data storing unit 38.

Figure 27:
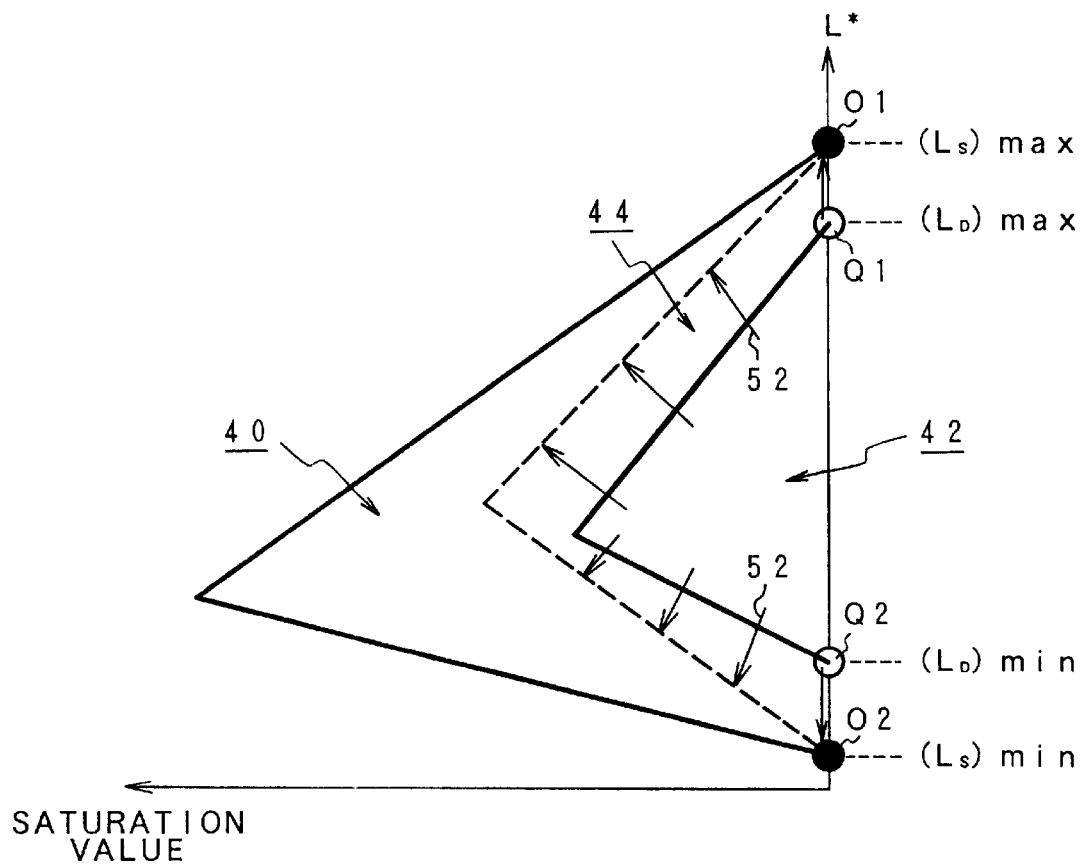
FIG. 27 is an explanatory diagram of a virtual gamut obtaining step in the second embodiment of the invention.

FIG. 27 is a cross sectional view of an equal hue angle of the L*a*b* color space for explaining the second embodiment of a color data converting method of the invention. The second embodiment is characterized by expanding in a manner such that when the printer gamut 42 is expanded as shown by the arrows 52 in the virtual gamut obtaining step, the highest lightness value $(L_D)$max of the printer gamut 42 is made coincident with the highest lightness value $(L_S)$max of the display gamut 40 and the lowest lightness value $(L_D)$min of the printer gamut 42 is made coincident with the lowest lightness value $(L_S)$min of the display gamut 40.

Figure 28:
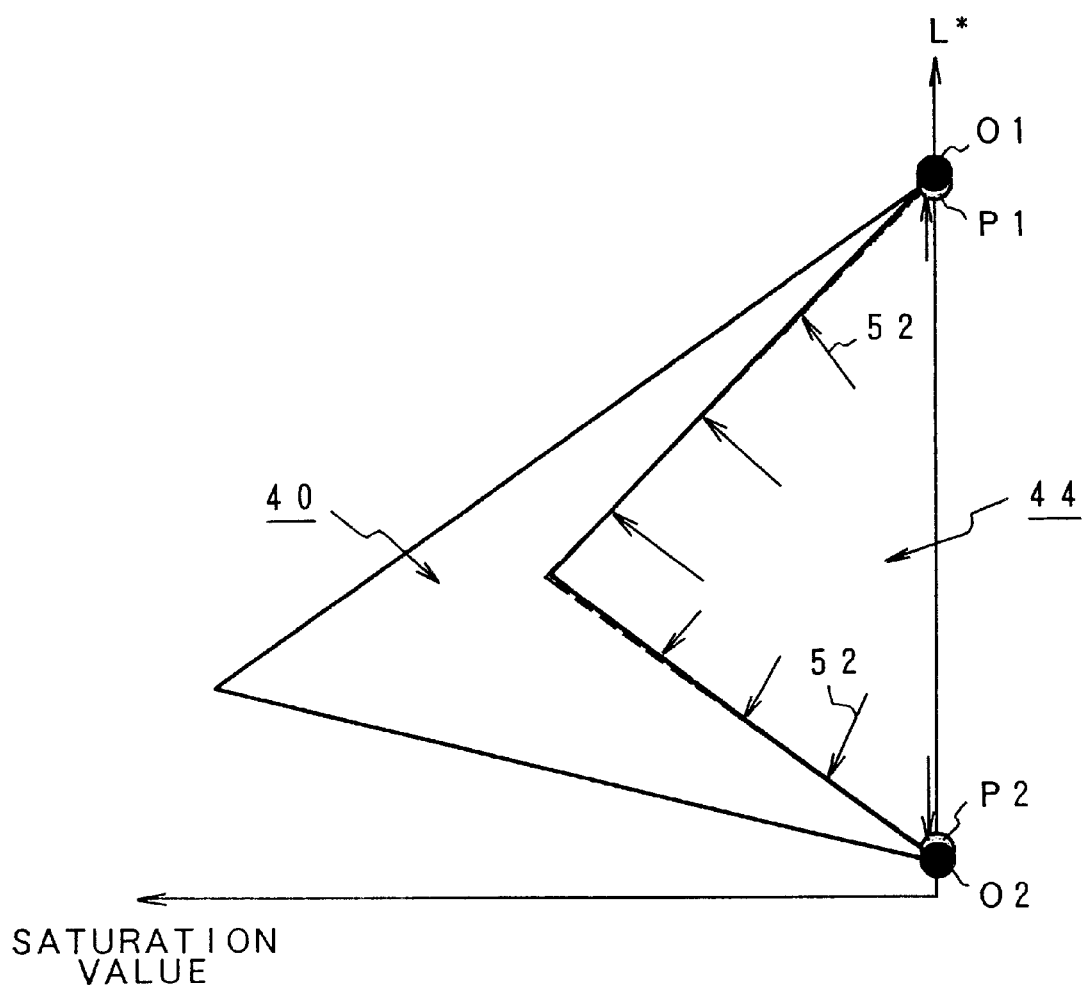
FIG. 28 is an explanatory diagram of a virtual gamut obtained from a printer gamut in FIG. 27.

FIG. 28 shows the virtual gamut 44 expanded from the printer gamut 42 according to FIG. 27. The color data Q1 and Q2 of the highest lightness value and lowest lightness value of the display gamut 40 coincide with the color data P1 and P2 of the highest lightness value and lowest lightness value of the virtual gamut 44, respectively. As for the color converting process in the case where the virtual gamut 44 is obtained so as to coincide with the highest lightness value and lowest lightness value of the display gamut 40 as mentioned above, in a manner similar to the case of the first embodiment of FIGS. 20 and 21, the color data of the display gamut 40 locating out of the virtual gamut 44 is changed to the virtual gamut 44 by reducing the saturation value. After that, it is sufficient to change the color data of the virtual gamut to the color data of the printer gamut 42 by the inverse function of the gamut expanding function in case of obtaining the virtual gamut 44 as shown in FIG. 21. By the conversion to the color data from the display gamut 40 to the printer gamut 42 by using the virtual gamut 44 of the highest lightness value and lowest lightness value which coincide with those in the display gamut 40 as mentioned above, not only there is an effect that the color data which cannot be color converted is eliminated but also the white color corresponding to the highest lightness value of the display gamut 40 can be converted to the white color of the printer gamut 42 having the same lightness value. That is, when the white color displayed by the image displaying apparatus 12 such as a CMY display or the like is printed by the image printing apparatus 14, a situation such that ink or toner is adhered onto the paper and the paper is not seen in white can be prevented. In addition, since the black color corresponding to the lowest lightness value of the display gamut 40 coincides with the black color corresponding to the same lightness value of the printer gamut 42, the color image can be reproduced by the image printing apparatus without substantially deteriorating the gradation of the achromatic color in the image displaying apparatus owing to both of the coincidence of the white color and the coincidence of the black color described above. By establishing the reproducibility regarding the achromatic color, in a color image or the like obtained by photographing an object having a large amount of achromatic color such as a person having many hairs by a digital camera, a display image by the display and a print image by the printer can be reproduced so that they can be almost similarly seen.

Figure 29:
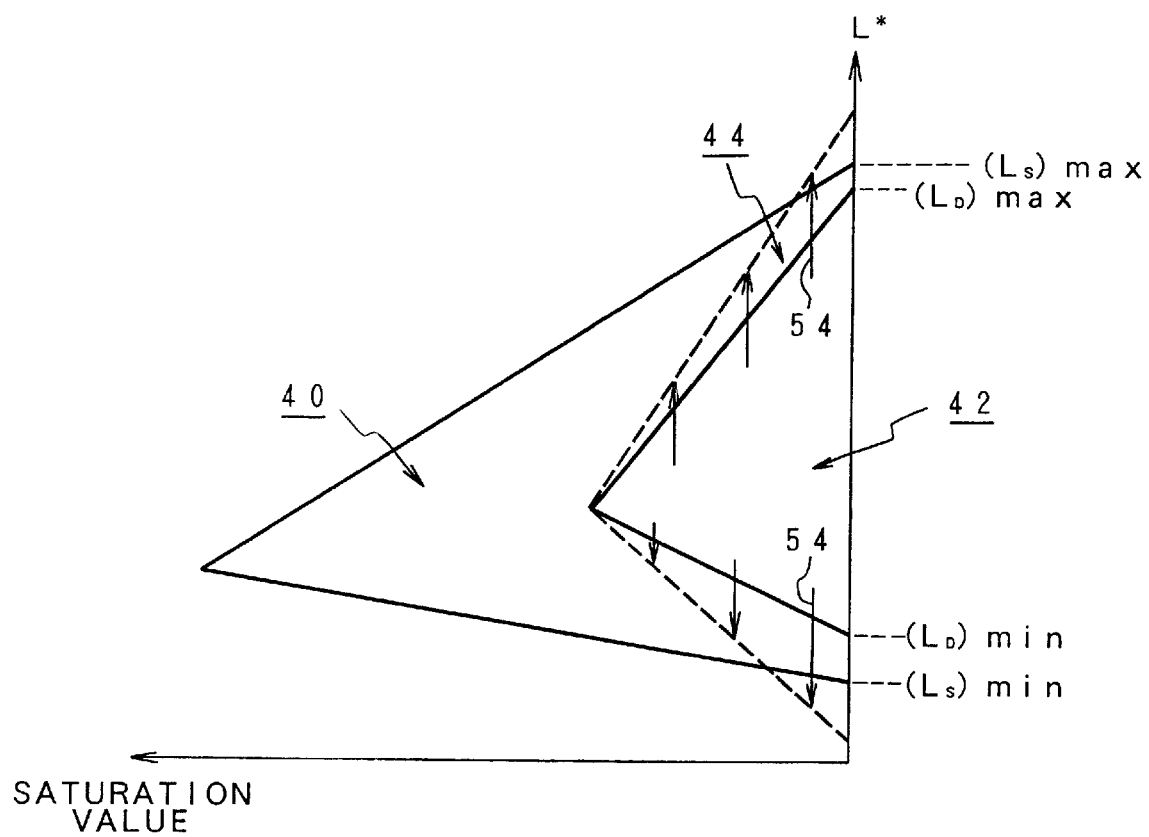
FIG. 29 is an explanatory diagram of a virtual gamut obtaining step in the third embodiment of the invention.

FIG. 29 is a cross sectional view of an equal hue angle of the L*a*b* color space for explaining the third embodiment of a color data converting method according to the invention. With respect to the display gamut 40 and printer gamut 42 in FIG. 29, the color data converting method of the invention is characterized in that the virtual gamut 44 is obtained by applying a predetermined expanding function with regard to the printer gamut 42. In the third embodiment, however, the expansion is not performed in the direction of the saturation value but the expansion and compression are performed in only the direction of the lightness value L*.

Figure 30:
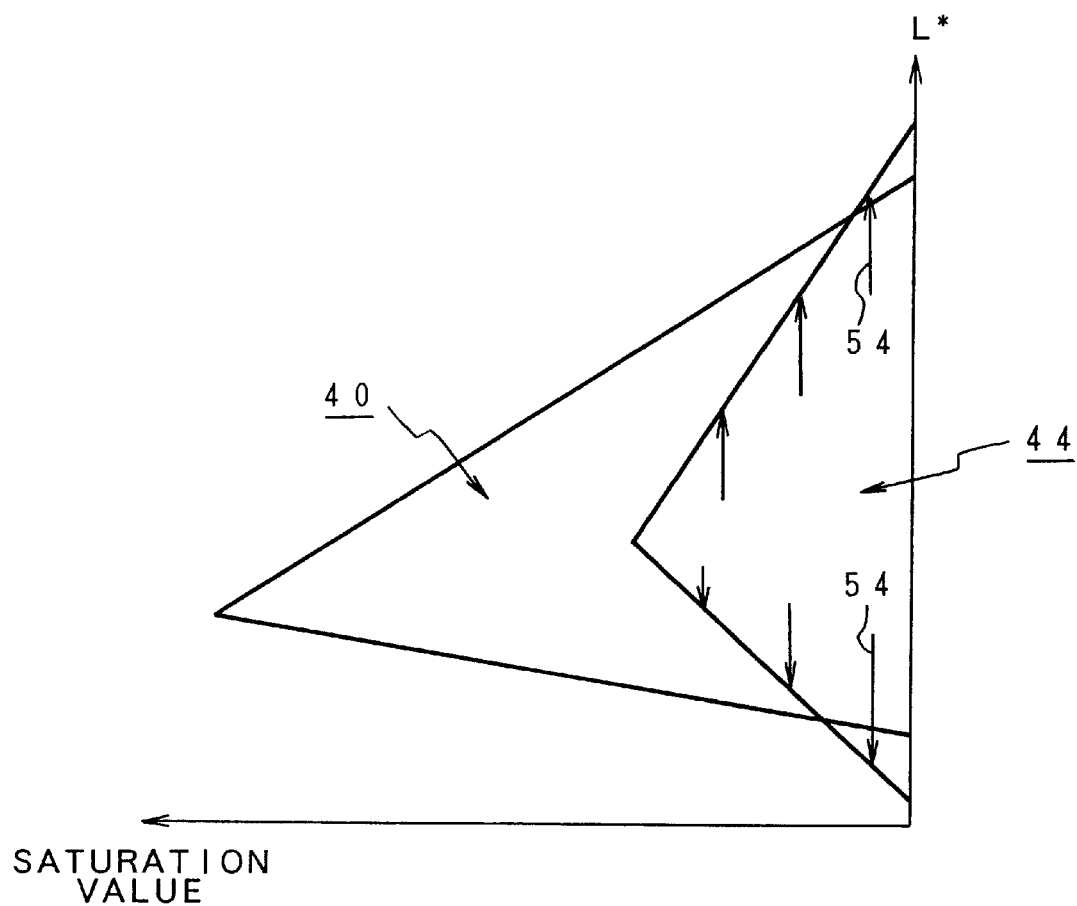
FIG. 30 is an explanatory diagram of a virtual gamut obtained from a printer gamut in FIG. 29.

FIG. 30 shows a result of the virtual gamut 44 obtained by the second embodiment of FIG. 29. All of the color data of the display gamut 40 is included in the lightness range of the virtual gamut 44 in the lightness value L* direction. Therefore, in a manner similar to the cases of FIGS. 20 and 21 in the first embodiment, after the color data of the display gamut 40 out of the virtual gamut 44 was changed to the virtual gamut 44 by, for example, reducing the saturation values a*b*, it can be changed to the color data included in the printer gamut 42 in FIG. 29 by applying the inverse function of the gamut expanding function used when the virtual gamut 44 is obtained. The third embodiment of FIGS. 29 and 30 is effective when the display gamut 40 is fairly larger than the printer gamut 42. As compared with the first embodiment, the reduction of the saturation of the color data of the printer gamut 42 after the conversion can be prevented.

Figure 31:
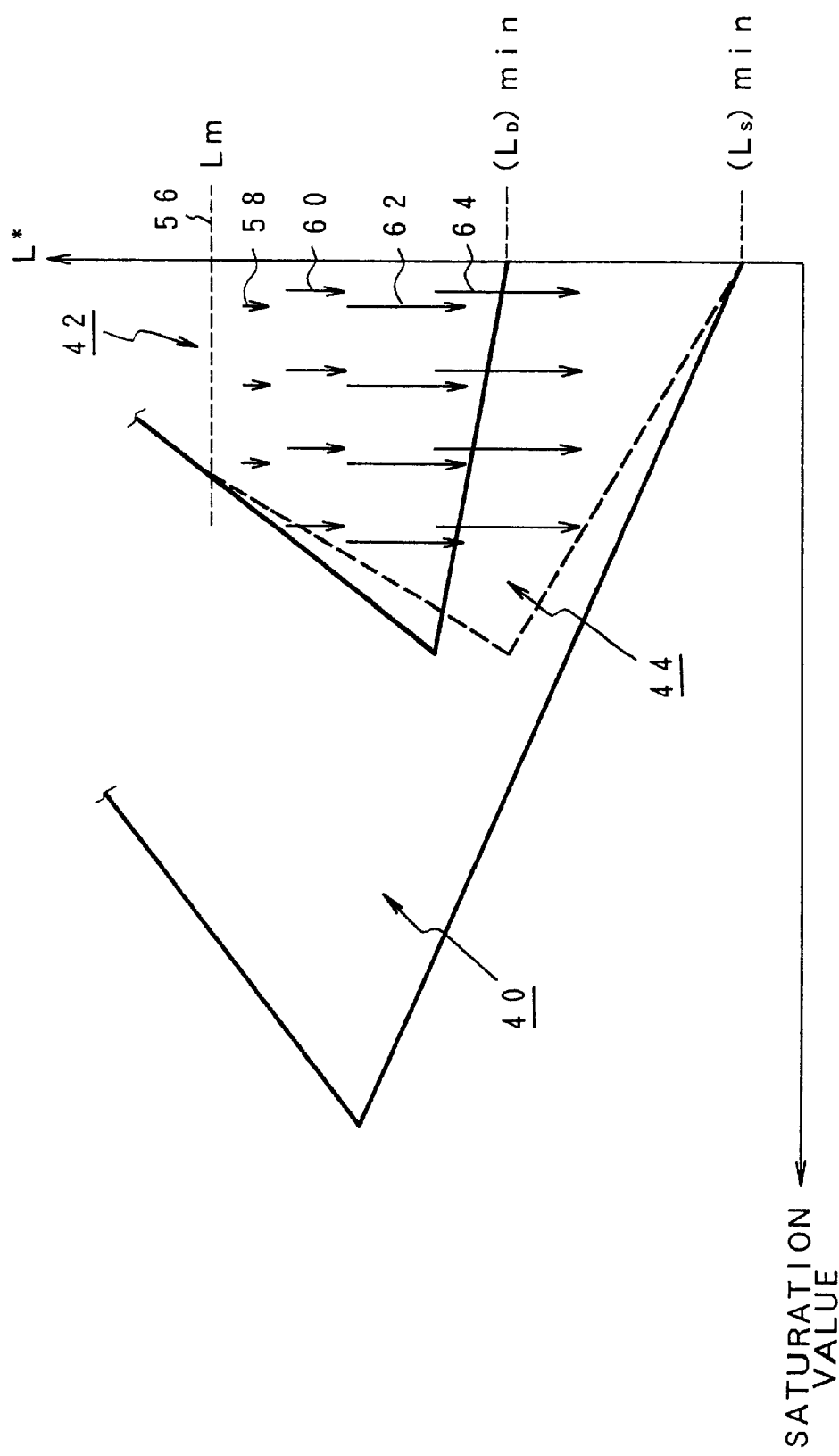
FIG. 31 is an explanatory diagram of a virtual gamut obtaining step in the fourth embodiment of the invention.
Figure 32:
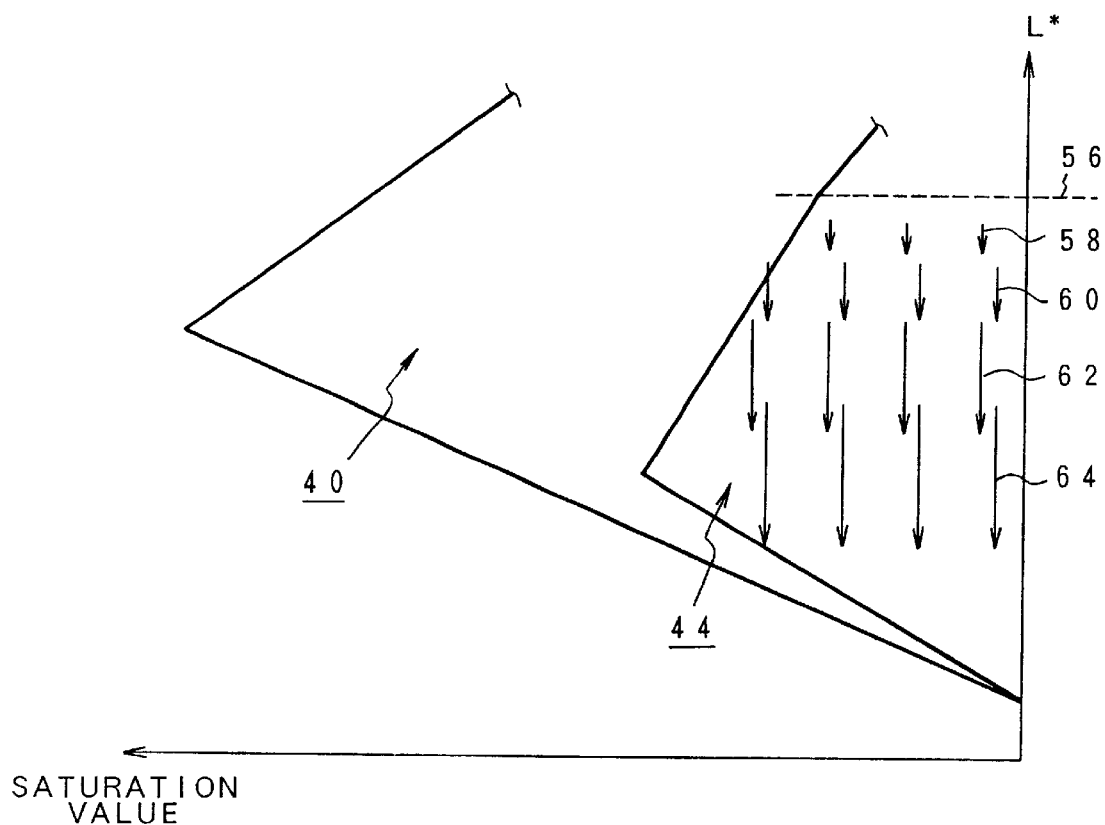
FIG. 32 is an explanatory diagram of a virtual gamut obtained from a printer gamut in FIG. 31.

FIG. 31 is a cross sectional view of an equal hue angle of the L*a*b* color space to explain the fourth embodiment of a color data converting method of the invention and a portion of the lowest lightness value is extracted from the intermediate lightness value. In the fourth embodiment, in the virtual gamut obtaining step, with respect to a gamut of an intermediate lightness line 56 which gives a predetermined intermediate lightness value Lm or less, the virtual gamut 44 shown in FIG. 32 is obtained by increasing an expansion amount in an exponential function manner as the lightness value decreases as shown by sizes of arrows 58, 60, 62, and 64. Relational equations to obtain the virtual gamut 44 from the printer gamut 42 in this case are obtained as follows when it is assumed that the (L*a*b*) values of the printer gamut 42 are set to (L2 a2 b2) and the (L*a*b*) values of the virtual gamut 44 obtained are set to (L3 a3 b3).

$a_3 = a_2$
$b_3 = b_2$ $$L_{out} = (L_m - L_{Smin})\left(\frac{L_i - L_{Dmin}}{L_m - L_{Dmin}}\right)^{\frac{1}{\gamma}} + L_{Smin}$$

Figure 33:
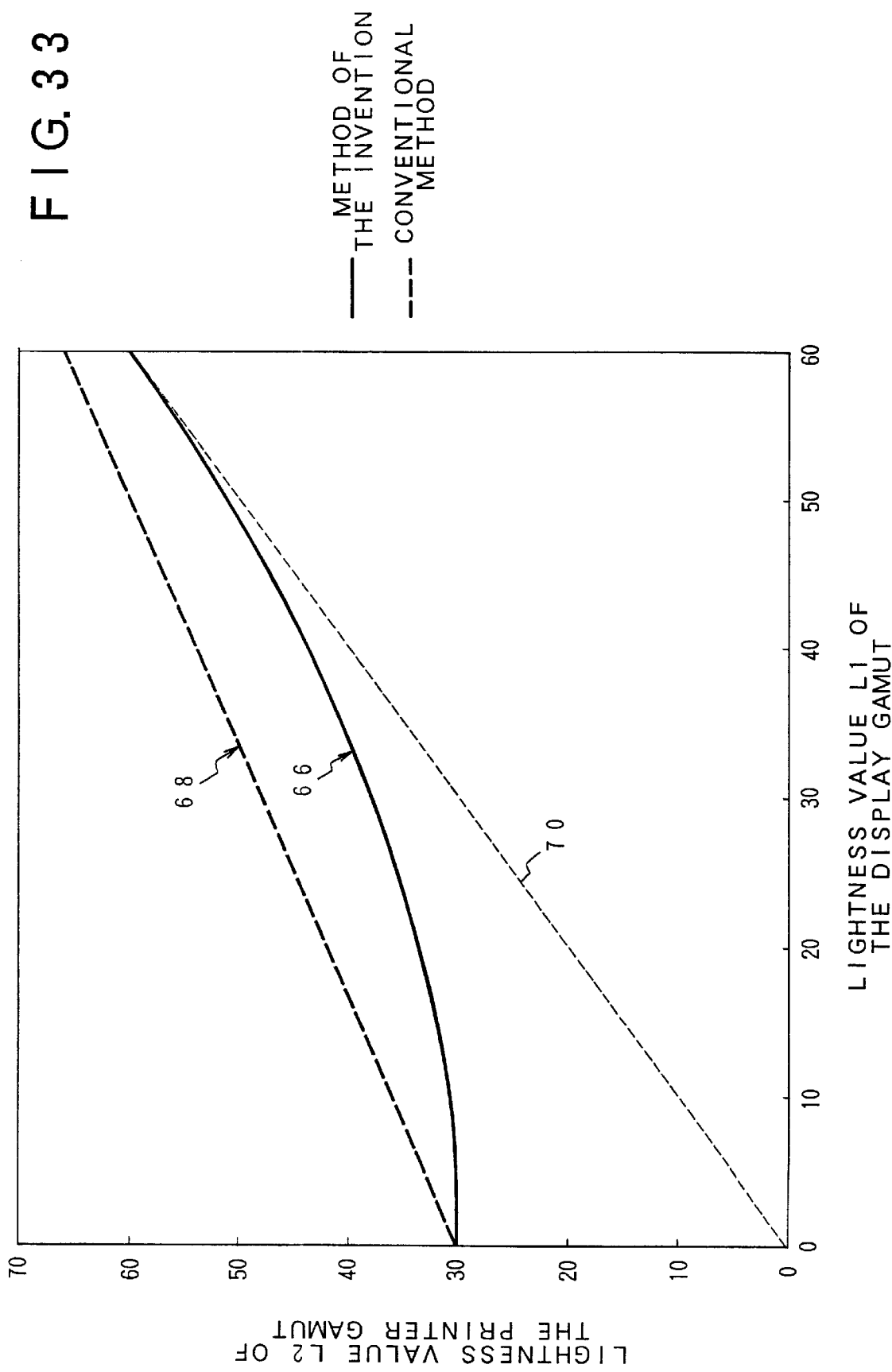
FIG. 33 is a characteristics diagram showing the relation of a lightness value by the conversion in the fourth embodiment of the invention in comparison with the conventional method.

$L_3 = L_{out}$        (2)

where, $L_i$: color data lightness value at a location where an expansion is performed in the printer gamut $L_{out}$: color data lightness value after the expansion in the virtual gamut was performed $L_m$: almost intermediate lightness value between the highest lightness value and the lowest lightness value of the printer gamut $L_{Smin}$: the lowest lightness value of the display gamut $L_{Dmin}$: the lowest lightness value of the printer gamut $L_{Smax}$: the highest lightness value of the display gamut $L_{Dmax}$: the highest lightness value of the printer gamut γ: arbitrary constant of 1 or more FIG. 33 shows a relation between the lightness value L2 of the display gamut 40 before the conversion and the lightness value L3 of the printer gamut 42 after the conversion with respect to the equations (2) to obtain the virtual gamut 44 in the fourth embodiment of the invention in cage of setting as follows as conditions of the general CRT display and color printer in comparison with the conventional method.

$L_{Smin} = 0.0$
$L_{Dmin} = 30.0$
$L_{Smax} = 100.0$
$L_{Dmax} = 90.0$
γ = 1.90

In FIG. 33, a characteristics curve 66 shows a relation between the lightness values before and after the conversion in the color data converting method of the invention which is given by the equations (2). A characteristics curve 68 shows a relation between the lightness values in the conventional method by the equations (1) shown in FIG. 14.

As will be obviously understood from the relations of the lightness values, according to the color data converting method of the invention in the characteristics curve 66 as compared with the conventional method which is given by the characteristics curve 68, an increase in lightness of the color data after the conversion at the low lightness is suppressed and a situation such that the whole color image after the conversion becomes bright can be prevented. The color data can be properly saved without deteriorating the gradation in the lightness direction.

Figure 8:
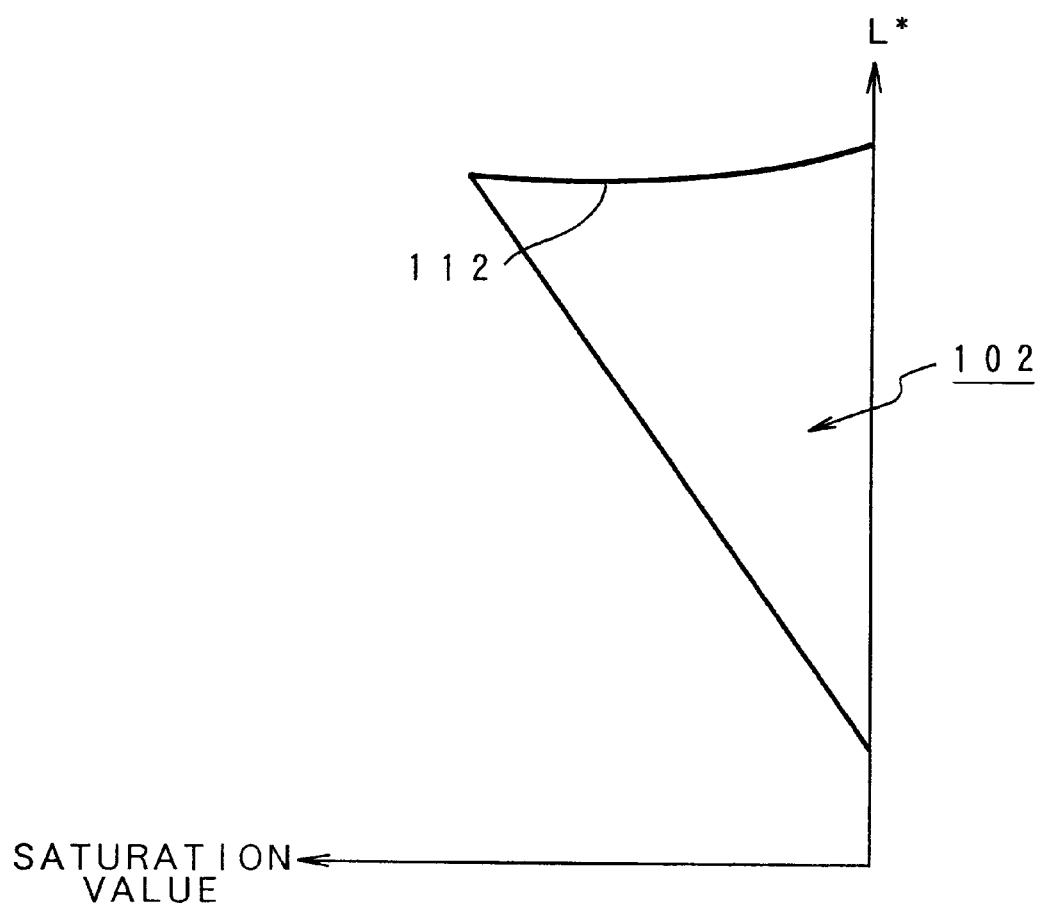
FIG. 8 is an explanatory diagram of an yellow printer gamut which causes a problem in the conventional methods of FIGS. 3 and 4.
Figure 9:
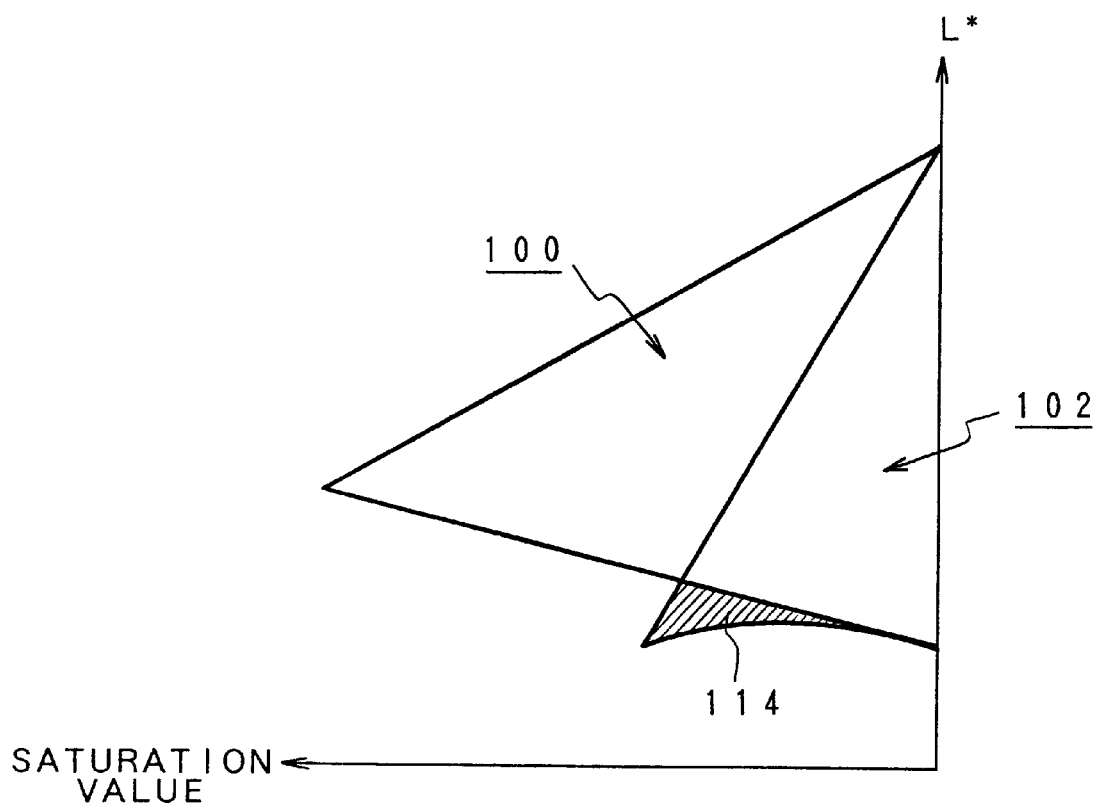
FIG. 9 is an explanatory diagram of an unused area in the case where color data is changed from the display gamut in FIG. 3 to the printer gamut in FIG. 7.
Figure 10:
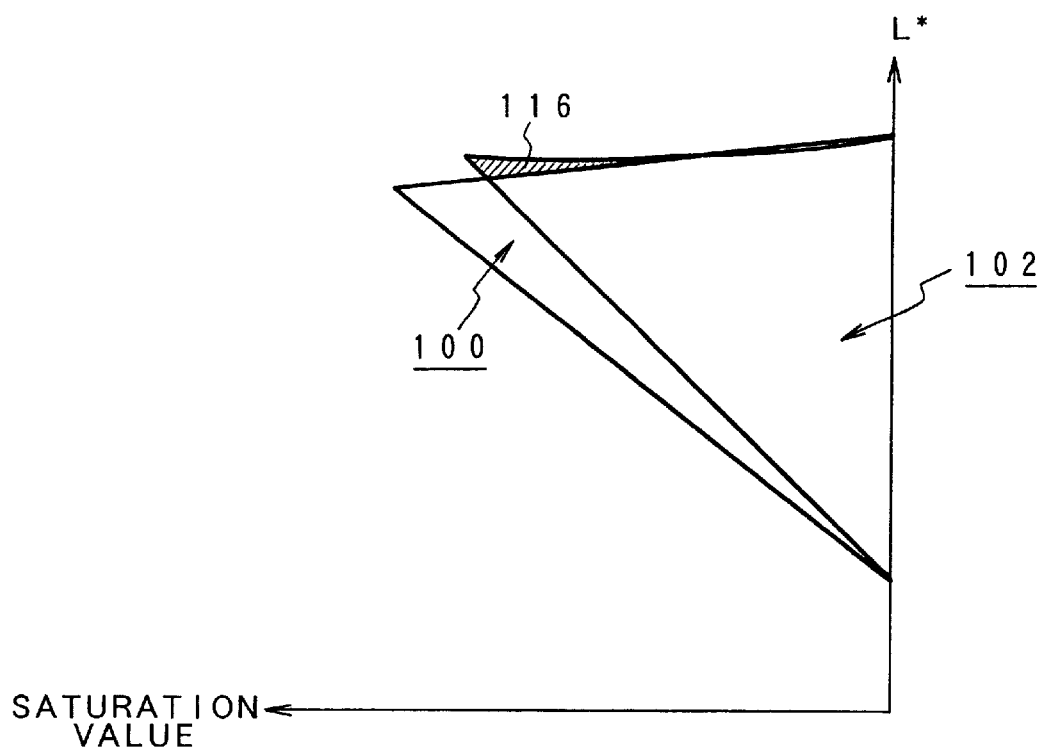
FIG. 10 is an explanatory diagram of an unused area in the case where color data is converted from the display gamut in FIG. 3 to the printer gamut in FIG. 8.
Figure 11:
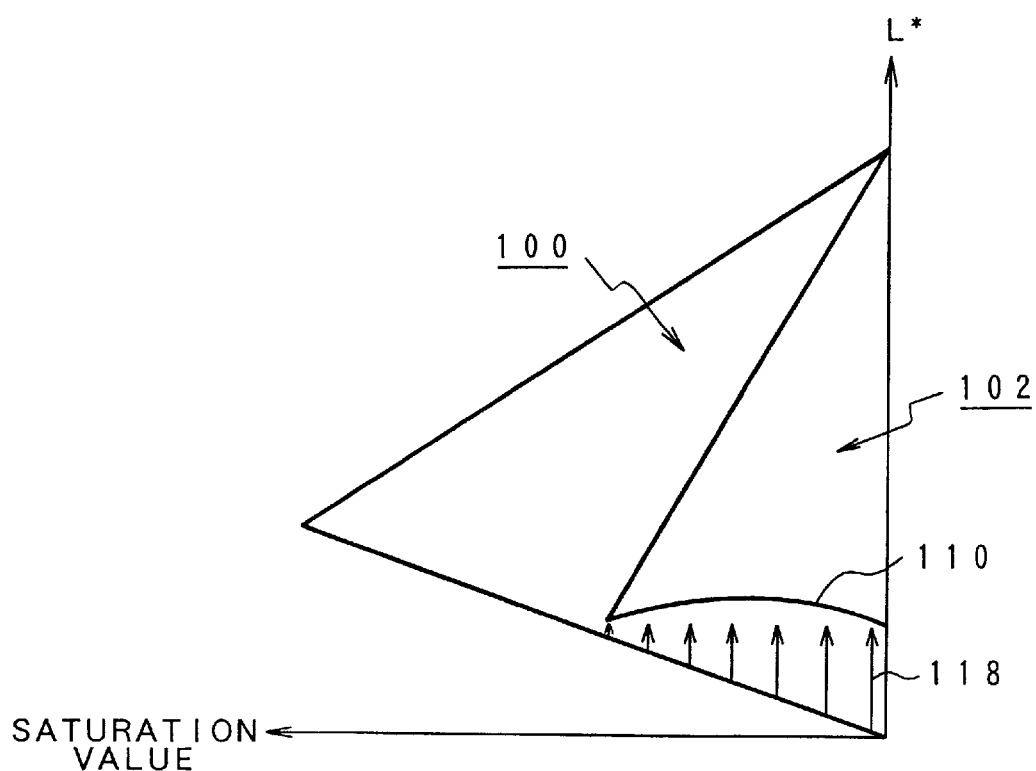
FIG. 11 is an explanatory diagram of a changing method of another display gamut to solve a problem in FIG. 9.
Figure 12:
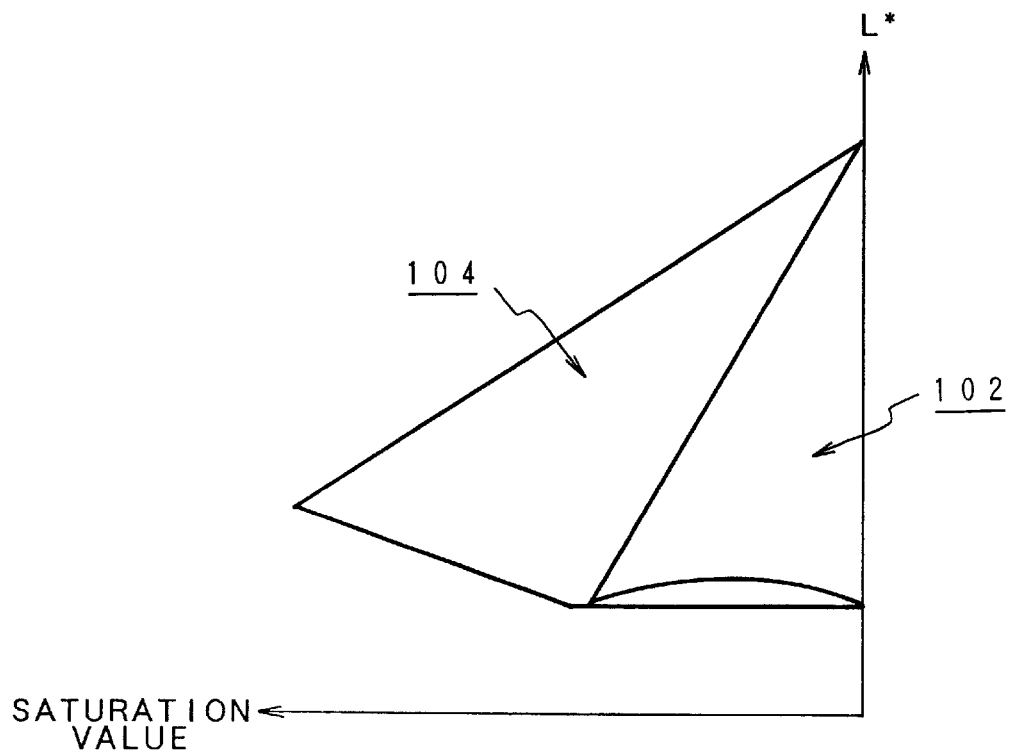
FIG. 12 is an explanatory diagram of the display gamut changed by the method in FIG. 11.
Figure 13:
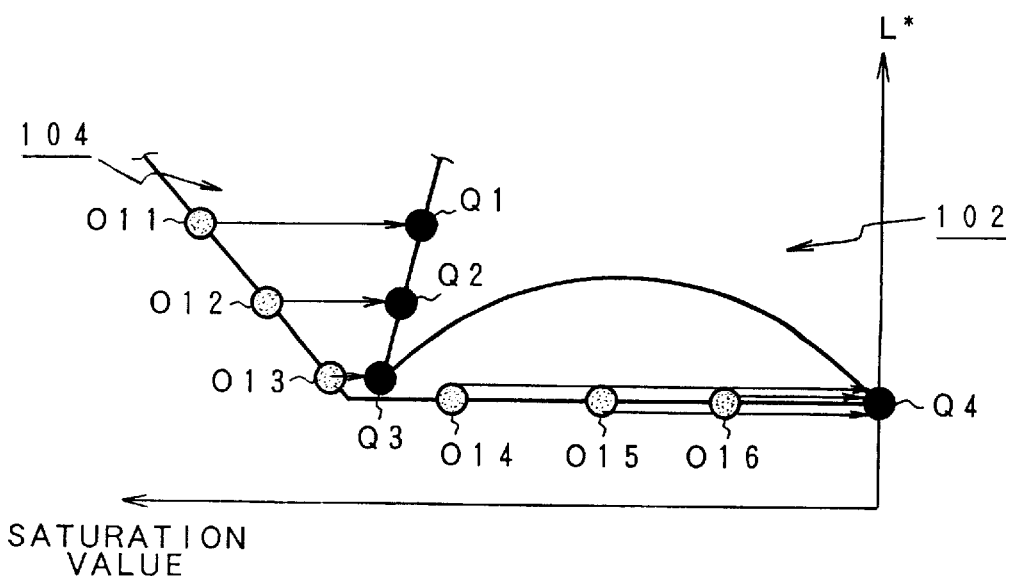
FIG. 13 is an explanatory diagram of a large color difference and gradation deterioration which occur in the case where the display gamut in FIG. 12 is converted into the printer gamut.
Figure 34:
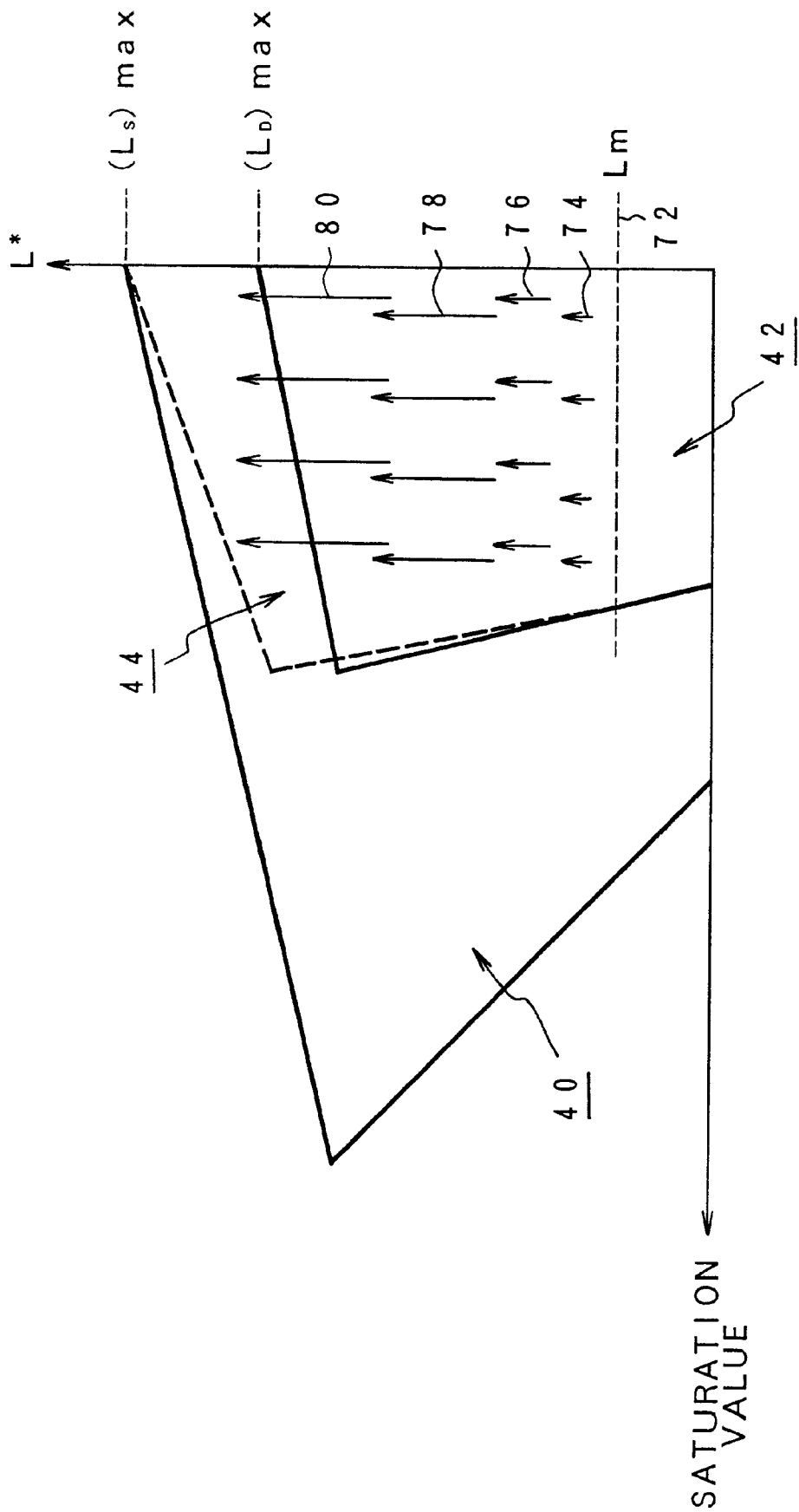
FIG. 34 is an explanatory diagram of a virtual gamut obtaining step in the fifth embodiment of the invention.
Figure 35:
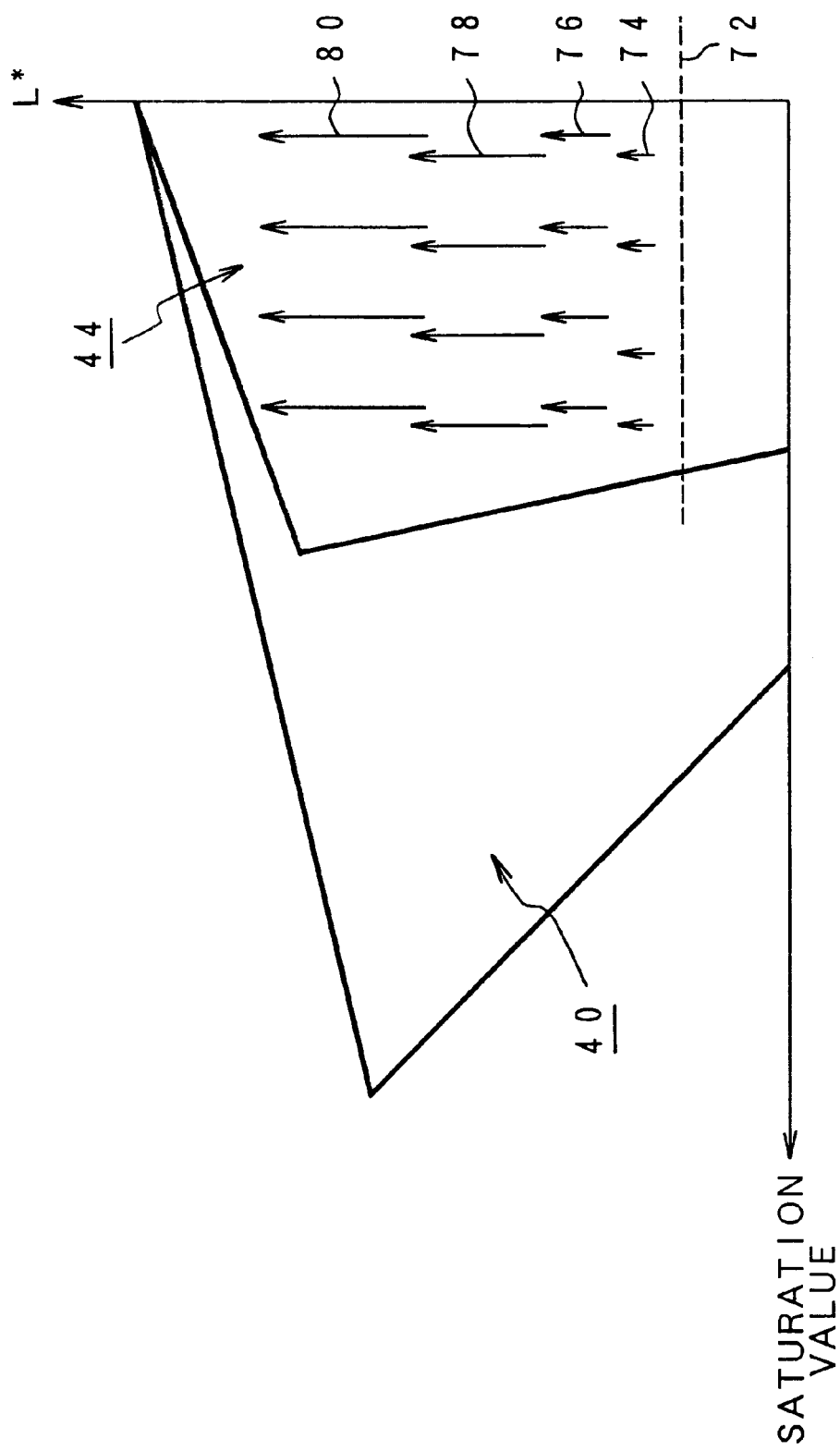
FIG. 35 is an explanatory diagram of a virtual gamut obtained from a printer gamut in FIG. 34.

FIG. 34 is a cross sectional view of an equal hue angle of the L*a*b* color space for explaining the fifth embodiment of a color data converting method of the invention. A gamut above the intermediate lightness value is extracted. A space where the gamut has an inverse "L"-character shape is an L*a*b* color space where a hue angle indicates yellow as shown in FIG. 8. The fifth embodiment is characterized in that, in the virtual gamut obtaining step of obtaining the virtual gamut 44 from the printer gamut 42, an expansion amount of the lightness value is increased in an exponential function manner with respect to the high lightness portion as the lightness value is higher as shown by sizes of arrows 74, 76, 78, and 80 on the basis of a lightness line 70 which gives the almost intermediate lightness value Lm between the lowest and highest lightness values. Thus, the virtual gamut 44 as shown in FIG. 35 is obtained. In this case, the highest lightness value of the virtual gamut 44 is made coincident with the highest lightness value of the display gamut 40. In the fifth embodiment of FIGS. 34 and 35, relational equations to obtain the virtual gamut 44 are obtained as follows.

$a_3 = a_2$
$b_3 = b_2$ $$L_{out} = L_{Smax} - (L_{Smax} - L_m)\left(\frac{L_{Dmax} - L_2}{L_{Dmax} - L_m}\right)^{\frac{1}{\gamma}}$$

Figure 36:
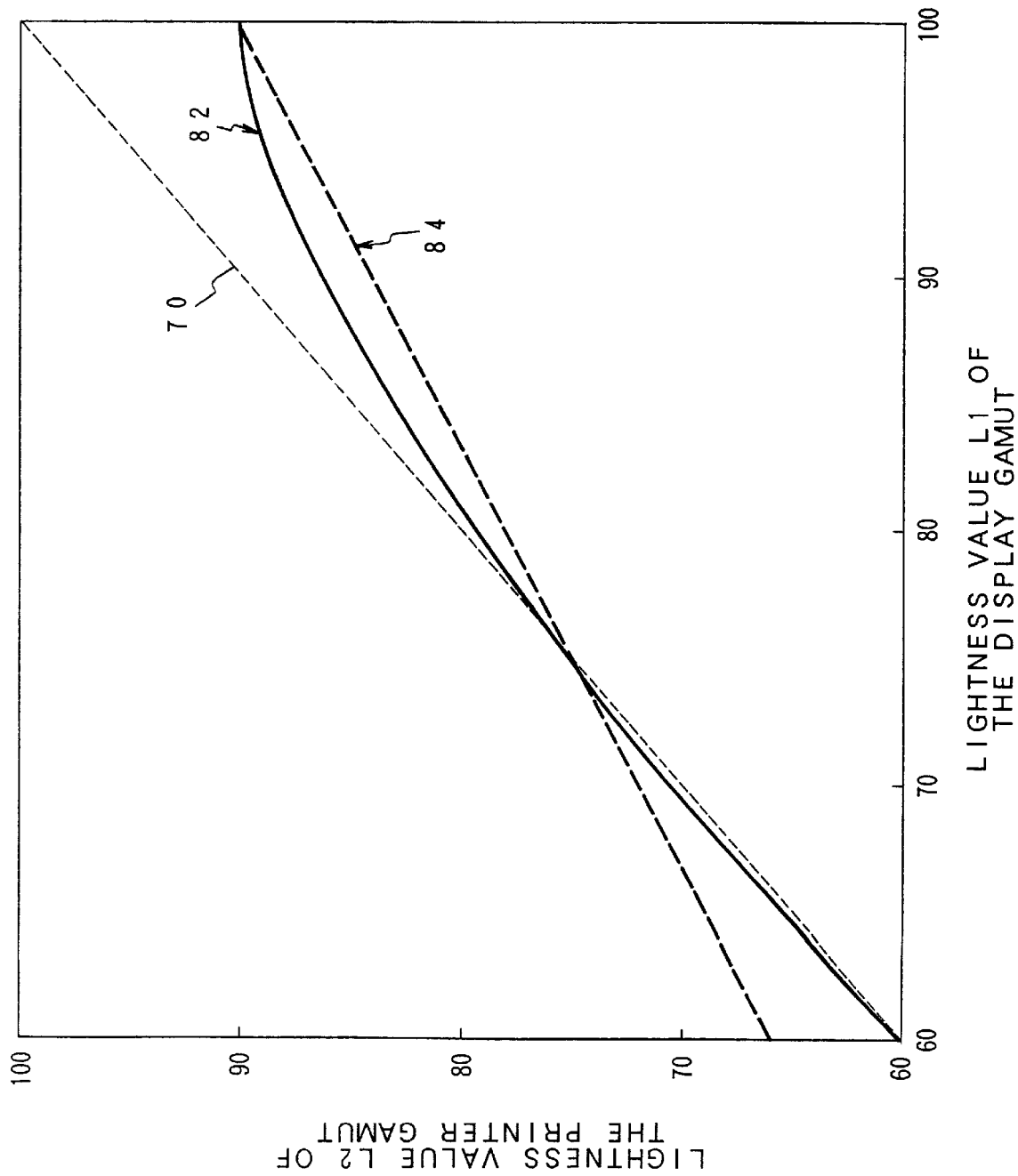
FIG. 36 is a characteristics diagram showing the relation of a lightness value by the conversion in the fifth embodiment of the invention in comparison with the conventional method.

$L_3 = L_{out}$        (3)

where, $L_2$: color data lightness value at a location where an expansion is performed in the printer gamut $L_{out}$: color data lightness value after the expansion in the virtual gamut was performed $L_m$: almost intermediate lightness value between the highest lightness value and the lowest lightness value of the printer gamut $L_{Smin}$: the lowest lightness value of the display gamut $L_{Dmin}$: the lowest lightness value of the printer gamut $L_{Smax}$: the highest lightness value of the display gamut $L_{Dmax}$: the highest lightness value of the printer gamut γ: arbitrary constant of 1 or more FIG. 36 shows a relation of the lightness values in the case where the color data of the display gamut 40 is converted into the color data of the printer gamut 42 via the virtual gamut 44 obtained in FIGS. 34 and 35. That is, as conditions of the general CRT display and color printer, $L_{Smin}$=0.0

$L_{Dmin}$=30.0

$L_{Smax}$=100.0

Figure 14:
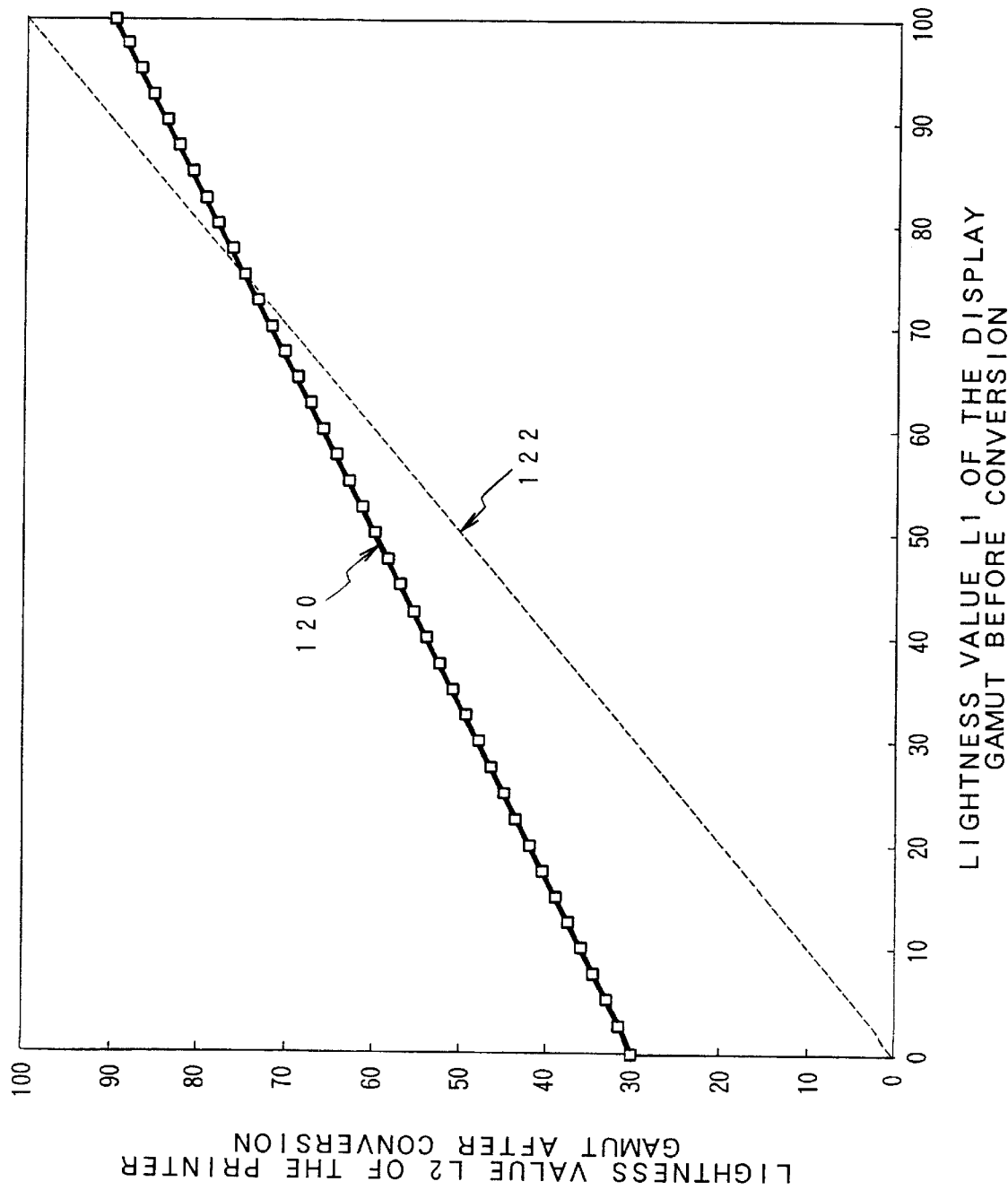
FIG. 14 is an explanatory diagram of a lightness fluctuation which occurs due to the use of lightness compression functions in the conventional methods of FIGS. 3 and 4.

$L_{Dmax}$=90.0

γ=1.50 are substituted into the equations (3), the lightness value L3 of the printer gamut after the conversion to the lightness value L2 of the display gamut before the conversion is obtained, a relation between them is plotted, and a characteristics curve 82 is obtained in the invention. In FIG. 36, a characteristics curve 84 showing the lightness relation of the conventional method of FIG. 14 is also shown. Reference numeral 70 denotes the reference straight line in the case where the lightness value does not change. As will be obviously understood from the characteristics curve 82 of the lightness relation in FIG. 36, in the case where the color data of the display gamut 40 is converted into the color data of the printer gamut 42 via the virtual gamut 44 shown in FIGS. 34 and 35, a decrease in lightness of the color data in a state of high lightness is suppressed and a situation such that the whole color image after the conversion becomes dark can be prevented. The color data can be properly saved without deteriorating the gradation in the lightness direction.

Figure 1:
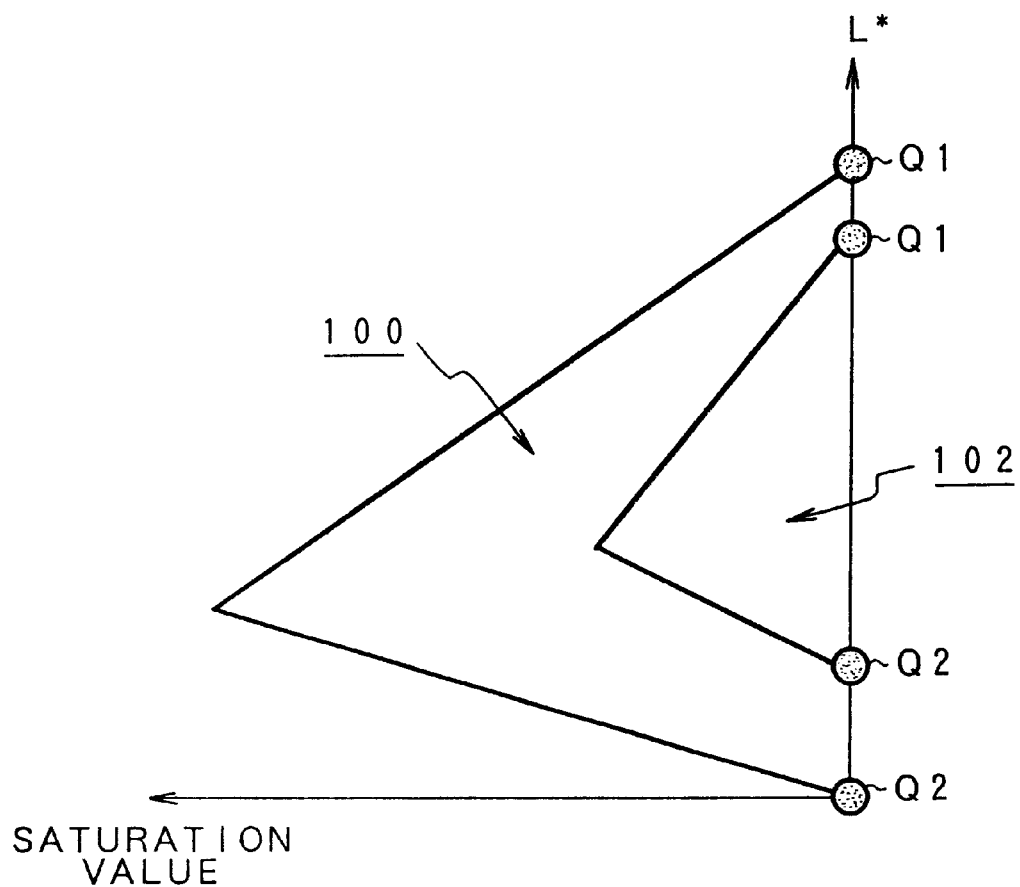
FIG. 1 is an explanatory diagram of general display gamut and printer gamut in an L*a*b* space.
Figure 2:
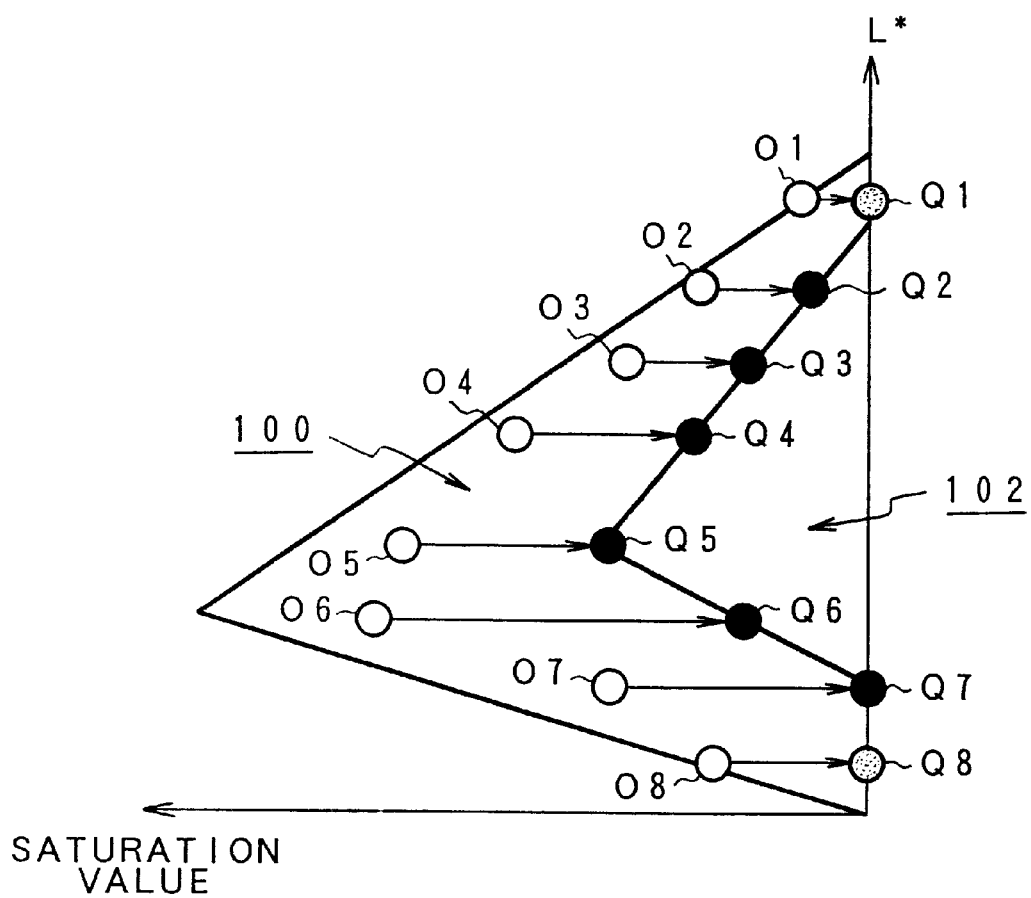
FIG. 2 is an explanatory diagram of a conventional method of decreasing a saturation value of color data in a display gamut and converting it into a printer gamut.
Figure 3:
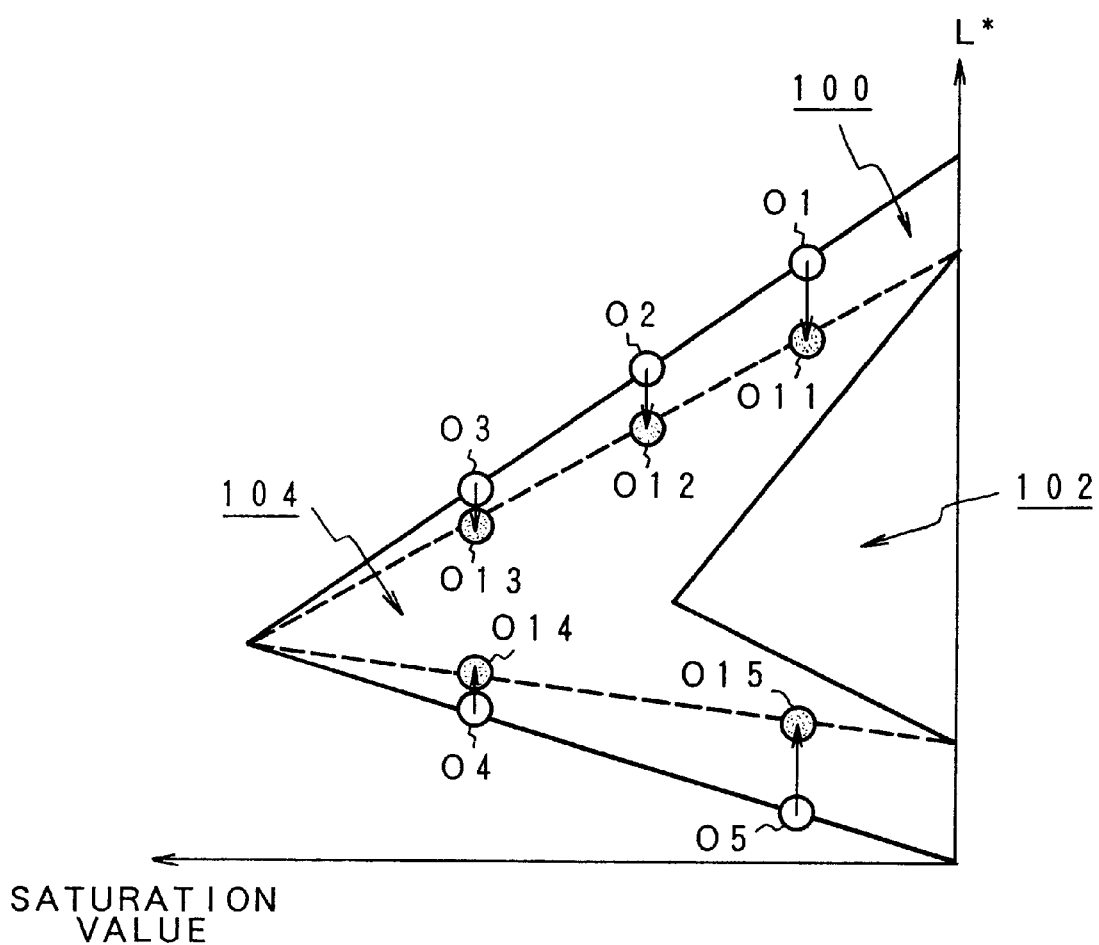
FIG. 3 is an explanatory diagram of another conventional method of matching a lightness value of a display gamut to a printer gamut.
Figure 4:
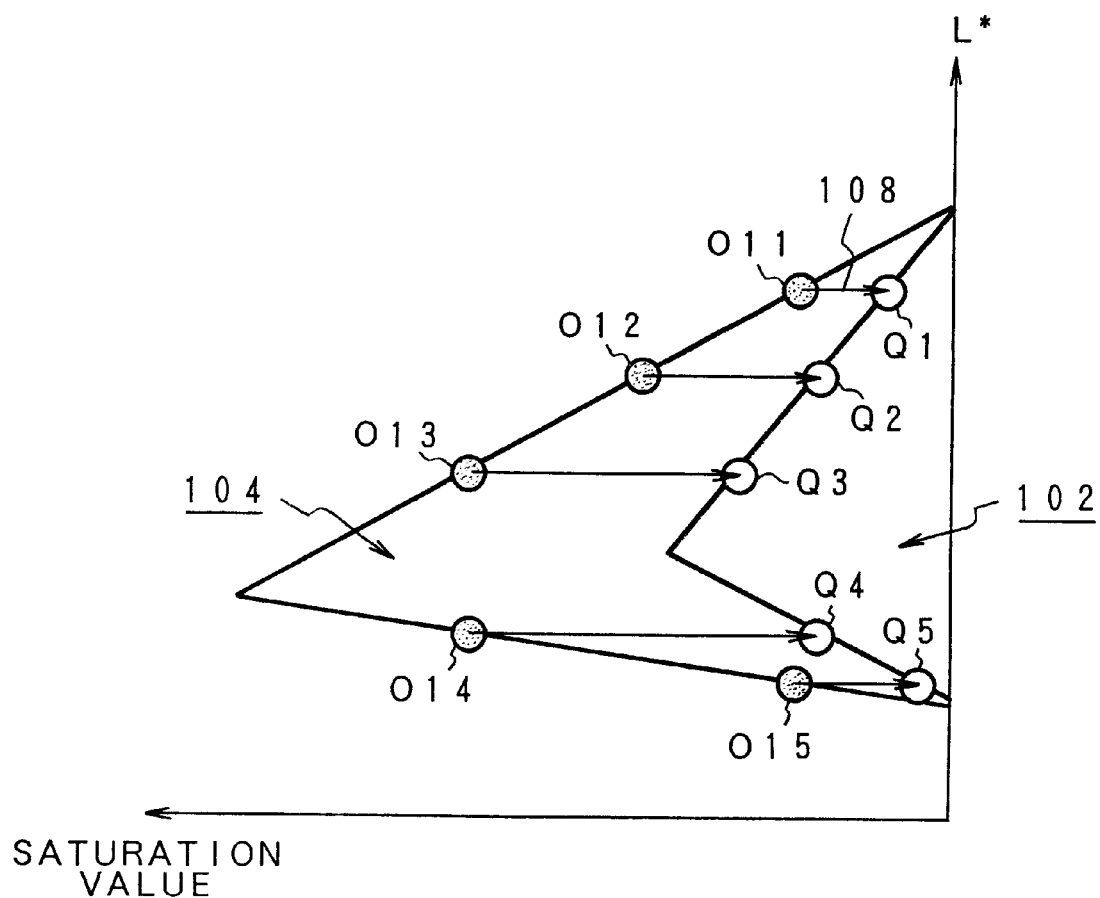
FIG. 4 is an explanatory diagram of a conventional method of decreasing a saturation value of color data in a display gamut and converting it into a printer gamut continues to FIG. 3.
Figure 5:
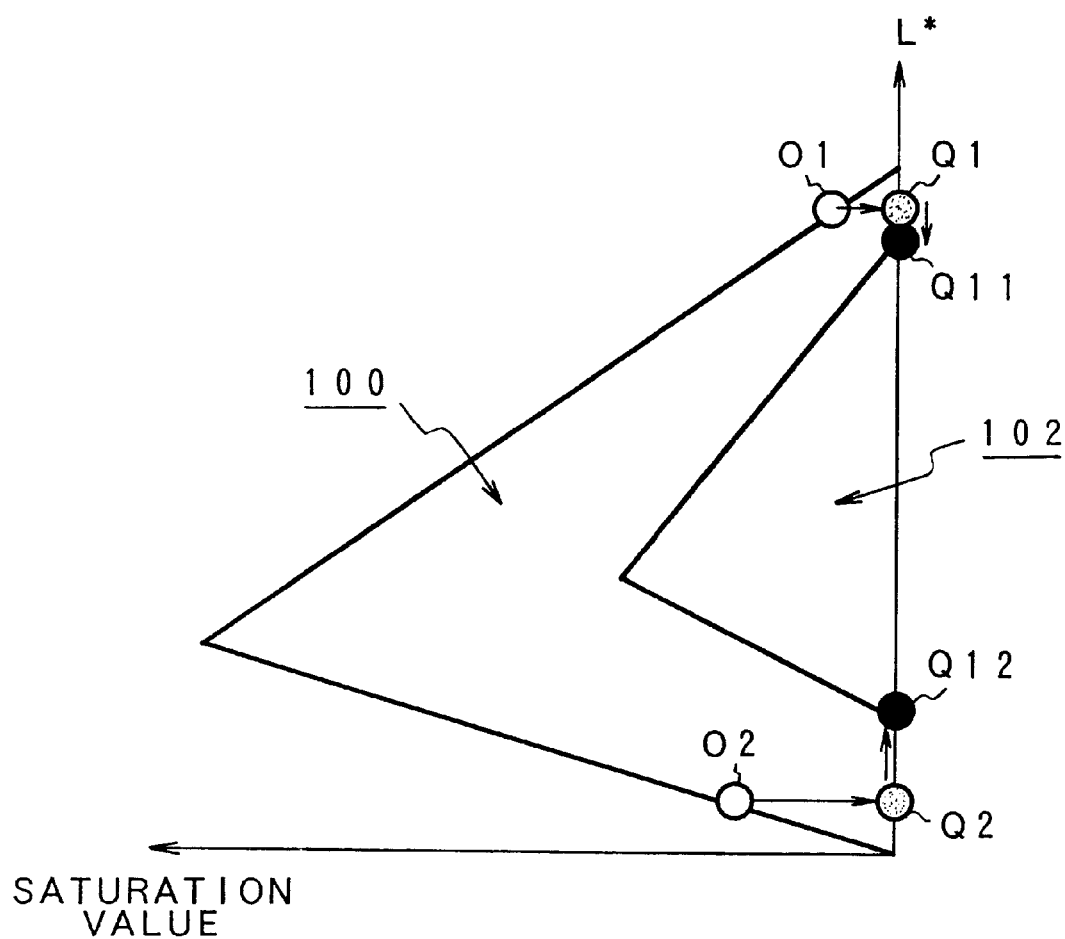
FIG. 5 is an explanatory diagram of a converting method which can solve a problem of the conventional method of FIG. 2.
Figure 6:
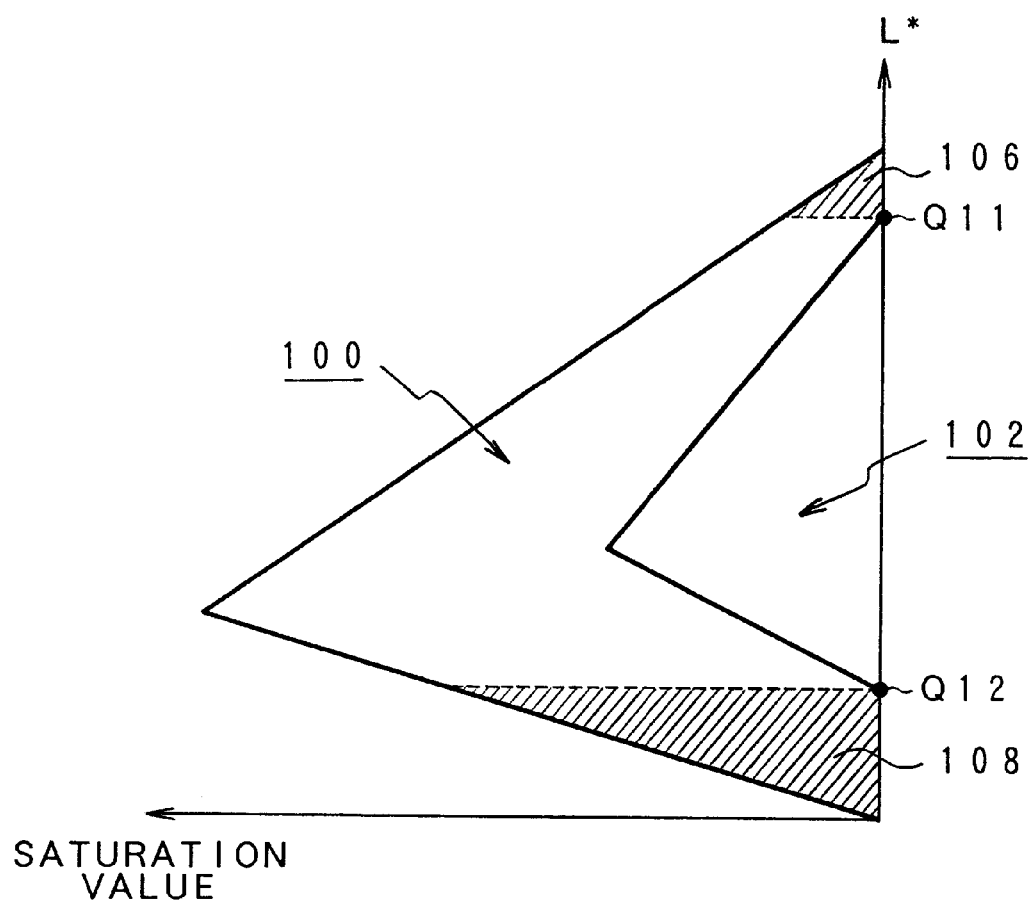
FIG. 6 is an explanatory diagram of a gradation deterioration area which occurs in the case where the conversion in FIG. 5 is performed.
Figure 7:
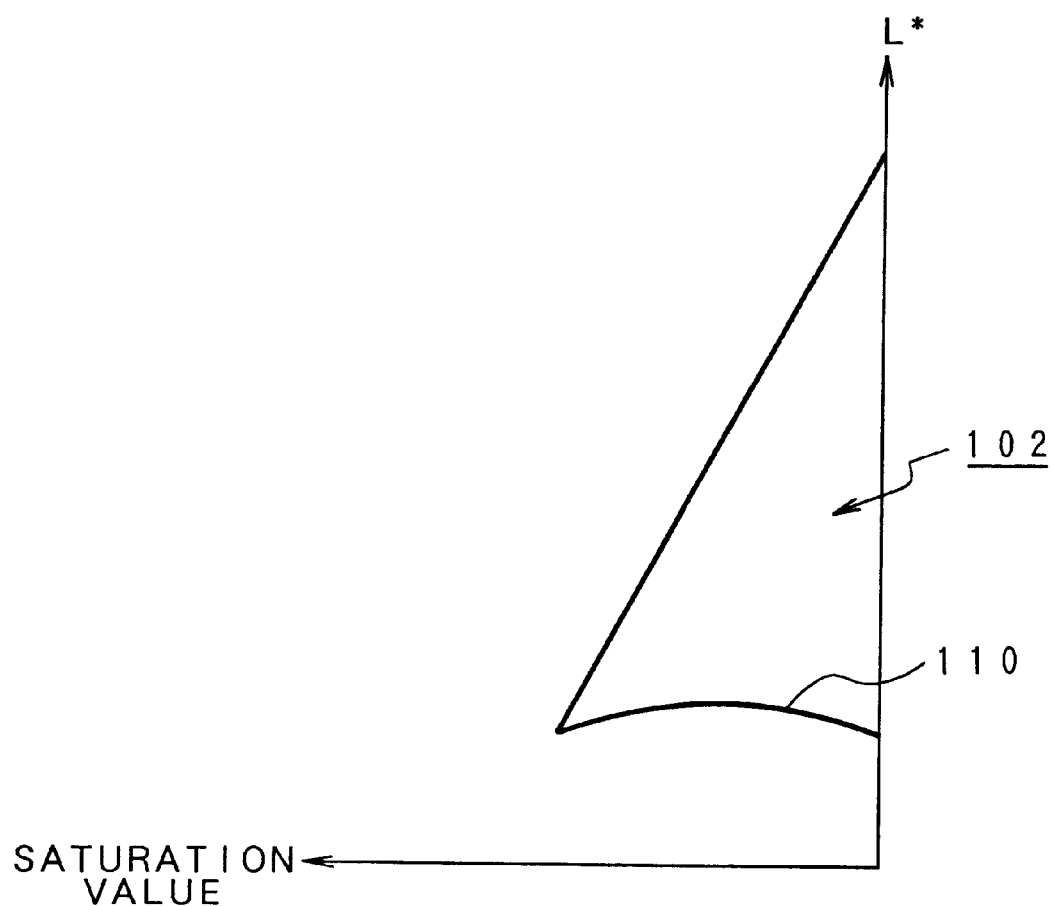
FIG. 7 is an explanatory diagram of blue, violet, and purple printer gamuts which cause a problem in the conventional methods of FIGS. 3 and 4.
Figure 37:
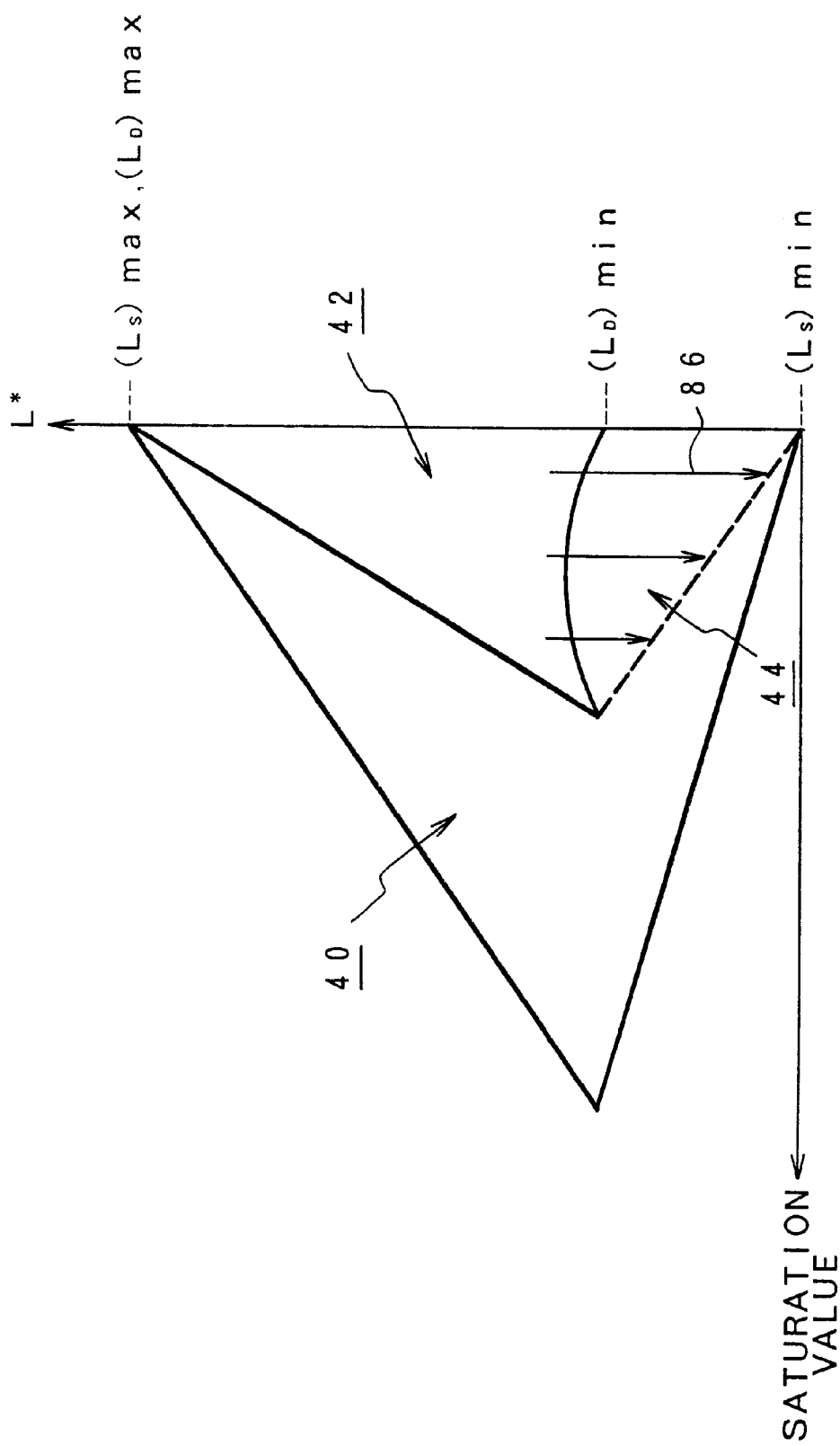
FIG. 37 is an explanatory diagram of a virtual gamut obtaining step in the sixth embodiment of the invention.
Figure 38:
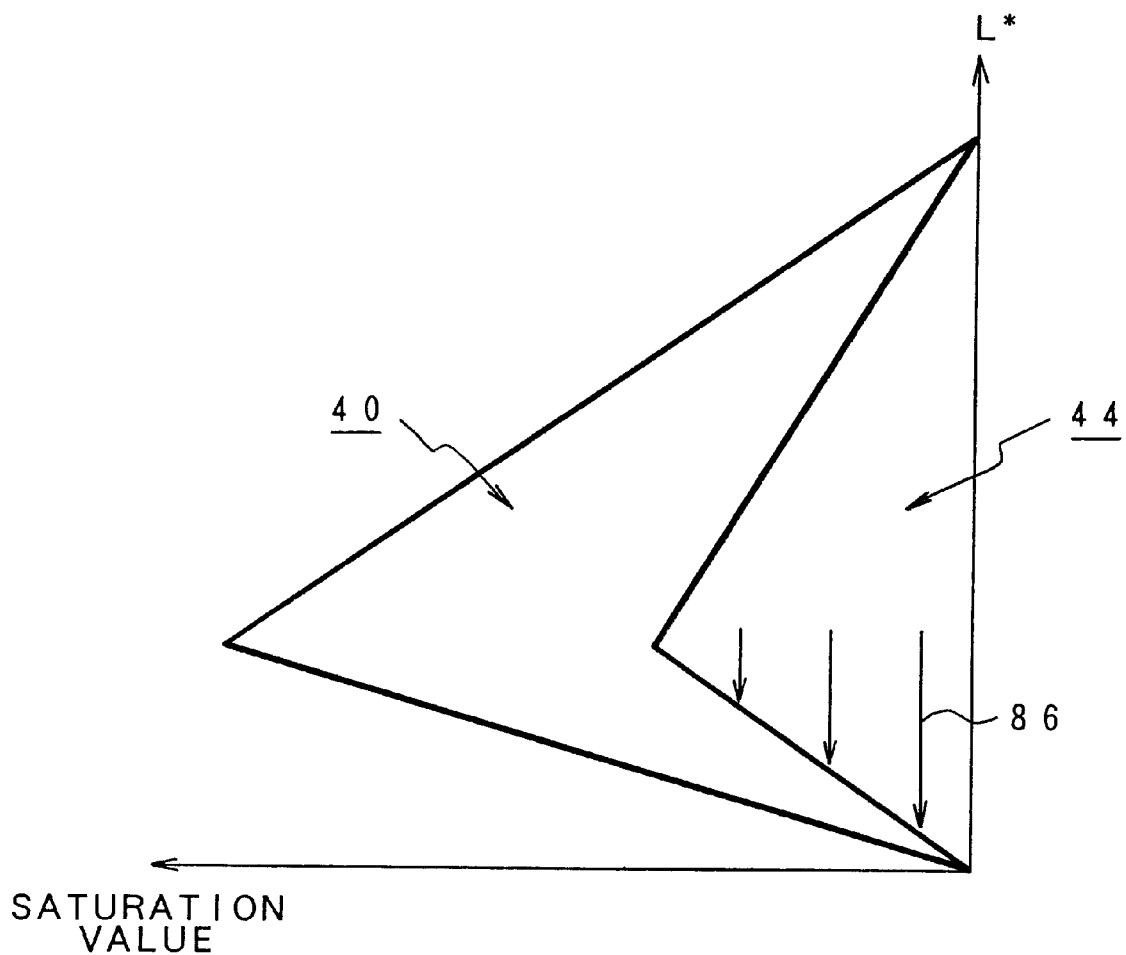
FIG. 38 is an explanatory diagram of a virtual gamut obtained from a printer gamut in FIG. 37.
Figure 39:
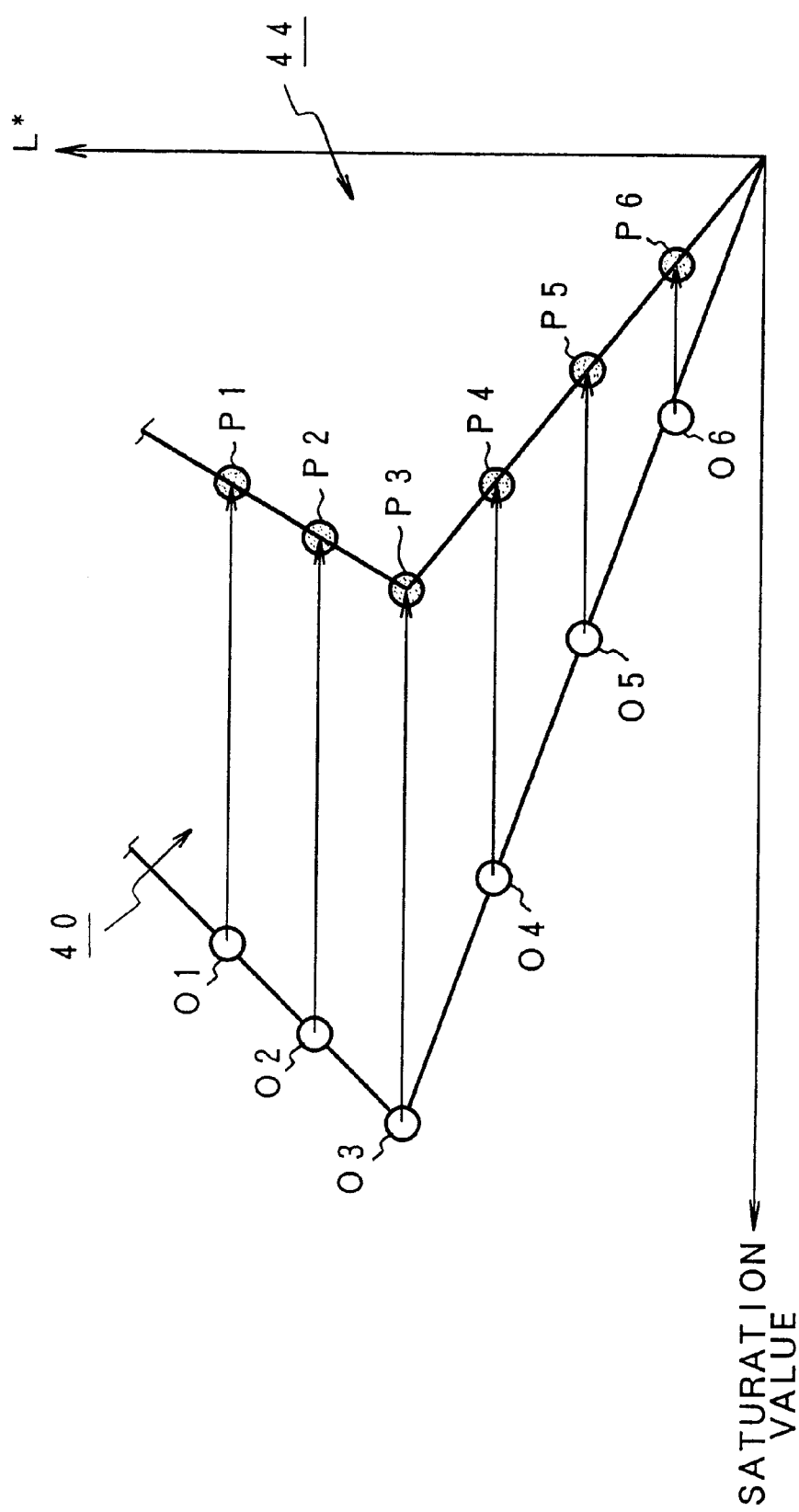
FIG. 39 is an explanatory diagram of a color data changing step subsequent to FIG. 38.
Figure 40:
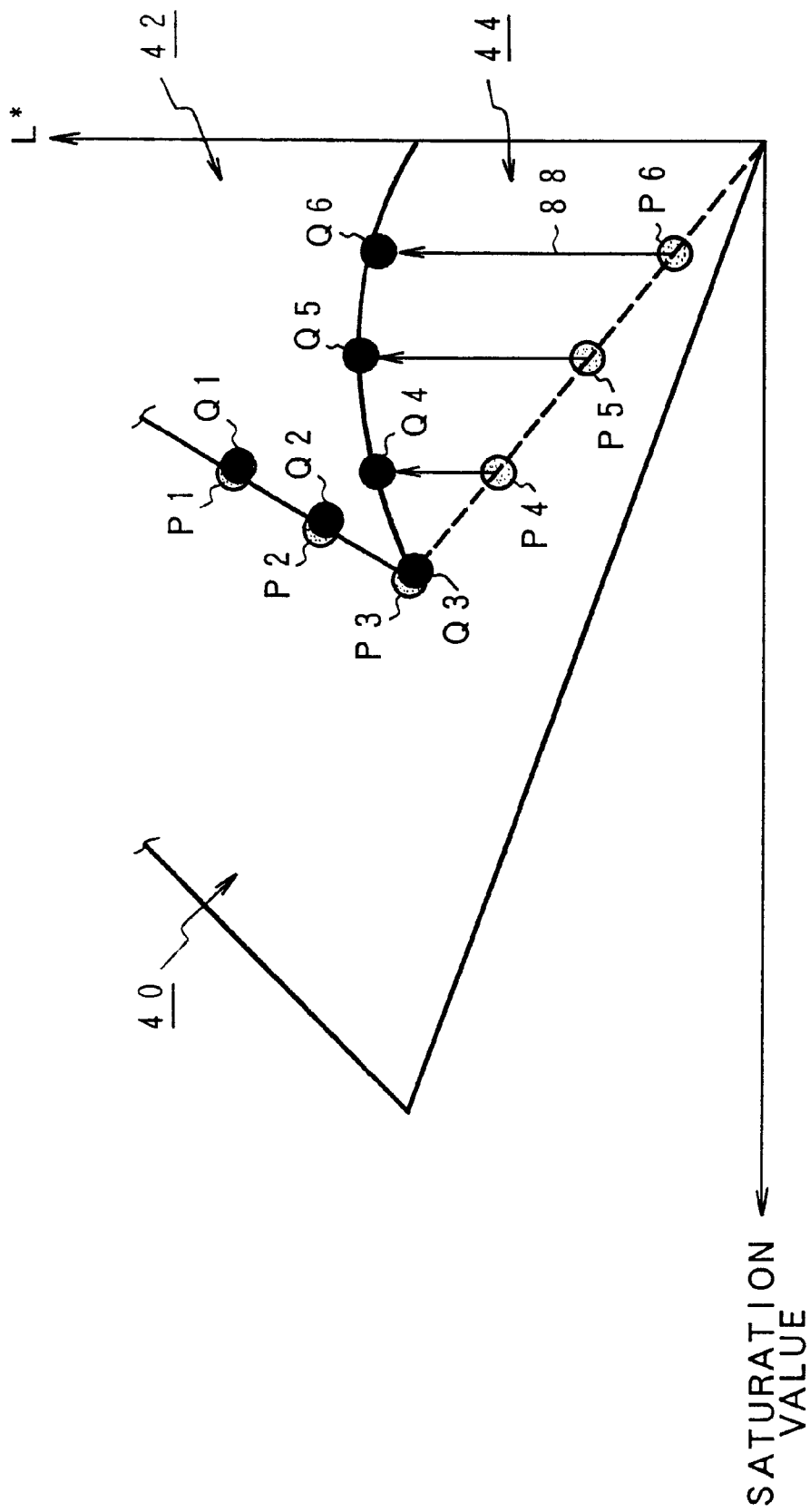
FIG. 40 is an explanatory diagram of a color data forming step subsequent to FIG. 39.

FIG. 37 is a cross sectional view of an equal hue angle of the L*a*b* color space for explaining the sixth embodiment of a color data converting method of the invention. As shown in FIG. 7, the printer gamut 42 which is formed in an area of hue angles of blue, violet, and purple is shown as an example. The printer gamut forms a gamut which has an "L"-character shape and in which the bottom side portion is upwardly curved. With respect to such a printer gamut 42 which is peculiar to the gamuts of blue, violet, and purple as mentioned above, in the sixth embodiment, the virtual gamut 44 in FIG. 38 is obtained by expanding and compressing as shown by arrows 86 so as to reduce the absolute amount of expansion of the printer gamut 42 as the saturation values a*b* are larger in the virtual gamut obtaining step. Thus, the printer gamut 42 which has an "L"-character shape and in which the bottom side portion is inwardly curved in FIG. 37 is expanded so that, in the virtual gamut 44 in FIG. 38, the bottom side portion has almost the same "<"-character shape as that of the display gamut 40. Subsequently, as shown in FIG. 39, in the color data changing step, in a manner similar to the case of the first embodiment, for example, the saturation values a*b* of, for instance, the color data O1 to O6 included in the display gamut 40 are reduced as shown by arrows, thereby obtaining the color data P1 to P6 included in the virtual gamut 44. As shown in FIG. 40, subsequently, for the color data P1 to P6 included in the virtual gamut 44 in the color data forming step, by using an inverse function of the function used to expand from the printer gamut 42 to the virtual gamut is 44 in the virtual gamut obtaining step in FIGS. 37 and 38, the color data Q1 to Q6 included in the printer gamut 42 are obtained with respect to the color data P1 to P6 changed to the virtual gamut 44 as shown by arrows 88. According to the sixth embodiment as mentioned above, even in the case where the printer gamut has an "L"-character shape, since the obtained virtual gamut 44 has a "<"-character shape corresponding to the display gamut 40, for example, as shown in FIG. 39, the color data O1 to O6 arranged at regular intervals at the boundary on the outside of the display gamut can be changed to the color data P1 to P6 of the virtual gamut 44 without causing discontinuity of the gradation and deterioration of the gradation. The color data P1 to P6 changed to the virtual gamut 44 are converted to the printer gamut 42 by an inverse function of the function used to obtain the virtual gamut in the color data forming step as shown in FIG. 40. Thus, a portion which is not used at the time of conversion of the color data does not exist in the printer gamut 42 and the problem such that discontinuity of the gradation and the deterioration of the gradation occur is eliminated.

Figure 41:
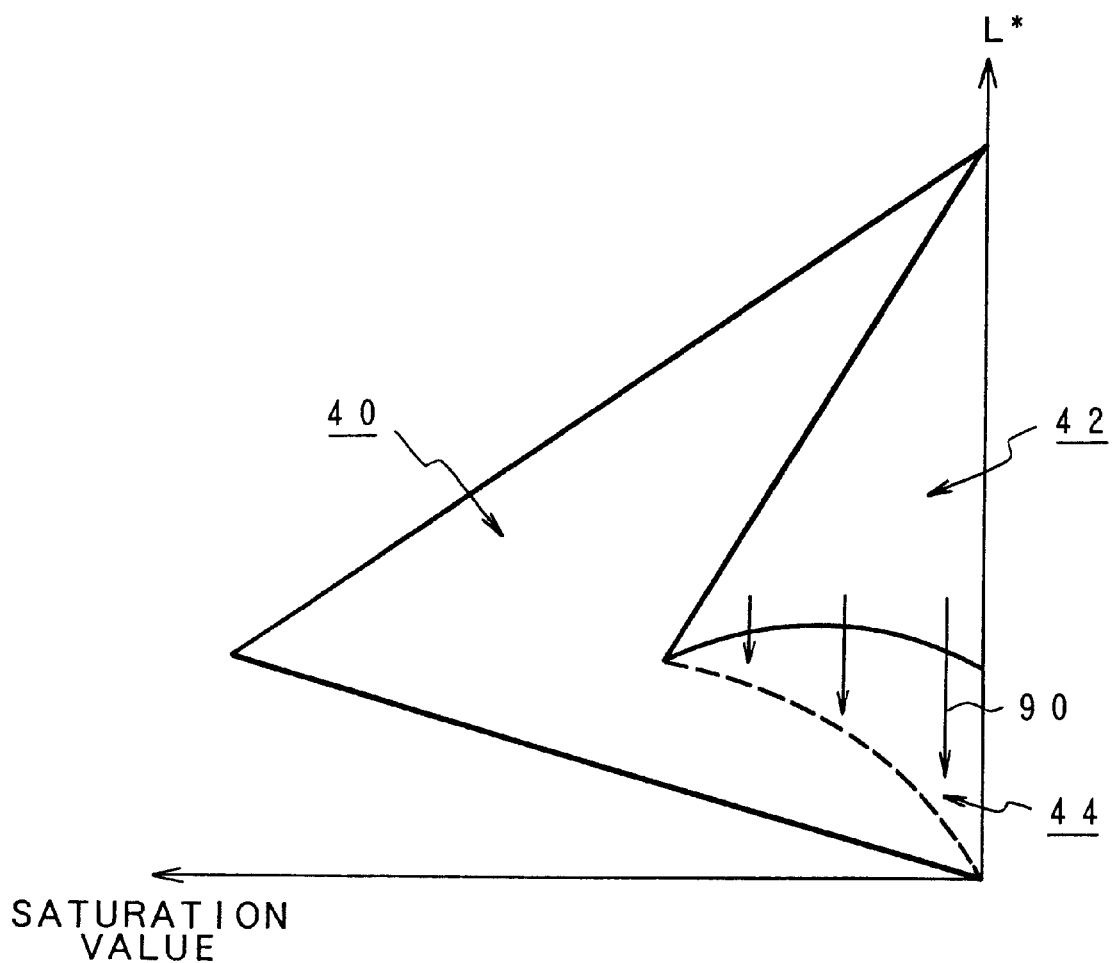
FIG. 41 is an explanatory diagram of a virtual gamut obtaining step in the seventh embodiment of the invention.

FIG. 41 is a cross sectional view of an equal hue angle of the L*a*b* color space for explaining the seventh embodiment of a color data converting method according to the invention. In a manner similar to the sixth embodiment, there is shown an example of the conversion of the color data for an area, as a target, of the hue angles of blue, violet, and purple where the printer gamut 42 has an "L"-character shape and in which the bottom side portion is upwardly curved. In the seventh embodiment, in the virtual gamut obtaining step, as shown by arrows 90 in FIG. 41, when the virtual gamut 44 is obtained by expanding the printer gamut 42, a gamut expanding function to reduce the absolute amount of expansion in proportion as the saturation values a*b* are larger is used. The gamut expanding function is given by the following equations when it is assumed that the (L*a*b*) values of the printer gamut 42 before expansion are set to ($L_1$ $a_1$ $b_1$) and the (L*a*b*) values of the virtual gamut 44 after the expansion are set to ($L_3 a_3 b_3$).

$a_3 = a_2$ $b_3 = b_2$ $$C_2 = \sqrt{(a_2)^2 + (b_2)^2}$$

$$L_a = (L_m - L_{Smin})\left(\frac{L_2 - L_{Dmin}}{L_m - L_{Dmin}}\right)^{\frac{1}{\gamma_1}} + L_{Smin} \quad \ldots \quad (L_2 \leq L_m)$$

$$L_a = L_{Smax} - (L_{Smax} - L_m)\left(\frac{L_{Dmax} - L_2}{L_{Dmax} - L_m}\right)^{\frac{1}{\gamma_2}} \quad \ldots \quad (L_2 > L_m)$$

$F_{in} = L_a = L_2$ $$F_{out} = F_{in} \cdot \frac{C_{max} - C_2}{C_{max}} \quad \ldots \quad (C_2 < C_{max})$$

$$L_3 = F_{out} + L_2 \tag{4}$$

where, $L_{Smin}$: the lowest lightness value of the display gamut (0.0 in the embodiment)

$L_{Dmin}$: the lowest lightness value of the printer gamut (30.0 in the embodiment)

$L_{Smax}$: the highest lightness value of the display gamut (100.0 in the embodiment)

$L_{Dmax}$: the highest lightness value of the printer gamut (90.0 in the embodiment)

$L_m$: almost intermediate lightness value between the highest and lowest lightness values of the printer gamut (60.0 in the embodiment)

$\gamma_1$: arbitrary constant of 1 or more (1.90 in the embodiment)

$\gamma_2$: arbitrary constant of 1 or more (1.50 in the embodiment)

$C_{max}$: saturation value at a location where an expansion amount and a compression amount in the lightness direction are equal to 0 (50 in the embodiment)

Figure 42:
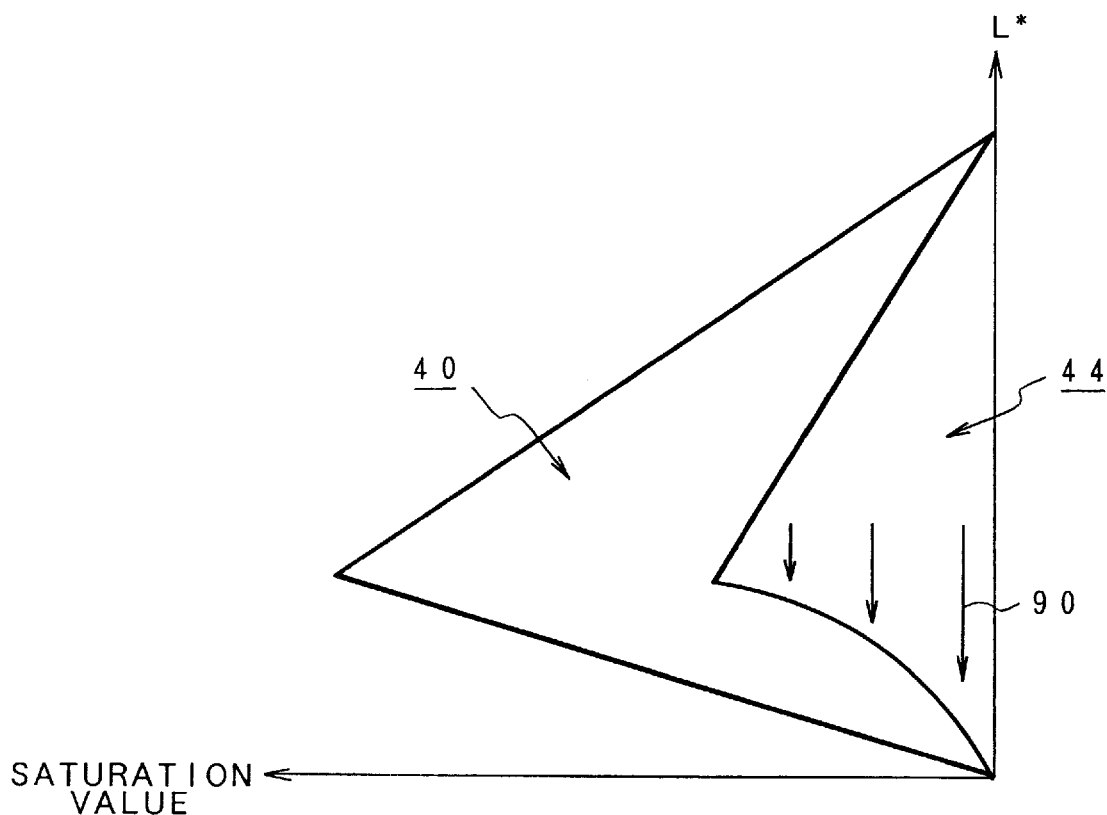
FIG. 42 is an explanatory diagram of a virtual gamut obtained from a printer gamut in FIG. 41.
Figure 44:
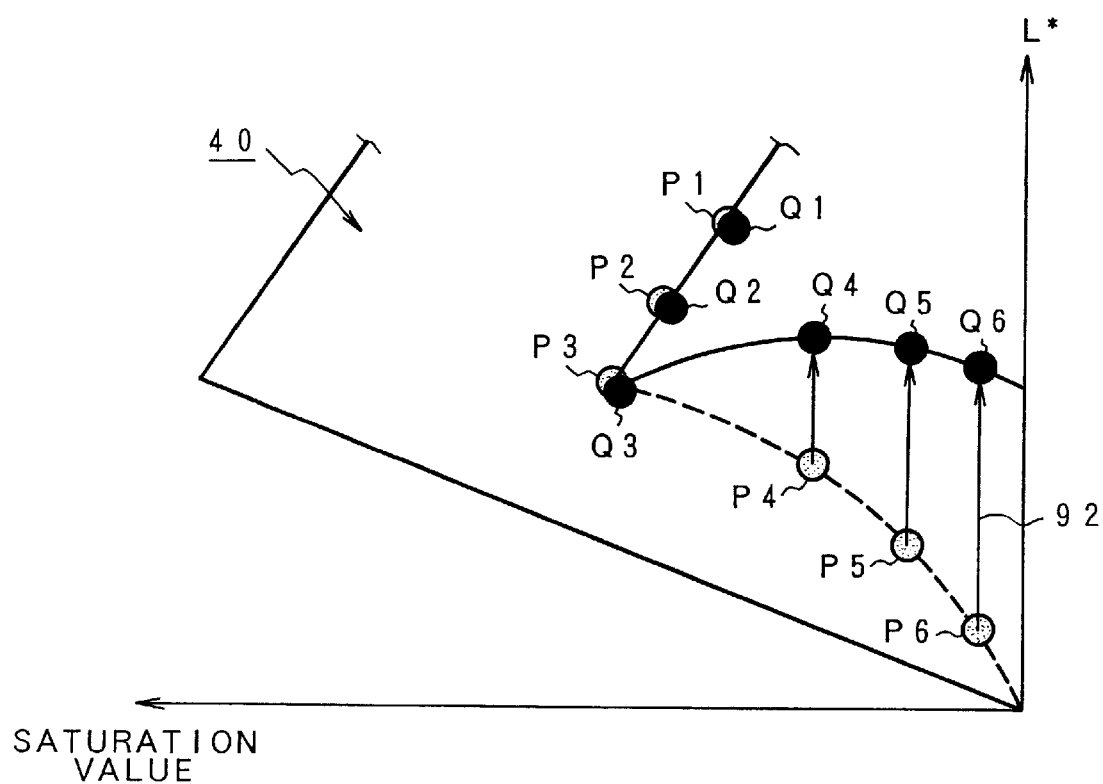
FIG. 44 is an explanatory diagram of a color data forming step subsequent to FIG. 43.

Thus, the virtual gamut 44 having a shape like "<" or the like almost similar to the display gamut 40 shown in FIG. 42 in which the "L"-character shaped bottom side portion of the printer gamut 42 is inwardly curved can be obtained. Subsequently, as shown in FIG. 43, in the color data changing step, for example, with respect to the color data O1 to O6 included in the display gamut 40, by decreasing the saturation values, the color data P1 to P6 included in the virtual gamut 44 are obtained. As shown in FIG. 44, in the color data forming step, an arithmetic operation of an inverse conversion shown by arrows 92 is performed to the color data P1 to P6 included in the virtual gamut 44 by an inverse function of the gamut expanding function of the equations 4, thereby obtaining the color data Q1 to Q6 included in the printer gamut 42. It is difficult to obtain the inverse function of the gamut expanding function which is given by the equations (4). Therefore, expansion values are obtained by substituting all of the (L*a*b*) values which can be obtained as argument in the printer gamut 42 into the gamut expanding function of the equations (4). The (L*a*b*) values of the printer gamut 44 as arguments substituted when the expansion values closest to the (L*a*b*) values of the virtual gamut 44 among them are obtained are set to the color data of the printer gamut that is derived by the inverse function. As mentioned above, according to the seventh embodiment for converting the color data of the display gamut 40 into the printer gamut 42 via the virtual gamut 44 obtained from the printer gamut 42 by using the gamut expanding function of the equations (4), in a manner similar to the sixth embodiment, the color data O1 to O6 arranged at regular intervals in the boundary portion of the display gamut in FIG. 47 can be converted into the color data Q1 to Q6 of the printer gamut 42 via the color data P1 to P6 of the virtual gamut 44 without causing a deterioration of the gradation. The portion which has an "L"-character shape and in which the bottom side is inwardly curved in the printer gamut 42 is also expanded to the portion of the virtual gamut 44 as a part of a "<"-character shape curved in the lightness direction by the gamut expanding function of the equations (4). Therefore, when converting from the virtual gamut 44 to the printer gamut 42 by the inverse function, a color which is not used to print does not exist in the printer gamut 42 and the discontinuity of the gradation and the deterioration of the gradation do not occur. Further, the color data of the printer gamut 42 can be derived via the virtual gamut 44 while saving the distance relation of the color data of the display gamut 40.

Figure 45:
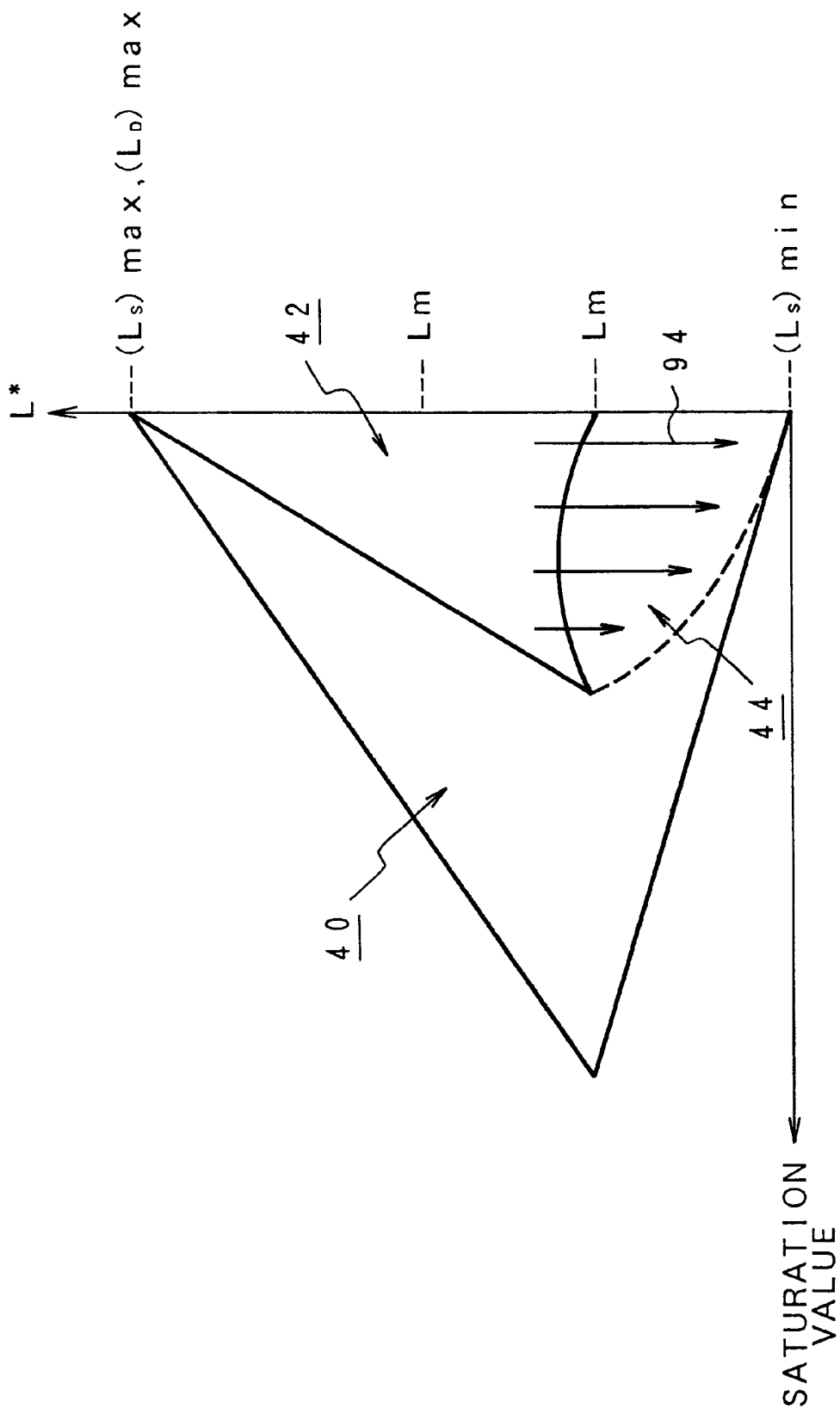
FIG. 45 is an explanatory diagram of a virtual gamut obtaining step in the eighth embodiment of the invention.

FIG. 45 is a cross sectional view of an equal hue angle of the L*a*b* color space for explaining the eighth embodiment of a color data converting method of the invention. In a manner similar to the sixth and seventh embodiments, FIG. 45 relates to the conversion of color data for the printer gamut 42 at hue angles of blue, violet, and purple in which the gamut has an "L"-character shape and in which the bottom side portion is inwardly curved as a target. According to the color data converting method of the eighth embodiment, first in the virtual gamut obtaining step, as shown by arrows 94 in FIG. 45, the printer gamut 42 is expanded so as to reduce the absolute amount of expansion in an exponential function manner as the saturation values a*b* are larger. As such a gamut expanding function, the following relational equations are given.

$a_3 = a_2$ $b_3 = b_2$ $$C_2 = \sqrt{(a_2)^2 + (b_2)^2}$$

$$L_a = (L_m - L_{Smin})\left(\frac{L_2 - L_{Dmin}}{L_m - L_{Dmin}}\right)^{\frac{1}{\gamma_1}} + L_{Smin} \quad \dots \quad (L_2 \leq L_m)$$

$$L_a = L_{Smax} - (L_{Smax} - L_m)\left(\frac{L_{Dmax} - L_2}{L_{Dmax} - L_m}\right)^{\frac{1}{\gamma_2}} \quad \dots \quad (L_2 > L_m)$$

$F_{in} = L_a = L_2$ $$F_{out} = F_{in} \cdot \left(1 - \left(\frac{C_{in}}{C_{max}}\right)^{\gamma_3}\right) \quad \dots \quad (C_2 < C_{max})$$

$L_3 = F_{out} + L_2$ \hfill (5)

where, $L_{Smin}$: the lowest lightness value of the display gamut (0.0 in the embodiment)

$L_{Dmin}$: the lowest lightness value of the printer gamut (30.0 in the embodiment)

$L_{Smax}$: the highest lightness value of the display gamut (100.0 in the embodiment)

$L_{Dmax}$: the highest lightness value of the printer gamut (90.0 in the embodiment)

$L_m$: almost intermediate lightness value between the highest and lowest lightness values of the printer gamut (60.0 in the embodiment)

$\gamma_1$: arbitrary constant of 1 or more (1.90 in the embodiment)

$\gamma_2$: arbitrary constant of 1 or more (1.50 in the embodiment)

$\gamma_3$: arbitrary constant of 1 or more (3.0 in the embodiment)

$C_{max}$: saturation value at a location where an expansion amount and a compression amount in the lightness direction are equal to 0 (50 in the embodiment)

Figure 46:
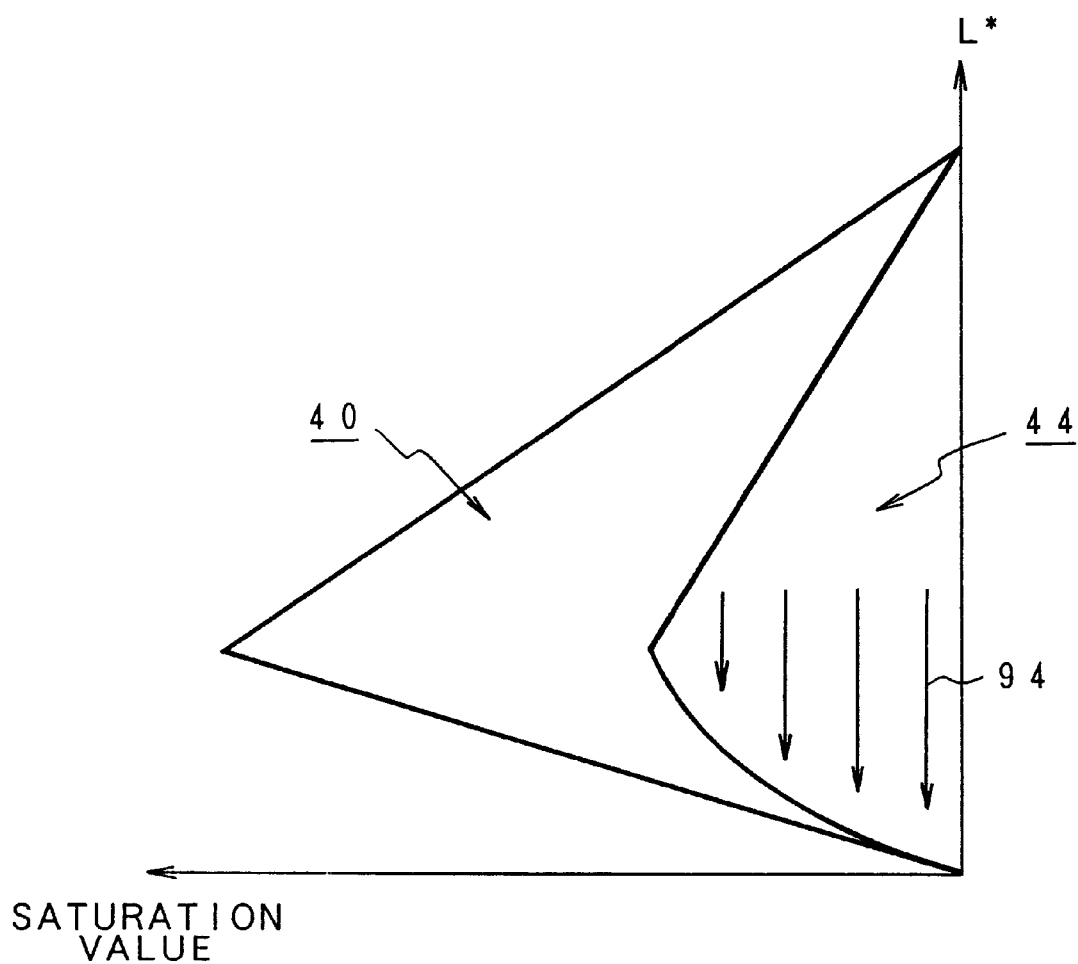
FIG. 46 is an explanatory diagram of a virtual gamut obtained from a printer gamut in FIG. 45.
Figure 47:
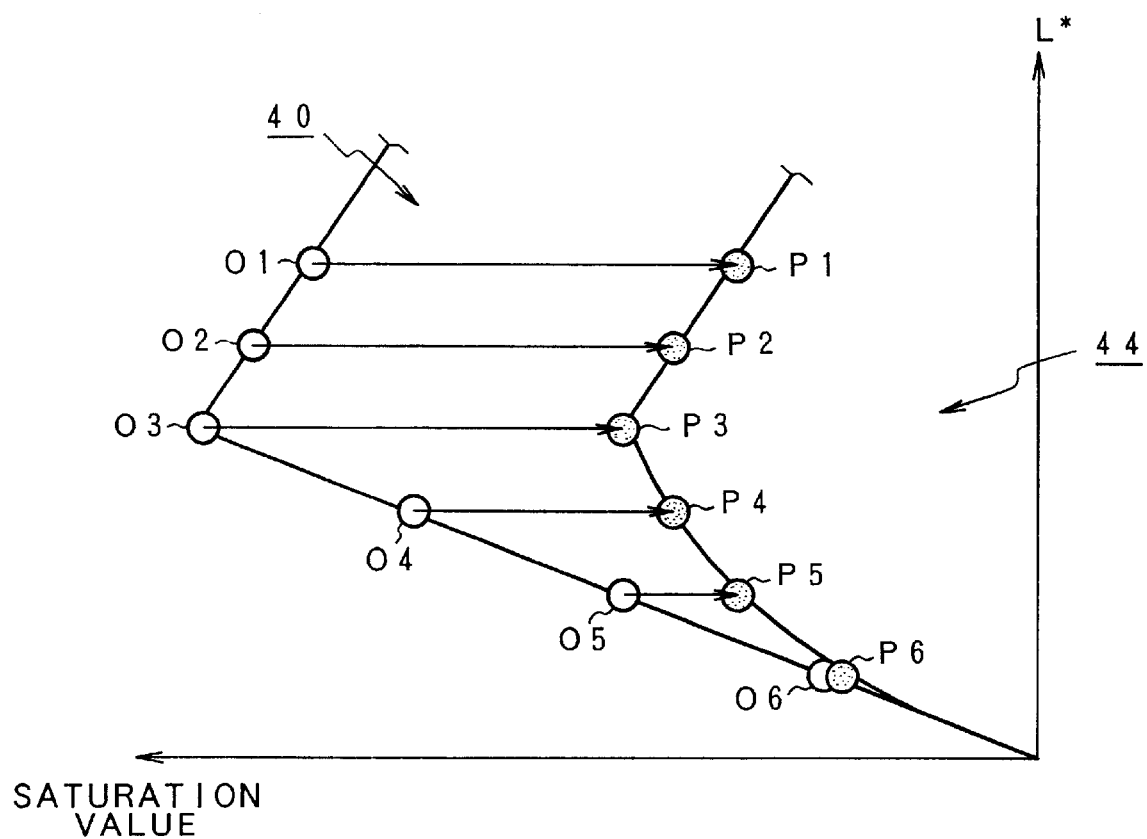
FIG. 47 is an explanatory diagram of a color data changing step subsequent to FIG. 46.
Figure 48:
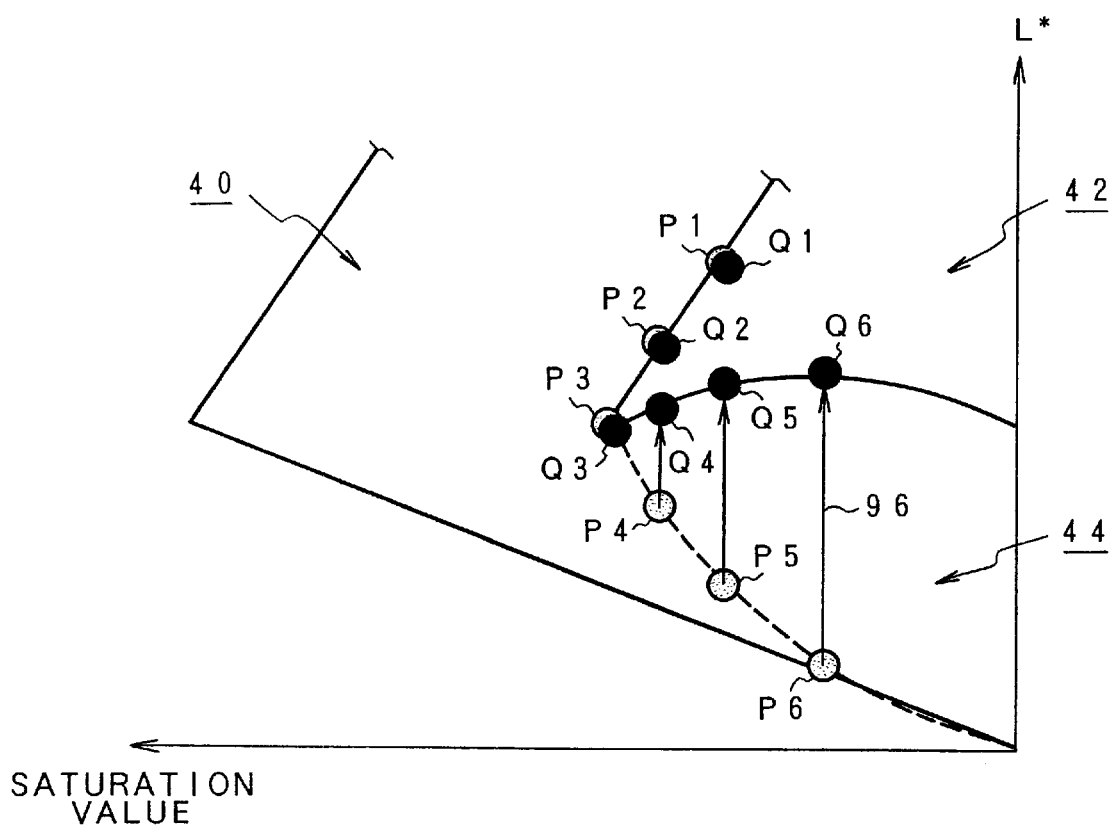
FIG. 48 is an explanatory diagram of a color data forming step subsequent to FIG. 47.

By the gamut expanding function which is given by the equations (5), as shown in FIG. 46, the virtual gamut 44 having a "<"-character shape similar to the display gamut 40 in which the "L"-character shaped bottom side portion of the printer gamut 42 is downwardly curved and expanded can be obtained. Subsequently, in the color data changing step, as shown in FIG. 47, the color data P1 to P6 included in the virtual gamut 44 are obtained by reducing the saturation values a*b* with respect to the color data O1 to O6 arranged at regular intervals in, for example, the boundary portion of the display gamut 40. In this case, the color data O4 to O6 of the display gamut 40 are changed to the color data P4 to P6 on the boundary curved to the outside of the virtual gamut 44. As compared with the color data P4 to P6 by the change of the color data O4 to O6 of the display gamut 40 for the virtual gamut 44 curved to the inside in FIG. 43, the saturation is further saved, so that a saving degree of the saturation of the whole color data of the virtual gamut 44 after the change is preferable. Subsequently, in the color data forming step, the (L*a*b*) values of the printer gamut 42 are calculated as shown by arrows 96 for the (L*a*b*) values of the color data P1 to P6 of the virtual gamut 44 as shown in FIG. 48 by an inverse function of the gamut expanding function of the equations (5) used in the virtual gamut obtaining step, thereby obtaining the color data Q1 to Q6. Even in this case, since it is difficult to obtain the inverse function of the gamut expanding function of the equations (5), all of the (L*a*b*) values of the printer gamut 42 which can be obtained as arguments in the gamut expanding function are substituted into the equations (5). The (L*a*b*) values of the printer gamut 42 which were substituted as arguments when the values which are closest to the color data P1 to P6 of the virtual gamut 44 in the calculated result are outputted are obtained as color data of the printer gamut 42 which was inversely converted.

Figure 49:
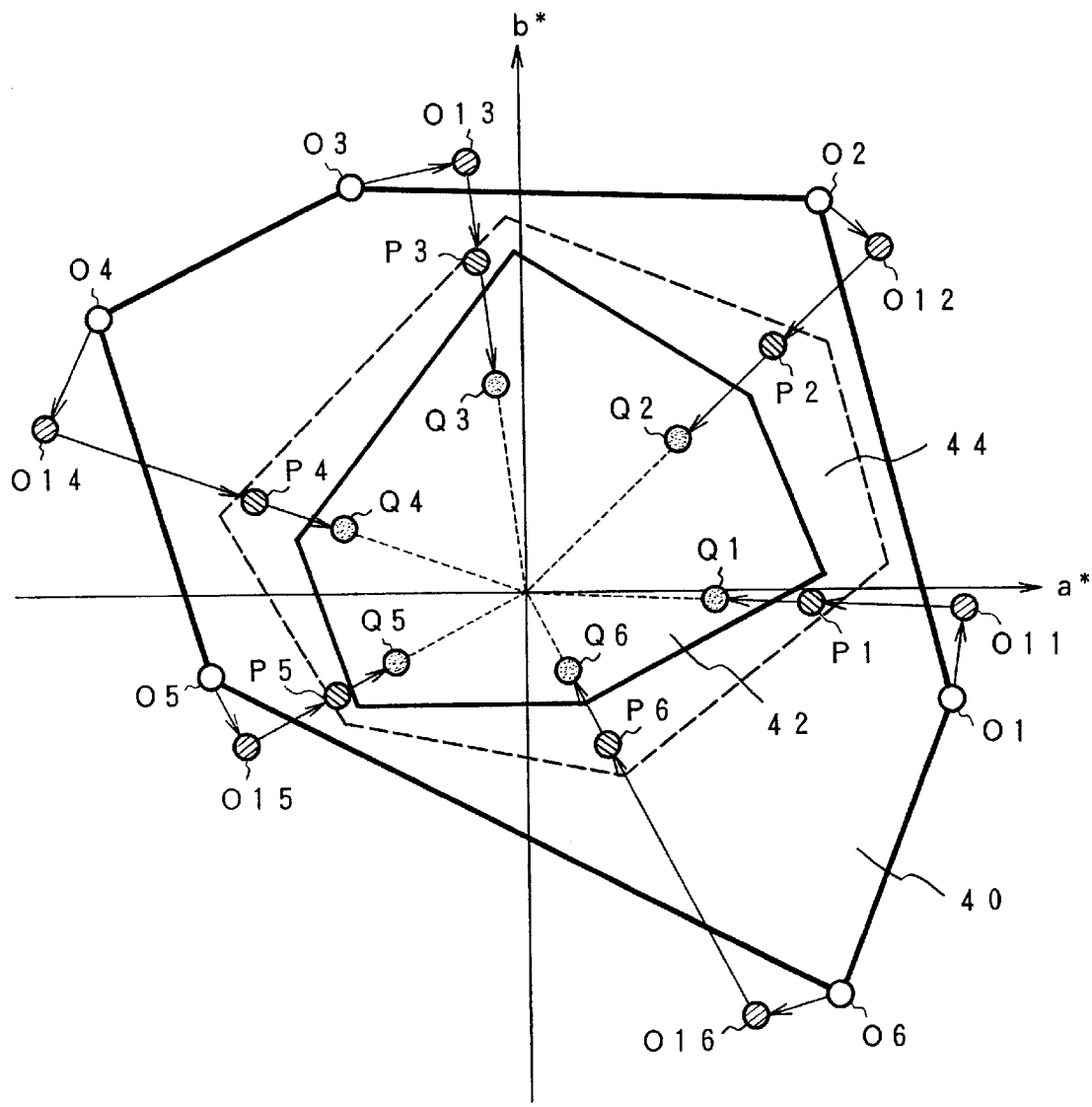
FIG. 49 is an explanatory diagram of the ninth embodiment of the invention accompanied with a change in hue angle.

FIG. 49 is a cross sectional view for explaining the ninth embodiment of a color data converting method of the invention when the L*a*b* color space is cut out at a certain lightness value. The display color space 40 has a gamut shape combining the color data O1 to O6 of every predetermined hue angle that is decided by the phase angle around a lightness axis. On the other hand, the printer gamut 44 is a narrow area in which inside saturation values are small.

The first to eighth embodiments of the invention have been described with respect to the example in the case where the lightness value and saturation value of the color data of the display gamut 40 are changed and the color data is converted into the color data of the printer gamut 42. The ninth embodiment of FIG. 49, however, is characterized in that the hue angle value is also changed. That is, in the ninth embodiment of FIG. 49, in the color data changing step, color data Q11 to Q16 is obtained by first changing the hue angles with respect to the color data O1 to O6 of the display gamut. The color data P1 to P6 of the virtual gamut 44 is obtained by reducing the saturation values with regard to the color data Q11 to Q16 whose hue angles were changed. Finally, in the color data forming step, the color data Q1 to Q6 of the printer gamut 42 is obtained by applying an inverse function of the function used when obtaining the virtual gamut 44 from the printer gamut 42 to the color data P1 to P6 of the virtual gamut 44. As a virtual gamut 44 in the ninth embodiment of FIG. 49, all of the gamuts in the first to eighth embodiments which have already been described can be applied.

According to the invention as described above, when the color data included in the display gamut corresponding to the image displaying apparatus is converted into the color data included in the printer gamut corresponding to the image printing apparatus, by converting the color data via the virtual gamut obtained by expanding the printer gamut, all of the color data in the display gamut can be converted into the color data of the printer gamut. Even if the gamuts differ every equipment, the whole color images reproduced by the respective equipment can be made visually identical, The color data corresponding to white and black of the display gamut is made coincide with the color data corresponding to white and black of the printer gamut via the virtual gamut, so that the problem such that when the white color in the color image of the image displaying apparatus is printed by the image printing apparatus, ink, toner, or the like is adhered onto the paper and the paper is not seen in white due to the dissidence of the black and white color data can be certainly prevented. At the same time, the color image can be reproduced on the print image of the image printing apparatus at a high fidelity without deteriorating any part of the gradation of the achromatic color of the color image in the image displaying apparatus.

By converting the color data of the display gamut into the printer gamut via the virtual gamut expanded only in the lightness direction without expanding in the saturation direction, the reduction in saturation of the color data can be prevented.

When the color data of the display gamut is converted into the color data of the printer gamut through the virtual gamut, a situation such that the whole color image which is printed becomes too bright or too dark as compared with the color image which is displayed is prevented. At the same time, the print image in which the gradation is saved can be properly reproduced without deteriorating the gradation in the lightness direction.

Further, when directly converting from the color data of the display gamut to the color data of the printer gamut, the color data which is not used to print exists in the printer gamut. In the invention, however, by converting the color data of the display gamut to the printer gamut via the virtual gamut, the color data of the printer gamut which is not used to print does not exist. The problem such that the discontinuity of the gradation and the deterioration of the gradation occur can be also eliminated.

Moreover, by properly setting the shape of the virtual gamut which is derived from the printer gamut, the color data of the printer gamut can be obtained via the virtual gamut while keeping the distance relation of the color data of the display gamut. Because of similar reasons, the saturation of the color data of the printer gamut can be further saved and the color data of the printer gamut via the virtual gamut can be properly obtained.

The above embodiments have been described with respect to the example of the conversion of the color data between the gamuts of every different equipment in the L*a*b* color space when the color data of the RGB colorimetric system or CMY colorimetric system which depends on the equipment is converted via the color space of the L*a*b* colorimetric system which does not depend on the equipment. However, the invention can be directly applied to the conversion of color data in the different gamut in the color space other than L*a*b*.

The invention is not limited to the above embodiments but incorporates proper modifications within the scope which does not lose the objects and advantages of the invention. The invention is not limited by the numerical values shown in the above embodiments.

What is claimed is:

1. A color data converting method of forming second color data included in a second gamut of second color image equipment from first color data included in a first gamut of first color image equipment, comprising:

a virtual gamut obtaining step of converting values of one or more of a lightness value, a saturation value, and a hue angle value of said second gamut and obtaining an expanded virtual gamut including at least all of lightness values of said first gamut;

a color data changing step of changing values of one or more of the lightness value, saturation value, and hue angle value for color data which is not included in said virtual gamut in the first color data of said first gamut and obtaining third color data included in said virtual gamut; and a color data forming step of performing a conversion opposite to the conversion performed to said second gamut in said virtual gamut obtaining step to said third color data and forming the second color data.

2. A method according to claim 1, wherein in said virtual gamut obtaining step, the second gamut is converted and said virtual gamut is obtained in a manner such that a lowest lightness value of said first gamut and a lowest lightness value of said second gamut are equal and a highest lightness value of said first gamut and a highest lightness value of said second gamut are equal.

3. A method according to claim 1, wherein in said virtual gamut obtaining step, said second gamut is expanded in only a lightness value direction and said virtual gamut is obtained.

4. A method according to claim 1, wherein in said virtual gamut obtaining step, said virtual gamut is obtained by performing an expansion so as to increase an expansion amount in an exponential function manner as the lightness decreases with respect to the second gamut whose lightness value is equal to or less than a predetermined almost intermediate lightness value between the highest lightness value and the lowest lightness value of said second gamut.

5. A method according to claim 1, wherein in said virtual gamut obtaining step, said virtual gamut is obtained by performing an expansion so as to increase an expansion amount in an exponential function manner as the lightness increases with respect to the second gamut whose lightness value is equal to or larger than a predetermined almost intermediate lightness value between the highest lightness value and the lowest lightness value of said second gamut.

6. A method according to claim 1, wherein said virtual gamut obtaining step has said gamut expansion restricting step of decreasing an absolute value of the expansion of the lightness value as the saturation value of the color data at a location where the expansion is performed in said second gamut is larger.

7. A method according to claim 6, wherein in said gamut expansion restricting step, the absolute value of the expansion of the lightness value is decreased in accordance with a function that is proportional to the saturation value.

8. A method according to claim 6, wherein in said gamut expansion restricting step, the absolute value of the expansion of the lightness value is decreased in an exponential function manner as the saturation value increases.

9. A method according to claim 1, wherein said first gamut is a display gamut corresponding to an RGB color space which is used in a color displaying apparatus in an L*a*b* color space, said second gamut is a printer gamut corresponding to a CMY color space which is used in a color printing apparatus in the L*a*b* color space, and said virtual gamut is a gamut expanded so as to include at least all of the lightness values of said display gamut by converting one or more of the lightness value, saturation value, and hue angle value of said printer gamut.

10. A method according to claim 9, wherein in said virtual gamut obtaining step, each of an RGB/display gamut conversion table to convert color data of said RGB color space into color data of said display gamut in said L*a*b* color space, a printer gamut/CMY conversion table for converting color data of said printer gamut in said L*a*b* color space into color data of said CMY color space, and a virtual gamut/CMY conversion table for converting one or more of the lightness value, saturation value, and hue angle value of said printer gamut, obtaining the expanded virtual gamut including at least all of the lightness values of said display gamut, converting color data of said virtual gamut into the color data of said CMY color space, and converting color data out of said virtual gamut into specific out-of-area identification values is formed, in said color data changing step, after the color data of the RGB color space was converted into the color data of the display gamut in said L*a*b* color space by said RGB/display gamut conversion table, for the color data which is not included in said virtual gamut in the color data of said display gamut, one or more of the lightness value, saturation value, hue angle value are changed until they are not converted into the out-of-area identification values by said virtual gamut/CMY conversion table, thereby obtaining third color data included in said virtual gamut, and in said color data forming step, the second color data is formed by executing a conversion opposite to the conversion performed to the printer gamut in said virtual gamut obtaining step to said third color data, and said second color data is converted into the color data of the CMY color space by said printer gamut/CMY conversion table and is outputted to the color printing apparatus.

\* \* \* \* \*